(12) United States Patent
Lee et al.

(10) Patent No.: US 12,537,231 B2
(45) Date of Patent: Jan. 27, 2026

(54) ELECTRODE ASSEMBLY, CYLINDRICAL BATTERY CELL, AND BATTERY PACK AND VEHICLE INCLUDING THE SAME

(71) Applicant: LG ENERGY SOLUTION, LTD., Seoul (KR)

(72) Inventors: Myung-An Lee, Daejeon (KR); Duk-Hyun Ryu, Daejeon (KR); Jae-Young Woo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 564 days.

(21) Appl. No.: 17/967,614

(22) Filed: Oct. 17, 2022

(65) Prior Publication Data

US 2023/0118382 A1    Apr. 20, 2023

(30) Foreign Application Priority Data

Oct. 15, 2021  (KR) ................ 10-2021-0137939
Dec. 8, 2021   (KR) ................ 10-2021-0175085
Jul. 19, 2022  (KR) ................ 10-2022-0089239

(51) Int. Cl.
  *H01M 10/0587*    (2010.01)
  *H01M 10/0525*    (2010.01)
  (Continued)

(52) U.S. Cl.
  CPC ... *H01M 10/0587* (2013.01); *H01M 10/0525* (2013.01); *H01M 50/107* (2021.01); *H01M 50/446* (2021.01); *H01M 2220/20* (2013.01)

(58) Field of Classification Search
  CPC ............ H01M 50/107; H01M 50/446; H01M 2220/20; H01M 10/0587
  See application file for complete search history.

(56) References Cited

U.S. PATENT DOCUMENTS 5,849,431  A  *  12/1998  Kita ................... H01M 10/0431
                                              429/170
9,231,270  B2 *   1/2016  Yoshiura ............. H01M 10/052
(Continued)

FOREIGN PATENT DOCUMENTS

CN      105206865 A    12/2015
CN      206432322 U     8/2017
(Continued)

OTHER PUBLICATIONS

Machine Translation of JP-2014082055-A (May 8, 2025) (Year: 2025).*

(Continued)

*Primary Examiner* — Matthew J Merkling
(74) *Attorney, Agent, or Firm* — Bryan Cave Leighton Paisner LLP

(57) ABSTRACT

An electrode assembly having a first electrode, a second electrode, and a separator positioned between the first electrode and the second electrode. The first electrode, the second electrode, and the separator are together wound about an axis in a winding direction resulting in a plurality of winding turns. Each of the first electrode and the second electrode has a first side and a second side opposite the first side in the direction of the axis, as well as a first, electrode active material portion, coated with an electrode active material, extending from the second side in the direction of the first side, and a second, uncoated portion extending from the first side in the direction of the second side to the active material of the first portion. Additionally, the first side of the first electrode and the first side of the second electrode are divided into a plurality of segments by a cut groove, and each of the segments has a first end corresponding to the first side of either the first or the second electrode. One or more of the segments are bent in a radial direction relative to the axis, at a point below the first end of each bent segment, and (Continued)

US 12,537,231 B2

Page 2 the separator has a side that is positioned between the bending point of each bent segment and a boundary between the first and the second portions.

21 Claims, 35 Drawing Sheets

(51) Int. Cl.
  *H01M 50/107* (2021.01)
  *H01M 50/446* (2021.01)

(56) References Cited

U.S. PATENT DOCUMENTS

| | | |
|---|---|---|
| 2005/0287432 A1 | 12/2005 | Cheon et al. |
| 2007/0196730 A1 | 8/2007 | Kozuki |
| 2008/0026291 A1 | 1/2008 | Kim |
| 2011/0027658 A1* | 2/2011 | Kim .................... H01M 50/434 427/508 |
| 2011/0293977 A1 | 12/2011 | Kim et al. |
| 2014/0162097 A1 | 6/2014 | Fuhr et al. |
| 2015/0140403 A1 | 5/2015 | Moon |
| 2015/0155539 A1 | 6/2015 | Park et al. |
| 2015/0243453 A1* | 8/2015 | Taguchi ................. H01G 11/82 29/25.03 |
| 2016/0218343 A1* | 7/2016 | Kim .................. H01M 10/0587 |
| 2017/0365839 A1* | 12/2017 | Kawate ................ H01M 50/46 |
| 2020/0295341 A1 | 9/2020 | Kim et al. |
| 2020/0343520 A1* | 10/2020 | Jeong ................. H01M 50/533 |
| 2021/0344033 A1 | 11/2021 | Park |
| 2022/0123373 A1 | 4/2022 | Takahashi |
| 2022/0231345 A1* | 7/2022 | Hwangbo ............ H01M 50/186 |
| 2023/0118382 A1 | 4/2023 | Lee et al. |
| 2023/0170533 A1 | 6/2023 | Chung et al. |
| 2023/0238564 A1 | 7/2023 | Hosokawa et al. |
| 2024/0387857 A1 | 11/2024 | Park |

FOREIGN PATENT DOCUMENTS

| | | | |
|---|---|---|---|
| CN | 218867340 U | | 4/2023 |
| JP | 1989118302 A | | 5/1989 |
| JP | 11329398 A | | 11/1999 |
| JP | 2001-028274 A | | 1/2001 |
| JP | 200193579 A | | 4/2001 |
| JP | 2007227137 A | | 9/2007 |
| JP | 5206242 B2 | | 6/2013 |
| JP | 2014082055 A | * | 5/2014 |
| JP | 2015099777 A | | 5/2015 |
| JP | 2016001575 A | * | 1/2016 |
| KR | 1020050121914 A | | 12/2005 |
| KR | 10-2006-0022358 A | | 3/2006 |
| KR | 20150049519 A | | 5/2015 |
| KR | 10-2015-0063870 A | | 6/2015 |
| KR | 10-2016-0009406 A | | 1/2016 |
| KR | 20160009406 A | * | 1/2016 |
| KR | 10-2018-0116156 A | | 10/2018 |
| KR | 10-2020-0041625 A | | 4/2020 |
| KR | 20200041625 A | | 4/2020 |
| KR | 10-2446797 B | | 9/2022 |
| KR | 10-2023-0021583 A | | 2/2023 |
| WO | 2020096973 A1 | | 5/2020 |
| WO | 2021020119 A1 | | 2/2021 |
| WO | 2021192664 A1 | | 9/2021 |

OTHER PUBLICATIONS

Machine Translation of JP-2016001575-A (May 8, 2025) (Year: 2025).*

Machine Translation of KR-20160009406-A (May 8, 2025) (Year: 2025).*

* cited by examiner

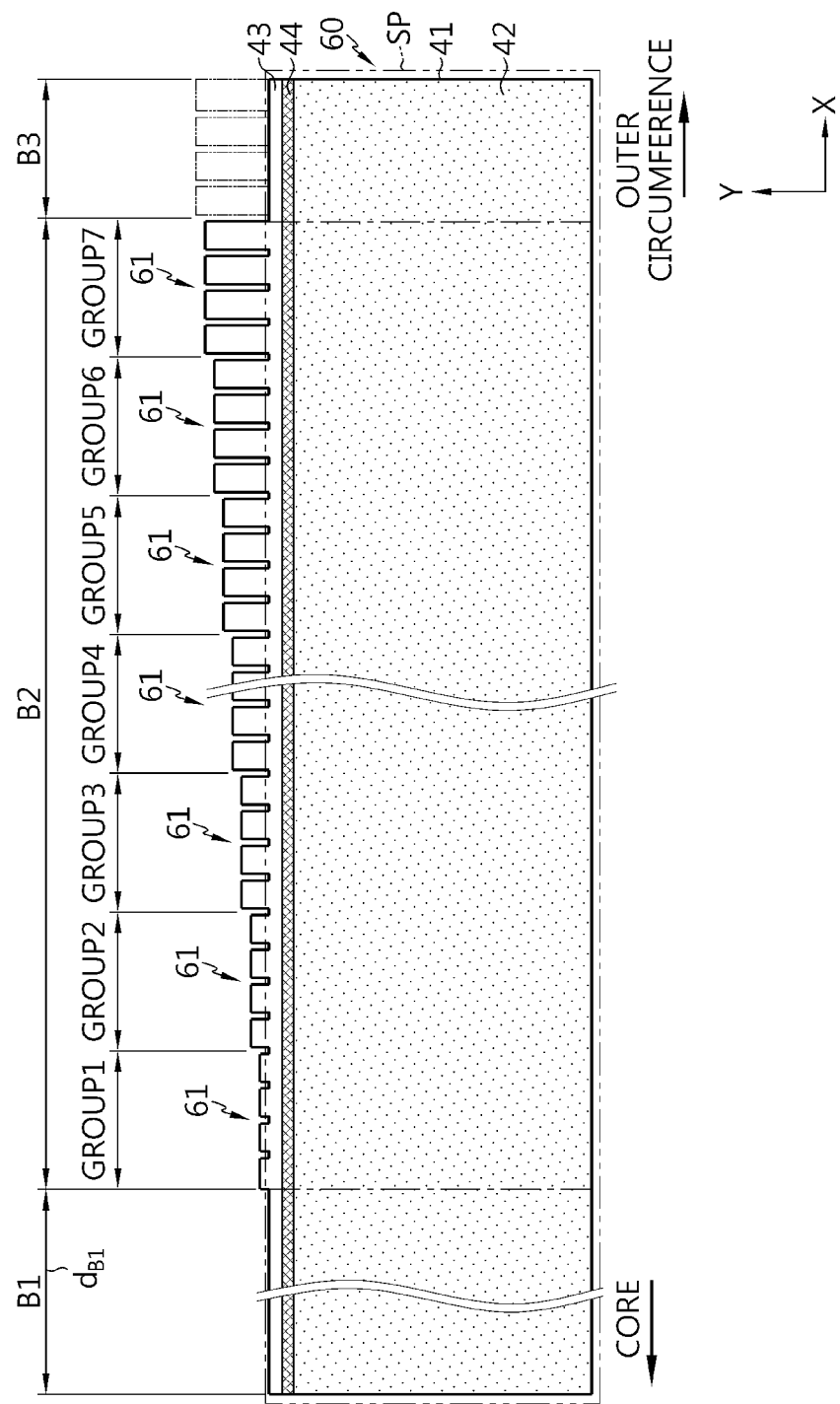

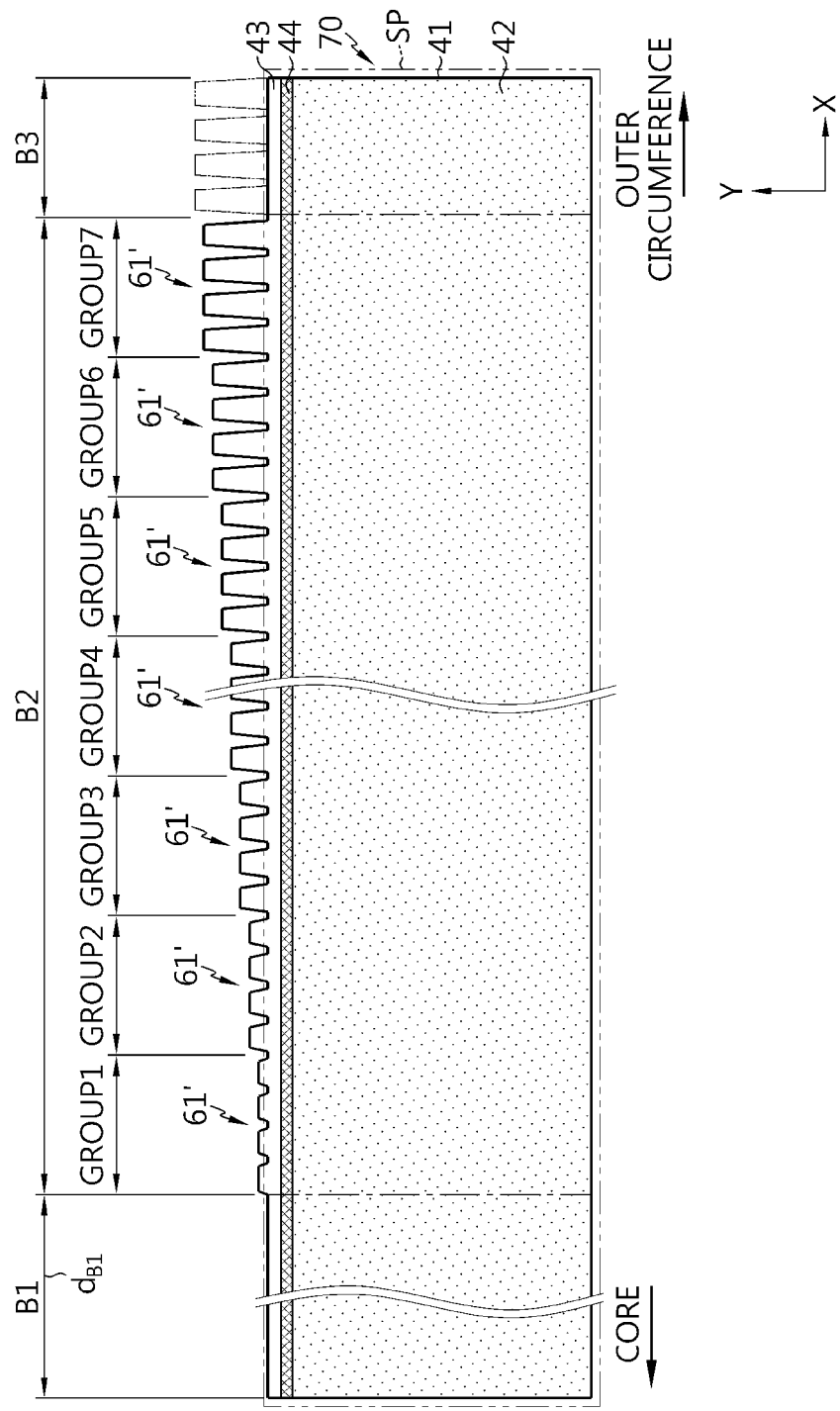

Example 1 (Negative Electrode)

ELECTRODE ASSEMBLY, CYLINDRICAL BATTERY CELL, AND BATTERY PACK AND VEHICLE INCLUDING THE SAME

TECHNICAL FIELD

The present application claims priority to Korean Patent Application No. 10-2021-0137939 filed on Oct. 15, 2021, Korean Patent Application No. 10-2021-0175085 filed on Dec. 8, 2021 and Korean Patent Application No. 10-2022-0089239 filed on Jul. 19, 2022 in the Republic of Korea. The present disclosure relates to an electrode assembly, a cylindrical battery cell, and a battery pack and a vehicle including the same.

BACKGROUND ART

Secondary batteries that are easily applicable to various product groups and have electrical characteristics such as high energy density are universally applied not only to portable devices but also to electric vehicles (EVs) or hybrid electric vehicles (HEVs) driven by an electric drive source.

These secondary batteries are attracting attention as a new energy source to improve eco-friendliness and energy efficiency because they have the primary advantage that they can dramatically reduce the use of fossil fuels as well as the secondary advantage that no by-products are generated from the use of energy.

Secondary batteries currently widely used in the art include lithium ion batteries, lithium polymer batteries, nickel cadmium batteries, nickel hydrogen batteries, nickel zinc batteries, and the like. A unit secondary battery cell, namely a unit battery cell, has an operating voltage of about 2.5V to 4.5V. Therefore, when a higher output voltage is required, a battery pack may be configured by connecting a plurality of battery cells in series. In addition, a plurality of battery cells may be connected in parallel to form a battery pack according to the charge/discharge capacity required for the battery pack. Accordingly, the number of battery cells included in the battery pack and the form of electrical connection may be variously set according to the required output voltage and/or charge/discharge capacity.

Meanwhile, as a kind of unit secondary battery cell, there are known cylindrical, rectangular, and pouch-type battery cells. In the case of a cylindrical battery cell, a separator serving as an insulator is interposed between a positive electrode and a negative electrode, and they are wound to form an electrode assembly in the form of a jelly roll, which is inserted into a battery can to configure a battery. In addition, a strip-shaped electrode tab may be connected to an uncoated portion of each of the positive electrode and the negative electrode, and the electrode tab electrically connects the electrode assembly and an electrode terminal exposed to the outside. For reference, the positive electrode terminal is a cap plate of a sealing body that seals the opening of the battery can, and the negative electrode terminal is the battery can. However, according to the conventional cylindrical battery cell having such a structure, since current is concentrated in the strip-shaped electrode tab coupled to the uncoated portion of the positive electrode and/or the uncoated portion of the negative electrode, the current collection efficiency is not good due to large resistance and large heat generation.

For small cylindrical battery cells with a form factor of 18650 or 21700, resistance and heat are not a major issue. However, when the form factor is increased to apply the cylindrical battery cell to an electric vehicle, the cylindrical battery cell may ignite while a lot of heat is generated around the electrode tab during the rapid charging process.

In order to solve this problem, there is provided a cylindrical battery cell (so-called tab-less cylindrical battery cell) in which the uncoated portion of the positive electrode and the uncoated portion of the negative electrode are designed to be positioned at the top and bottom of the jelly-roll type electrode assembly, respectively, and the current collecting plate is welded to the uncoated portion to improve the current collecting efficiency.

FIGS. 1 to 3 are diagrams showing a process of manufacturing a tab-less cylindrical battery cell. FIG. 1 shows the structure of an electrode plate, FIG. 2 shows a process of winding the electrode plate, and FIG. 3 shows a process of welding a current collecting plate to a bent surface of an uncoated portion.

Referring to FIGS. 1 to 3, a positive electrode plate 10 and a negative electrode plate 11 have a structure in which a sheet-shaped current collector 20 is coated with an active material 21, and include an uncoated portion 22 at one long side along the winding direction X.

An electrode assembly A is manufactured by sequentially stacking the positive electrode plate 10 and the negative electrode plate 11 together with two sheets of separators 12 as shown in FIG. 2 and then winding them in one direction X, herein referred to as the winding direction or winding direction (X), about an axis. At this time, the uncoated portions of the positive electrode plate 10 and the negative electrode plate 11 are arranged in opposite directions.

After the winding process, the uncoated portion 10a of the positive electrode plate 10 and the uncoated portion 11a of the negative electrode plate 11 are bent toward the core. After that, current collecting plates 30, 31 are welded and coupled to the uncoated portions 10a, 11a, respectively.

An electrode tab is not separately coupled to the positive electrode uncoated portion 10a and the negative electrode uncoated portion 11a, the current collecting plates 30, 31 are connected to external electrode terminals, and a current path is formed with a large cross-sectional area along the axis direction of electrode assembly A (see arrow), which has an advantage of lowering the resistance of the battery cell. This is because resistance is inversely proportional to the cross-sectional area of the path through which the current flows.

In the tab-less cylindrical battery cell, in order to improve the welding characteristics between the uncoated portions 10a, 11a and the current collecting plates 30, 31, a strong pressure must be applied to the welding regions of the uncoated portions 10a, 11a to bend the uncoated portions 10a, 11a as flat as possible.

However, when the welding regions of the uncoated portions 10a, 11a are bent, the shapes of the uncoated portions 10a, 11a may be irregularly distorted and deformed. In this case, the deformed portion may come into contact with the electrode plate of opposite polarity to cause an internal short circuit or cause micro cracks in the uncoated portions 10a, 11a. In addition, as the uncoated portion 32 adjacent to the core of the electrode assembly A is bent, all or a significant portion of the cavity 33 in the core of the electrode assembly A is blocked. In this case, it causes a problem in the electrolyte injection process. That is, the cavity 33 in the core of the electrode assembly A is used as a passage through which an electrolyte is injected. However, if the corresponding passage is blocked, electrolyte injection is difficult. In addition, while an electrolyte injector is being inserted into the cavity 33, the electrolyte injector may interfere with the uncoated portion 32 near the core, which may cause the uncoated portion 32 to tear.

In addition, the bent portions of the uncoated portions 10a, 11a to which the current collecting plates 30, 31 are welded should be overlapped in multiple layers and there should not be any empty spaces (gaps). In this way, sufficient welding strength may be obtained, and even with the latest technology such as laser welding, it is possible to prevent laser from penetrating into the electrode assembly A and melting the separator or the active material.

Meanwhile, in the conventional tab-less cylindrical battery cell, the positive electrode uncoated portion 10a is formed entirely on the upper portion of the electrode assembly A. Therefore, when the outer circumference of the top of the battery can is pressed inward to form a beading portion, a top edge area 34 of the electrode assembly A is compressed by the battery can. This compression may cause a partial deformation of the electrode assembly A, which may tear the separator 12 and cause an internal short circuit. If a short circuit occurs inside the battery, it may cause heating or explosion of the battery.

The conventional separator employed a coating layer containing inorganic particles to improve the heat shrinkage characteristics of the porous polymer substrate, but at this time, it was a single-sided inorganic coating separator that employed a coating layer on only one side of the porous polymer substrate. Since this inorganic coating separator is configured so that one side is the fabric and the other side is an inorganic (ceramic) coating layer when facing the electrode in the jelly-roll (J/R), the impregnation characteristic for the electrolyte is asymmetric. Due to this electrolyte impregnation asymmetry, there was a management problem of matching the separator when designing the positive and negative electrodes, and there was a problem of cost increase because the pressure/vacuum conditions had to be increased when the electrolyte was impregnated with the jelly-roll, and there was also a problem with the performance degradation.

In addition, the conventional single-sided inorganic coating separator has a large shrinkage at a high temperature of 130° C. or higher, since one side of the separator made of the fabric is exposed and has a limit in heat resistance. As a result, when a thermal shock (at 130° C. or above) occurs, internal electrode short-circuit is caused due to separator shrinkage, and the risk of ignition increases when the internal temperature of the cell increases due to abnormal reactions (overcharge, external short circuit).

In addition, after assembling an unnotched jelly-roll, since an internal and external closed structure is formed by folding the foil, which is a current collector, when an electrolyte is injected, the electrolyte moving to the electrode in the jelly-roll is interfered, which shows ununiform electrolyte impregnation characteristic. It is found that this is caused by the occurrence of a non-uniform electrolyte impregnation path during electrolyte impregnation. Accordingly, there is a problem in that an unstable solid electrolyte interface (SEI) layer is formed due to an increase in cell-to-cell variation caused by the decrease in impregnation uniformity, and resistance dispersion is increased.

DISCLOSURE

Technical Problem

The present disclosure is designed to solve the problems of the related art, and therefore the present disclosure is directed to providing an electrode assembly having an improved impregnation characteristic.

The present disclosure is also directed to providing an electrode assembly having an improved uncoated portion structure to relieve stress applied to the uncoated portion when bending the uncoated portion exposed at both ends of the electrode assembly The present disclosure is also directed to providing an electrode assembly in which an electrolyte injection passage is not blocked even if the uncoated portion is bent.

The present disclosure is also directed to providing an electrode assembly including a structure that may prevent a top edge of the electrode assembly from contacting an inner surface of a battery can when the top of the battery can is beaded.

The present disclosure is also directed to providing an electrode assembly with improved energy density and reduced resistance.

The present disclosure is also directed to providing a cylindrical battery cell including the electrode assembly having an improved structure, a battery pack including the cylindrical battery cell, and a vehicle including the battery pack.

The technical objects to be solved by the present disclosure are not limited to the above, and other objects not mentioned herein will be clearly understood by those skilled in the art from the following disclosure.

Technical Solution

In one aspect of the present disclosure, there is provided an electrode assembly which can solve the above-mentioned technical problems.

According to the first embodiment of the present disclosure, there is provided an electrode assembly comprising: a first electrode, a second electrode, and a separator between the first electrode and the second electrode, wherein the first electrode, the second electrode, and the separator are together wound about an axis in one winding direction to have a plurality of winding turns, wherein each of the first electrode and the second electrode comprises a first side and a second side opposite the first side in a direction of the axis, wherein each of the first electrode and the second electrode further comprises a first, electrode active material portion, coated with an electrode active material, extending from the second side in the direction of the first side, and a second, uncoated portion extending from the first side in the direction of the second side to the active material of the first portion, wherein the first side of the first and the second electrodes is divided into a plurality of segments by a cut groove having a predetermined length, wherein each of the segments has a first end corresponding to the first side of the first and second electrodes, wherein one or more of the segments are bent in a radial direction relative to the axis, at a point below the first end in each segment, and wherein the separator has a side that is positioned between the bending point of each bent segment and a boundary between the first and the second portions.

According to the second embodiment of the present disclosure, there is provided the electrode assembly as defined in the first embodiment, wherein the separator is positioned such that a notching valley of each cut groove is not exposed.

According to the third embodiment of the present disclosure, there is provided the electrode assembly as defined in the first embodiment, wherein a base line is represented by a straight line extending in the winding direction coincident with a notching valley of each cut grooves.

According to the fourth embodiment of the present disclosure, there is provided the electrode assembly as defined in the third embodiment, wherein a length from the first end of each segment to the base line is variable.

According to the fifth embodiment of the present disclosure, there is provided the electrode assembly as defined in the third embodiment, wherein based on there being a plurality of bent segments, segments in adjacent winding turns overlap in the radial direction to form a surface region at a top end or a bottom end of the electrode assembly, and wherein based on a shortest distance between a highest point of the surface region and the base line being a height (Hsa) of the surface region, the side of the separator is located above the base line at a distance from the base line that is no greater than 90% of the height (Hsa) or the side of the separator is located below the base line.

According to the sixth embodiment of the present disclosure, there is provided the electrode assembly as defined in the first embodiment, wherein the second, uncoated portion includes a core-side uncoated portion adjacent to a core of the electrode assembly, a circumferential uncoated portion adjacent to an outer circumferential surface of the electrode assembly, and an intermediate uncoated portion interposed between the core-side uncoated portion and the circumferential uncoated portion, and at least one of the core-side uncoated portion and the circumferential uncoated portion has a relatively shorter length from the base line to the first side than the intermediate uncoated portion.

According to the seventh embodiment of the present disclosure, there is provided the electrode assembly as defined in the sixth embodiment, wherein the core-side uncoated portion has a relatively shorter length from the base line to the first side than the intermediate uncoated portion and the circumferential uncoated portion.

According to the eighth embodiment of the present disclosure, there is provided the electrode assembly as defined in the sixth embodiment, wherein the first side of the core-side uncoated portion and the base line coincide with each other.

According to the ninth embodiment of the present disclosure, there is provided the electrode assembly as defined in the sixth embodiment, wherein the core-side uncoated portion includes an uncoated portion corresponding to an innermost winding turn of the electrode assembly, and the circumferential uncoated portion includes an uncoated portion corresponding to an outermost winding turn of the electrode assembly.

According to the tenth embodiment of the present disclosure, there is provided the electrode assembly as defined in the sixth embodiment, wherein all or at least a partial region of the intermediate uncoated portion is divided into a plurality of segments.

According to the eleventh embodiment of the present disclosure, there is provided the electrode assembly as defined in the first embodiment, wherein a distance between the bending point and the side of the separator is greater than or equal to 0.1 mm.

According to the twelfth embodiment of the present disclosure, there is provided the electrode assembly as defined in the first embodiment, wherein the side of the separator is positioned between the bending point and a base line, or positioned below the base line in the axis direction, and wherein the base line is represented by a straight line extending in a winding direction (X) at a height corresponding to a notching valley of cut grooves dividing the plurality of segments.

According to the thirteenth embodiment of the present disclosure, there is provided the electrode assembly as defined in the twelfth embodiment, wherein a bent segment is a segment that is bent among the segments and a shortest bent segment is a segment that has a shortest length among the plurality of bent segments, wherein the side of the separator is located above the base line and at a distance from the base line that is no greater than 50% of the total length of the shortest bent segment, or the side of the separator is located below the base line and at a distance from the base line that is no greater than 30% of the total length of the shortest bent segment, and wherein the total length of the shortest bent segment is the length from the base line corresponding to the shortest bent segment to the first end of the shortest bent segment.

According to the fourteenth embodiment of the present disclosure, there is provided the electrode assembly as defined in the thirteenth embodiment, wherein the length from bending point to base line of the shortest bent segment is greater than or equal to 2 mm.

According to the fifteenth embodiment of the present disclosure, there is provided the electrode assembly as defined in the thirteenth embodiment, it further comprise at least one segment (segment A) having a height less than the shortest bent segment, otherwise the shortest bent segment is the segment having a minimum height, wherein segment height means a shortest length from the base line to the first end.

According to the sixteenth embodiment of the present disclosure, there is provided the electrode assembly as defined in the sixth embodiment, wherein at least a partial region of the intermediate uncoated portion is configured to have a height in the winding axis direction, which increases stepwise from the core to the outer circumference.

According to the seventeenth embodiment of the present disclosure, there is provided the electrode assembly as defined in the first embodiment, wherein at least one of segment height and segment width increases stepwise in the winding direction from the core to the outer circumference individually or in groups.

According to the eighteenth embodiment of the present disclosure, there is provided the electrode assembly as defined in the first embodiment, wherein each of the plurality of segments satisfies at least one of the following conditions: a width of 1 mm to 6 mm in the winding direction; a height of 2 mm to 10 mm in the axis direction; and a separation pitch of 0.05 mm to 1 mm in the winding direction.

According to the nineteenth embodiment of the present disclosure, there is provided the electrode assembly as defined in the first embodiment, wherein the plurality of segments satisfy a separation pitch condition of 0.05 mm to 1 mm in the winding direction, the separation pitch is defined as a distance between corners of two segments adjacent to each other, and wherein round reinforcing portions are formed to the corners of the segments adjacent to each other.

According to the twentieth embodiment of the present disclosure, there is provided the electrode assembly as defined in the first embodiment, wherein the separator comprises a porous polymer substrate; and a porous coating layer located on at least one surface of the porous polymer substrate, wherein the porous coating layer comprises a plurality of inorganic particles and binder polymer.

According to the twenty first embodiment of the present disclosure, there is provided the electrode assembly as defined in the twentieth embodiment, wherein the inorganic particles comprise inorganic particles having a hydrophilic property.

In another aspect of the present disclosure, there is provided a cylindrical battery cell. According to the twenty second embodiment of the present disclosure, there is provided a cylindrical battery cell, comprising an electrode assembly as defined in the first embodiment, the battery cell comprising: a battery can configured to accommodate the electrode assembly and electrically connected to one of the first electrode and the second electrode to have a first polarity;
  a sealing body configured to seal an open end of the battery can; and
  a terminal electrically connected to the other of the first electrode and the second electrode to have a second polarity and configured to have a surface exposed to the outside,
  wherein the separator comprises a porous polymer substrate; and a porous coating layer located on both surfaces of the porous polymer substrate and comprising inorganic particles and a binder polymer.

In another aspect of the present disclosure, there is provided a battery pack. According to the twenty third embodiment of the present disclosure, there is provided a battery pack, comprising at least one battery cell as defined in the twenty second embodiment, In another aspect of the present disclosure, there is provided a vehicle. According to the twenty forth embodiment of the present disclosure, there is provided a vehicle, comprising at least one battery pack as defined in the twenty third.

Advantageous Effects

According to an embodiment of the present disclosure, since the uncoated portions themselves protruding from the upper and lower portions of the electrode assembly are used as electrode tabs, it is possible to reduce the internal resistance of the battery cell and increase the energy density.

According to another embodiment of the present disclosure, since the structure of the uncoated portion of the electrode assembly is improved so that the electrode assembly does not interfere with the inner circumference of the battery can in the process of forming the beading portion of the battery can, it is possible to prevent a short circuit in the cylindrical battery cell caused by partial deformation of the electrode assembly.

According to still another embodiment of the present disclosure, since the structure of the uncoated portion of the electrode assembly is improved, it is possible to prevent the uncoated portion from being torn when the uncoated portion is bent, and the number of overlapping layers of the uncoated portions is sufficiently increased to improve welding strength.

According to still another embodiment of the present disclosure, since the structure of the uncoated portion adjacent to the core of the electrode assembly is improved, it is possible to prevent the cavity in the core of the electrode assembly from being blocked when the uncoated portion is bent. Thus, the electrolyte injection process and the process of welding the battery can (or rivet terminal) and the current collecting plate may be carried out easily.

According to still another embodiment of the present disclosure, it is possible to provide a cylindrical battery cell having a structure that has a low internal resistance, prevents internal short circuit and improves welding strength of the current collecting plate and the uncoated portion, and a battery pack and a vehicle including the cylindrical battery cell.

In addition, the present disclosure may have several other effects, and such effects will be described in each embodiment, or any description that can be easily inferred by a person skilled in the art will be omitted for an effect.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 7a is a plan view showing a structure of an electrode plate according to the fourth embodiment of the present disclosure.

FIG. 9a is a plan view showing a structure of an electrode plate according to the fifth embodiment of the present disclosure.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

In addition, in order to help understanding of the invention, in the accompanying drawings, some components may not be drawn to scale, but their dimensions may be exaggerated. Also, the same reference numbers may be assigned to the same components in different embodiments.

For convenience of description, in this specification, a direction along a length direction of a winding axis of an electrode assembly wound in a jelly-roll shape is referred to as an axial direction (Y). In addition, a direction surrounding the winding axis is referred to as a circumferential direction or a peripheral direction (X). In addition, a direction getting closer to or away from the winding axis is called a radius direction or a radial direction (Z). Among them, the direction getting closer to the winding axis is called a centripetal direction, and the direction getting away from the winding axis is called a centrifugal direction.

First, an electrode assembly according to an embodiment of the present disclosure will be described.

The electrode assembly comprises a first electrode, a second electrode, and a separator between the first electrode and the second electrode, and the first electrode, the second electrode, and the separator are together wound about an axis in one direction to have a plurality of winding turns. In addition, each of the first electrode and the second electrode comprises a first side and a second side opposite the first side in a direction of the axis.

According to one embodiment of the present invention, each of the first and the second electrode has a sheet shape of rectangle. In addition, each of the first and the second electrode has an aspect ratio exceeding 1.

Figure 4:
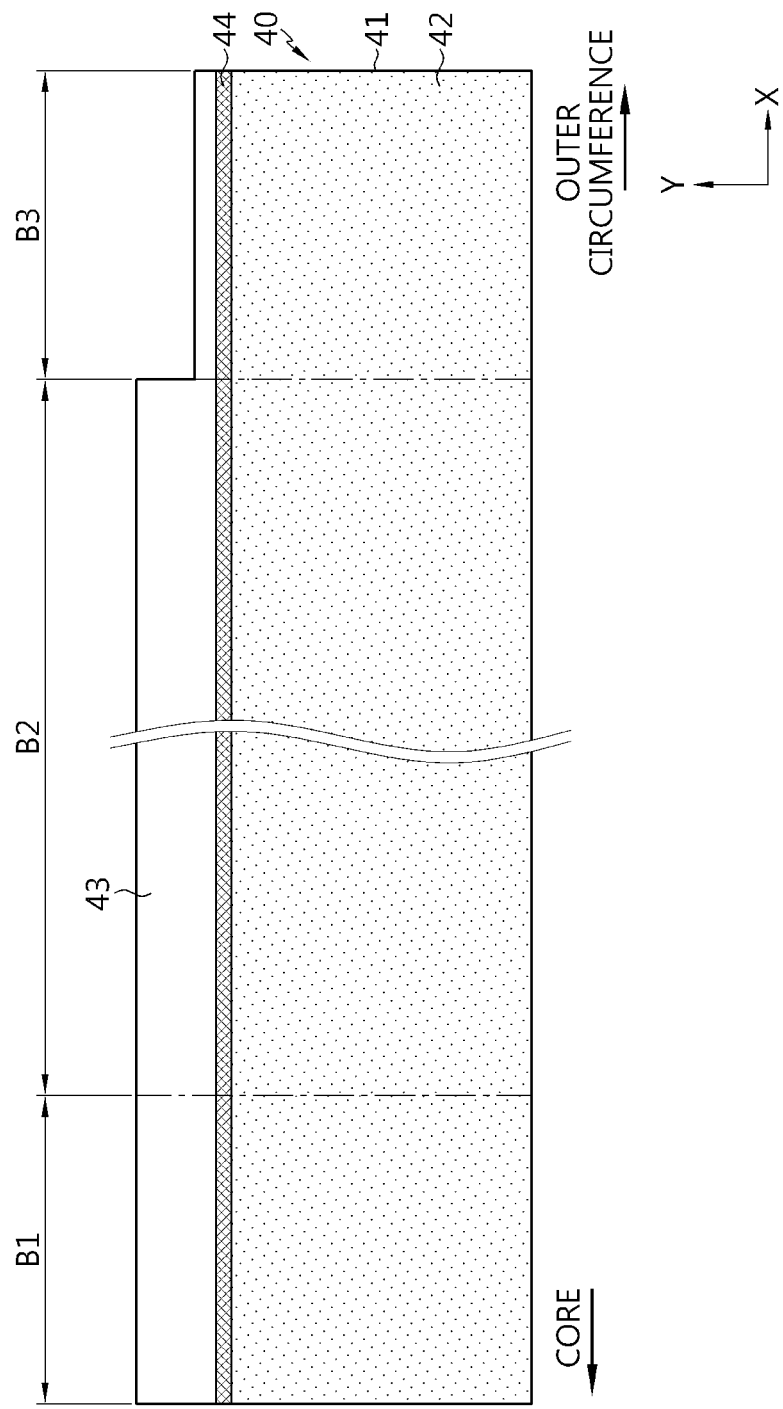
FIG. 4 is a plan view showing a structure of an electrode plate according to the first embodiment of the present disclosure.

FIG. 4 is a plan view showing a structure of an electrode plate 40 according to the first embodiment of the present disclosure.

Referring to FIG. 4, the first side is a side formed along the uppermost end of the electrode active material part 42 in the axis direction (Y), and the second side is a side formed along the lowermost end portion of the uncoated portion 43 in the axis direction (Y).

Each of the first electrode and the second electrode independently comprises a first portion that is an electrode active material portion coated with an electrode active material on at least one surface or both surfaces. The first portion extends from the second side in the direction of the first side by a predetermined length.

FIG. 4 shows the shape of the electrode before the electrode assembly is wound. Referring to this, the electrode active material portion may have a constant width over the entire length of the electrode plate from the second side to the portion where the uncoated portion starts in the axial direction.

The second portion is an uncoated portion on which the electrode active material is not coated. The second portion is provided for forming electrode tab(s), and the second portion is extending from the first side in the direction of the second side to the active material of the first portion.

In one embodiment of the present invention, at least partial region according to a winding direction of the uncoated portion is divided into a plurality of segment to a predetermined depth by a cut groove (not shown).

Each of the segments has a first end corresponding to the first side. In one embodiment of the present invention, all or at least part of the segment is radially bent with respect to the axis at a bending point that is a predetermined point below the first end of each segment, wherein one side of the separator is located between the bending point and a boundary between the first and the second portion. According to a more specific embodiment of the present invention, the one side of the separator may be located between the bending point and the base line, or located below the base line in the axial direction.

Thus, according to the above-described embodiments of the present invention, the bending point may be at a certain point between the first end and the base line.

As described above, in the current collector of the present invention, the uncoated portion comprises a plurality of segments and in this case, the separator may be positioned such that the notching valleys of the cut grooves between the segments are not exposed as they are covered by the separator. The location of the separator will be described in more detail below.

In the present invention, each of the segment may have a different height of the first end, a shape of each of the cut grooves may be different, and the height of the notching valley of the cut grooves may be different. That is, the shape and size of the segment themselves and the shape and size of the cut grooves themselves may be different from each other.

Meanwhile, the height of the segment may be defined as a length (C2, D2) from the notching valley of the cut groove to the first end in an axis direction, and the cut groove may defines each of the segment. If the heights of the notching valley of the cut grooves on both sides are different with respect to the segment, the height of the segment may be defined as an axial distance from a point corresponding to the average height of the notching valley of the cut grooves on both sides to the first end of the segment.

Meanwhile, according to the present invention, the base line is a virtual straight line extending in a winding direction (X) with a height corresponding to notching valley of the cut grooves.

Each of the first and second electrode may independently comprises a current collector which is a conductive thin film, and an electrode active material layer disposed on one or both surfaces of the current collector. The active material layer forms a first portion of each electrode.

The first and second electrode having the sheet shape may have an aspect ratio of greater than 1. In this case, the uncoated portion is disposed at a long side of an electrode in the winding direction (X). At least a part of the uncoated region is used as an electrode tab by itself.

According to one embodiment of the present invention, the uncoated portion includes a core-side uncoated portion adjacent to a core of the electrode assembly, a circumferential uncoated portion adjacent to an outer circumferential surface of the electrode assembly, and an intermediate uncoated portion interposed between the core-side uncoated portion and the circumferential uncoated portion. Preferably, at least one of the core-side uncoated portion and the circumferential uncoated portion has a relatively smaller height than the intermediate uncoated portion.

Meanwhile, for convenience of explanation, the word 'height' means a length (distance) from at a position in winding direction (X) to the first end. In the present invention, in describing the height of the uncoated portion/notching valley, rather than an absolute value of the height of the uncoated portion/notching valley, a relative value of the height measured at different positions in the winding direction has meaning, so in measuring the height of the uncoated portion/notching valley, the regulation on the line (zero point), which is the standard for measuring the height, will be omitted.

In one embodiment of the present invention, the height of the uncoated portion may be a relative distance at a specific point based on an arbitrary perpendicular line to the axis direction (Y-direction). For example, a line (zero point) that is a reference for measuring the height may be the second side.

On the other hand, more specifically, with respect to the height of the uncoated portion, in the section where the segment is not formed, it means the distance to the first side, and in the section in which the segment is formed, the first side refers to a position corresponding to the first end of the segment. In addition, the portion constituting the cut groove between the segments is not considered when measuring the height of the uncoated portion in the section where the fragments are formed.

In addition, the height of the notching valley is measured based on the portion having the lowest height among the cut grooves.

Referring to FIG. 4, the electrode plate 40 of the first embodiment includes a current collector 41 made of metal foil and an active material portion 42. The metal foil may be aluminum or copper, and is appropriately selected according to the polarity of the electrode plate 40. The active material portion 42 is formed on at least one surface of the current collector 41, and an uncoated portion 43 is disposed at the long side end of the current collector in the winding direction X. The uncoated portion 43 is an area where the active material is not coated. An insulating coating layer 44 may be formed at a boundary between the active material portion 42 and the uncoated portion 43. The insulating coating layer 44 is formed such that at least a part thereof overlaps with the boundary between the active material portion 42 and the uncoated portion 43. The insulating coating layer 44 may include a polymer resin and may include an inorganic material such as $Al_2O_3$.

The uncoated portion 43 comprises a core-side uncoated portion B1 adjacent to the core side of the electrode assembly, a circumferential uncoated portion B3 adjacent to the outer circumference side of the electrode assembly, and an intermediate uncoated portion B2 interposed between the core-side uncoated portion B1 and the circumferential uncoated portion B3.

The core-side uncoated portion B1, the circumferential uncoated portion B3 and the intermediate uncoated portion B3 may be defined as an uncoated portion of a region adjacent to the core, an uncoated portion of a region adjacent to the outer circumference, and an uncoated portion of a remaining region excluding the above, respectively, when the electrode plate 40 is wound into a jelly-roll type electrode assembly. The boundary of B1/B2 may be suitably defined as a point at which the height (or, change pattern) of the uncoated portion substantially changes from the core of the electrode assembly to the outer circumference, or a certain percentage (%) point based on the radius of the electrode assembly (e.g., 5% point, 10% point, 15% point of the radius, etc.). The boundary of B2/B3 is a point at which the height (or, change pattern) of the uncoated portion substantially changes from the outer circumference of the electrode assembly to the core, or a certain percentage (%) point based on the radius of the electrode assembly (e.g., 85% point, 90% point, 95% point of the radius, etc.). When the boundary of B1/B2 and the boundary of B2/B3 are specified, the intermediate uncoated portion B2 may be specified automatically. If only the boundary of B1/B2 is specified, the boundary of B2/B3 may be appropriately selected at a point near the circumference of the electrode assembly. Conversely, if only the boundary of B2/B3 is specified, the boundary of B1/B2 may be appropriately selected at a point near the core of the electrode assembly. In the first embodiment, the height of the uncoated portion 43 is not constant and there is a relative difference in the winding direction X. That is, the height (length in the Y-axis direction) of the circumferential uncoated portion B3 is relatively smaller than that of the core-side uncoated portion B1 and the intermediate uncoated portion B2.

Figure 5:
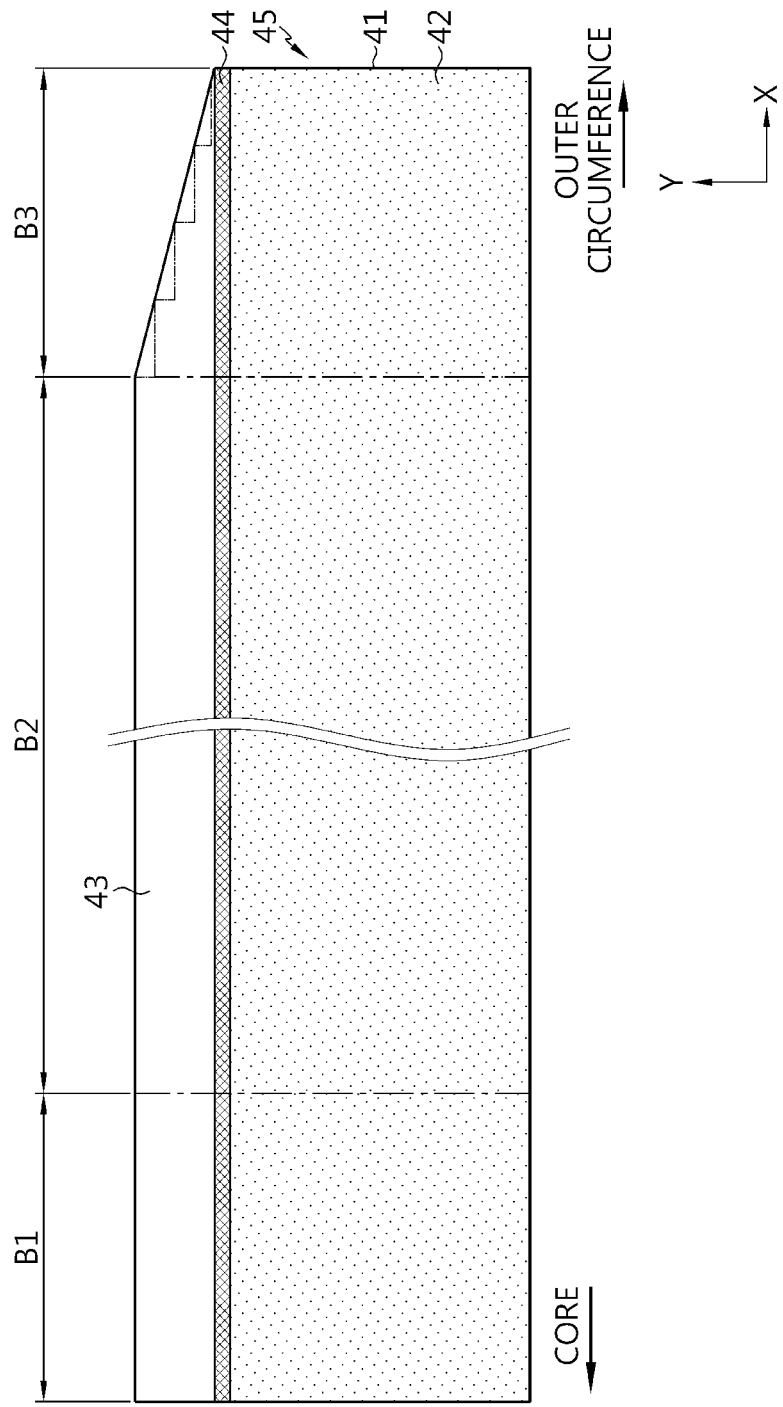
FIG. 5 is a plan view showing a structure of an electrode plate according to the second embodiment of the present disclosure.

FIG. 5 is a plan view showing a structure of an electrode plate 45 according to the second embodiment of the present disclosure.

Referring to FIG. 5, the electrode plate 45 of the second embodiment differs from that of the first embodiment only in that the height of the circumferential uncoated portion B3 gradually decreases toward the outer circumference, and the other configuration is substantially the same.

In one modification, the circumferential uncoated portion B3 may be transformed into a step shape (see dotted lines) in which the height is decreased stepwise. In one embodiment of the present invention, in the electrode according to the second embodiment, at least a region of the uncoated portion is divided into a plurality of segment by a cut groove having a predetermined depth (not shown).

Figure 6:
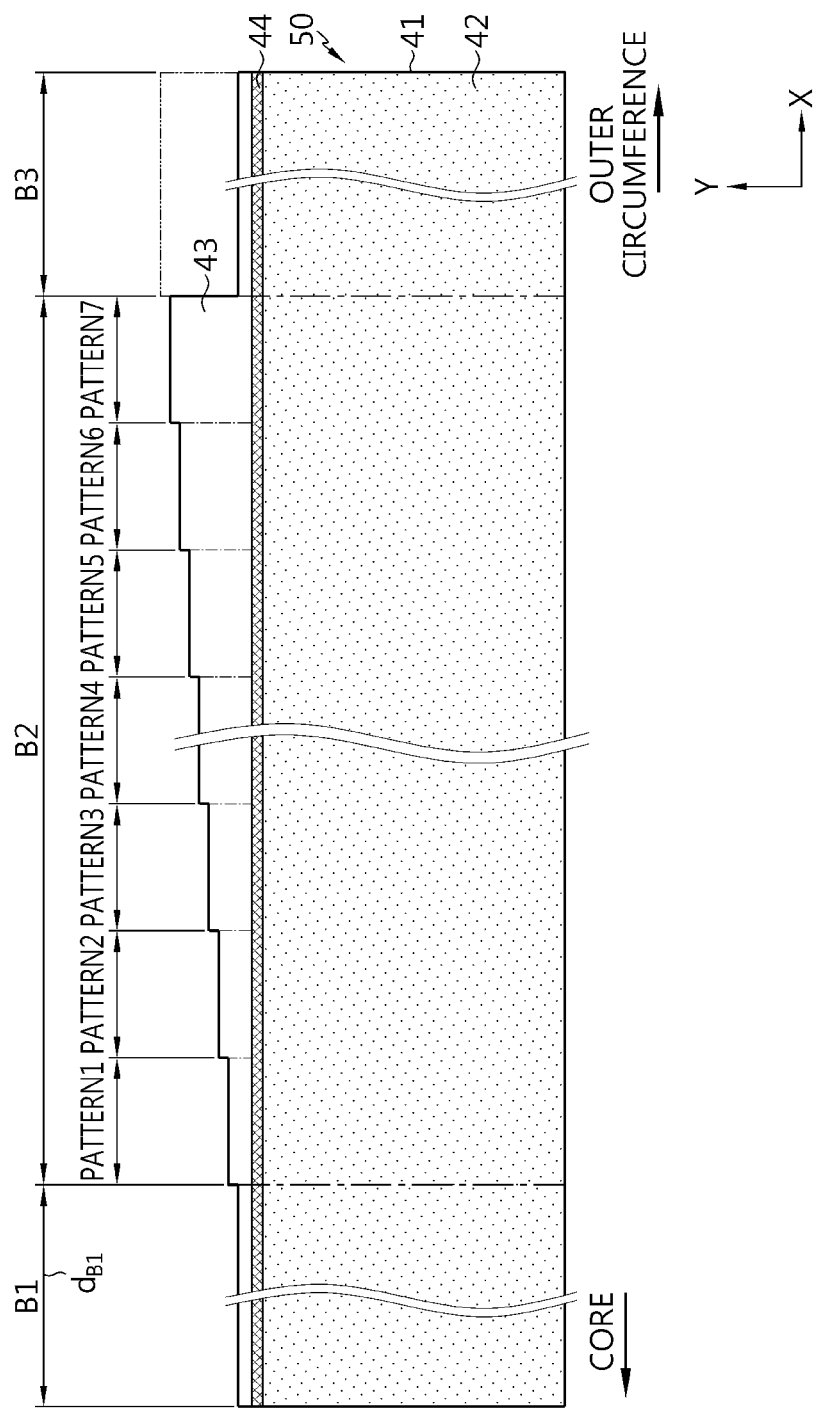
FIG. 6 is a plan view showing a structure of an electrode plate according to the third embodiment of the present disclosure.

FIG. 6 is a plan view showing a structure of an electrode plate 50 according to the third embodiment of the present disclosure.

Referring to FIG. 6, in the electrode plate 50 of the third embodiment, the heights of the core-side uncoated portion B1 and the circumferential uncoated portion B3 are relatively smaller than that of the intermediate uncoated portion B2. In addition, the heights of the core-side uncoated portion B1 and the circumferential uncoated portion B3 may be the same or different from each other.

Preferably, the height of the intermediate uncoated portion B2 may have a step shape that increases stepwise from the core to the outer circumference.

Patterns 1 to 7 classify the intermediate uncoated portion B2 based on the position where the height of the uncoated portion 43 changes. Preferably, the number of patterns and the height (length in the Y-axis direction) and width (length in the X-axis direction) of each pattern may be adjusted to disperse stress as much as possible during the bending process of the uncoated portion 43. The stress dispersion is to prevent the uncoated portion 43 from being torn.

The width ($d_{B1}$) of the core-side uncoated portion B1 is designed by applying a condition that does not cover the cavity in the core of the electrode assembly when the patterns of the intermediate uncoated portion B2 are bent toward the core.

In one embodiment of the present invention, in the electrode according to the third embodiment, at least a region of the uncoated portion of patterns 1 to 7 is divided into a plurality of segment by a cut groove having a predetermined depth (not shown).

In one example, the width ($d_{B1}$) of the core-side uncoated portion B1 may increase in proportion to the length from the base line to the first end of Pattern 1 or a height of the segment of the Pattern 1. In a specific example, when the electrode plate 60 is used to manufacture an electrode assembly of a cylindrical cell having a form factor of 46800, the width ($d_{B1}$) of the core-side uncoated portion B1 is set to 180 to 350 mm according to the diameter of the core of the electrode assembly.

In an embodiment, the width of each pattern may be designed to constitute the same winding turn of the electrode assembly.

In one modification, the height of the intermediate uncoated portion B2 may have a step shape that increases and then decreases from the core to the outer circumference.

In another modification, the circumferential uncoated portion B3 may be modified to have the same structure as the second embodiment.

In still another modification, the pattern structure applied to the intermediate uncoated portion B2 may be expanded to the circumferential uncoated portion B3 (see a dotted line).

FIG. 7a is a plan view showing a structure of an electrode plate 60 according to the fourth embodiment of the present disclosure. FIG. 7a shows that a segment was formed in the entire intermediate uncoated portion.

Referring to FIG. 7a, in the electrode plate 60 of the fourth embodiment, the heights of the core-side uncoated portion B1 and the circumferential uncoated portion B3 are relatively smaller than that of the intermediate uncoated portion B2. In addition, the height of the core-side uncoated portion B1 and the circumferential uncoated portion B3 may be the same or different.

Preferably, at least a partial region of the intermediate uncoated portion B2 may include a plurality of segments 61. The plurality of segments 61 may increase in height stepwise from the core to the outer circumference.

In the present disclosure, all or at least a part of the segments are bent in a radial direction (winding center direction) of the electrode assembly or in a direction opposite to the radial direction. The segments may be bent at a position which is a spaced apart from a notching valley (bottom of the cut groove) upward by a predetermined height. According to the present invention, a bending part is a point where the inclination of the tangent line starts to be less than 450 among the portions generated by bending the segment in the direction of the winding center by an external force. The inclination of the tangent line means an angle between the tangent line to the bent portion and a plane perpendicular to the winding axis of the electrode assembly. Meanwhile, a bending line means a line parallel to the base line and includes the bending part.

Meanwhile, the present invention, the height of the segments may be equal or different from each other.

If the height of the notching valleys are equal, the base line is a straight line extending in a winding direction (X) with a height corresponding to notching valleys of the cut grooves.

If most of the notching valley of the cut grooves are located at a specific height and only heights of notching valley of some cut grooves are different from the specific height, the base line is determined as the height corresponding to the specific height. For example, when 50% or more of the notching valley are located at a specific height, the base line may be determined as a height corresponding to the heights of the notching valley. Or, the base line may be determined based on the height of the notching valley of the cut groove, which occupies the most length in the winding direction. For example, if about ⅔ of the total length occupied by the notching valley of the cut grooves in the winding direction has a first height and the heights of the notching valley of the cut grooves corresponding to the remaining ⅓ of the total length occupied by the notching valley of the cut grooves in the winding direction are different from the first height, the base line may be defined as the position corresponding to the first height.

If the heights of the notching valley of the cut grooves are not concentrated at a specific height (the most concentrated cut groove is less than 50%), the base line may be determined as the height averaged by the heights of the bottoms of the cut grooves. For example, if the length occupied by height x of the notching valley of the cut grooves in the winding direction is 30%, the length occupied by height y of the notching valley of the cut grooves in the winding direction is 30%, and the length occupied by height z of the notching valley of the cut grooves in the winding direction is 40%, the base line may be at a position of x*0.3+y*0.3+z*0.4. The height of the notching valley may be a relative distance at a specific point based on an arbitrary perpendicular line to the axis direction (Y direction). For example, the height of the notching valley may be based on a distance from the second side to the notching valley.

In an embodiment of the present disclosure, the bent portion may be located about 2 mm to 3 mm above the notching valley and may be arranged parallel to the base line.

Meanwhile, in one embodiment of the present invention, the base line may be the same as or different from a line extending in the winding direction (X) from a point having the smallest height among the uncoated portion. In one embodiment, the base line may be the same as a line extending in a winding direction from a point having a minimum height among the uncoated portion.

The segment 61 may be formed by laser notching. The segment 61 may be formed by a known metal foil cutting process such as ultrasonic cutting or punching.

In the fourth embodiment, in order to prevent the active material portion 42 and/or the insulating coating layer 44 from being damaged during bending of the uncoated portion 43, it is preferable to provide a predetermined gap between the notching valley between the segments 61 and the active material portion 42. This is because stress is concentrated near the bottom of the cut line when the uncoated portion 43 is bent. The gap is preferably 0.2 to 4 mm. If the gap is adjusted within the corresponding numerical range, it is possible to prevent the active material portion 42 and/or the insulating coating layer 44 from being damaged near the bottom of the cut line by the stress generated during bending of the uncoated portion 43. In addition, the gap may prevent the active material portion 42 and/or the insulating coating layer 44 from being damaged due to tolerances during notching or cutting of the segments 61. Preferably, when the electrode plate 60 is wound into the electrode assembly, at least a portion of the insulating coating layer 44 may be exposed to the outside of the separator. In this case, the insulating coating layer 44 may support the notching valley when the segments 61 are bent.

The gap between the notching valley of the segment and the active material layer may preferably be 1.0 mm or more. This may be more effective when the corresponding electrode is a negative electrode.

The gap between the notching valley of the segment and the active material layer may be more preferably 2.0 mm or more. This may be more effective when the corresponding electrode is a positive electrode.

A gap smaller than the above range may not sufficiently exhibit the above-described damage preventing effect, and a cap larger than the above range may result in a decrease in only the electrode capacity without increasing the damage preventing effect.

A boundary region between the uncoated portion region not coated with the active material layer and the region coated with the active material layer may be covered by an insulating layer, and at this time, a predetermined gap may also be provided between the notching valley of the segment and the insulating layer.

This gap may be 0.2 mm to 1.5 mm.

A gap smaller than the above range may not sufficiently exhibit the above-described damage preventing effect, and a cap larger than the above range may result in reducing the segment bending support effect of the insulating coating layer without increasing the damage preventing effect.

The plurality of segments 61 may form a plurality of segment groups from the core to the outer circumference. The width, height and separation pitch of segments belonging to the same segment group may be substantially the same.

In FIGS. 7a and 9a, a separator SP facing the active material portion 42 and/or the insulating coating layer 44 of the electrode plate 60 of the fourth embodiment may be provided to form an electrode assembly.

Referring to FIGS. 7b, 7c, 8, 9b, and 9c, a point at which the end of the separator, herein referred to as the one side of the separator, is located on the uncoated portion of the electrode plate in the electrode assembly of the present disclosure will be described.

When describing an embodiment of the present invention with reference to the drawings, the uncoated portion may include a plurality of segments, and the depths of notching valleys between the plurality of segments may be the same. In this case, a line extending from points corresponding to the depth of the notching valleys is used as a base line.

In this case, the base line (DL) may be a line connecting the smallest height among the core-side uncoated portion, the circumferential uncoated portion and the intermediate uncoated portion to both ends of the uncoated portion.

According to the present invention, the one side of the separator SL in the width direction of the separator, herein referred to as the axial direction, is located between the bent portion and the base line or located in the inner direction of the electrode assembly from the base line. Here, the outer direction of the electrode assembly refers to a direction toward the uncoated portion of the active material layer of the electrode (to the first side), and the inner direction refers to a direction opposite to the outer direction (to the second side).

In addition, in an embodiment of the present disclosure, the electrode assembly may have a surface region formed at the top end or the bottom end in the axis direction as segments of winding turns adjacent to each other among the bent segments are successively overlapped in the radial direction or a direction opposite thereto. At this time, when the shortest distance between the maximum height (highest point) in the axis direction of the surface region and the base line is a height HS of the surface region, the one side of the separator in the axial direction may be located within 90% of the height HS of the surface region based on the base line in the outer direction of the electrode assembly or in the inner direction of the electrode assembly.

According to an embodiment of the present disclosure, by controlling the one side of the separator in the axial direction to be located close to the base line, the electrolyte flows into the electrode assembly along the notching valley (empty space), which is advantageous for impregnation. Specifically, the electrolyte is injected into the electrode assembly, and at this time, the electrolyte moves to the notching valley between the segments of the uncoated portion of the electrode plate of the electrode assembly, and at this time, the electrolyte is impregnated again to the valley between the segments, namely to the one side of the separator located close to the base line, and thus finally impregnated into the active material layer of the electrode. As a result, the uniformity of the impregnation of the electrolyte within the electrode assembly increases.

As the one side of the separator in the axial direction negatively affects the welding properties as deviating to the outer side of the jelly-roll, namely in the outer direction of the electrode assembly, and the risk of short circuit between the positive electrode and the negative electrode increases as the one side of the separator in the axial direction is located at the inner side of the jelly-roll, namely in the inner direction of the electrode assembly, which may be a problem.

Accordingly, in the present disclosure, the one side of the separator in the axial direction is located in the outer direction of the electrode assembly with respect to the base line, or the one side of the separator in the axial direction is located in the inner direction of the electrode assembly with respect to the base line, and more preferably, it is controlled to be located in 90% or less of the height HS of the surface region.

Meanwhile, in an embodiment of the present disclosure, a segment having the smallest height among the plurality of segments is referred to as the shortest bent segment, and according to this embodiment, the one side of the separator in the axial direction of the separator may be located less than 50%, or within 40% or 30%, or 20% or 10% of the height (Ha) of the shortest bent segment from the base line in the outer direction of the electrode assembly. Preferably, the one side of the separator in the axial direction may be located within 30% of the height (Ha) of the shortest bent segment from the base line in the outer direction of the electrode assembly. The separator may be positioned such that the notching valleys of the cut grooves between the segments are not exposed as they are covered by the separator.

For example, if the location of the one side of the separator exceeds the above 50% range, it is located closer to the first end of the segment, and the separator has a higher likelihood of being damaged by heat when welding the segments occurs. Alternatively, the one side of the separator in the axial direction may be located within 30% or 20% or 10% of the height (Ha) of the shortest bent segment from the base line in the inner direction of the electrode assembly. Meanwhile, when the one side of the separator is located below the base line, all or at least some of the notching valleys may be exposed as a result of them not being covered by the separator.

Figure 7B:
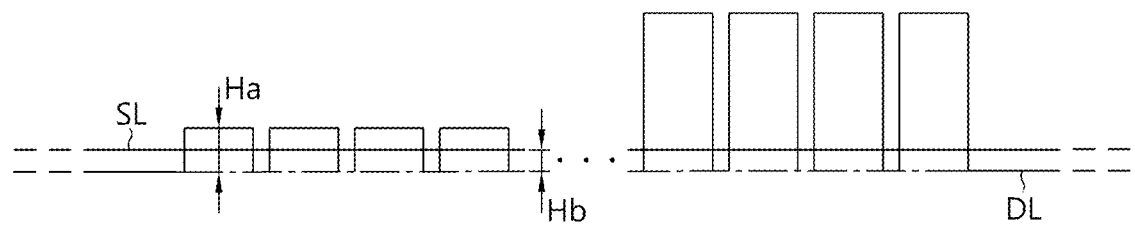
FIGS. 7b and 7c are enlarged view showing a segment portion more specifically.
Figure 7C:
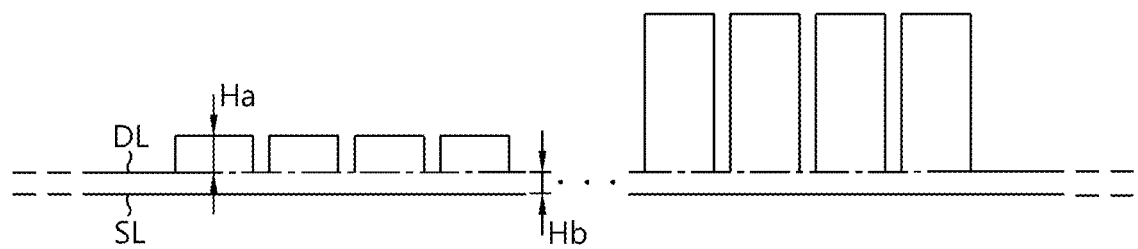
Figure 9B:
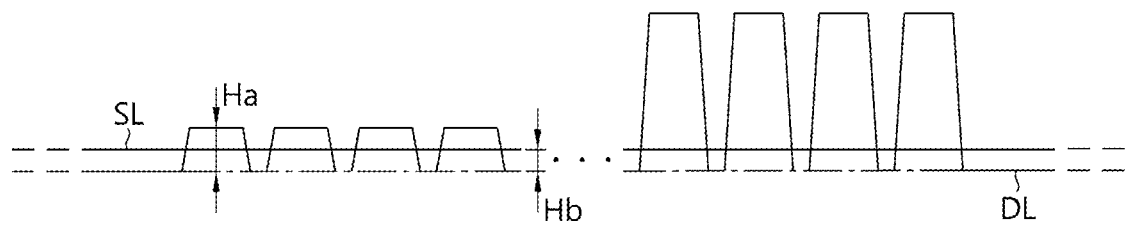
FIGS. 9b and 9c are enlarged view showing a segment portion more specifically.
Figure 9C:
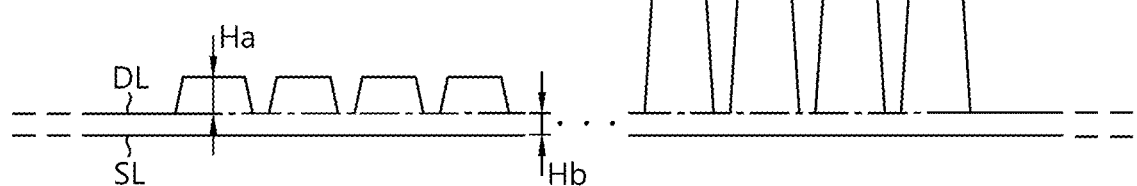

Referring to FIG. 7b, 7c, 9b or 9c, the segment of group 1 may be the shortest bent segment, and one side of the separator in the axial direction is located in the outer direction (the first side direction) of the electrode assembly less than 50% or within 30% of the height Ha of the shortest bent segment with respect to the base line, or one side of the separator in the axial direction may be positioned in the inner direction (the second side direction) of the electrode assembly within 30% of the height Ha of the shortest bent segment with respect to the base line. More specifically, the segment of the group 1 may be the shortest bent segment, and one side of the separator in the axial direction may be positioned in the outer direction (first side direction) of the electrode assembly less than 50% or within 30% of the height Ha of the shortest bent segment with respect to the base line. Referring to FIG. 7b or FIG. 9b, when the one side SL of the separator is located between the base line DL and the Hb, the maximum value of Hb is preferably less than 50% of the height of the shortest bent segment. Referring to FIG. 7c or FIG. 9c, when SL is located below the base line DL, the maximum value of Hb is 30% of the height of the shortest bent segment. Here, the height of the shortest bent segment is measured from the base line DL to the first side of the shortest bent segment.

That is, in the present disclosure, the segment serving as a criterion for arranging the separator may mean the segment having the smallest height among the segments that are bent, and this is referred to as a shortest bent segment.

In a specific embodiment of the present disclosure, the shortest bent segment may have a height of 2 mm or more, and in this case, the height of the shortest bent segment is higher than the height of the bent portion. If the height of the segment is less than 2 mm, there is a possibility that the segment may not be bent smoothly due to the interference between the separator and the segment. Accordingly, the shortest bent segment may be determined among segments having a height of 2 mm or more.

According to an embodiment of the present disclosure, in the shortest bent segment, the height A from the base line to the bending line based on the bending line may be equal to or longer than the length from the bending line to the segment height B. Alternatively, in the shortest bent segment, the height A from the base line to the bending line based on the bending line may be equal to or shorter than the length from the bending line to the segment height B.

In addition, in an embodiment of the present disclosure, the electrode assembly may further include a segment (segment A) having a smaller height than the shortest bent segment. At this time, the segment A is not bent. In a specific embodiment, the segment A may be disposed closer to the core compared to other segments among the plurality of segments.

In an embodiment of the present disclosure, the electrode assembly may not include a segment having a smaller height than the shortest bent segment, and the shortest bent segment may be a minimum segment.

According to an embodiment of the present disclosure, the one side of the separator in the axial direction may be located within 3 mm or within 1.5 mm based on the base line in the outer direction of the electrode assembly, or the one side of the separator in the axial direction can may be located within 3 mm or within 1.5 mm based on the base line in the inner direction of the electrode assembly.

Figure 8:
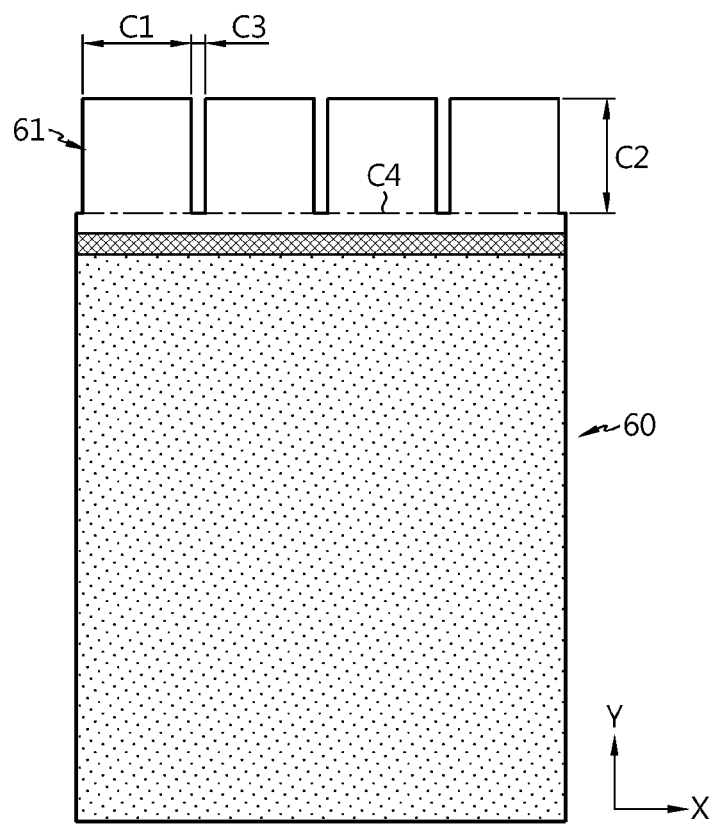
FIG. 8 is a diagram showing the definitions of width, height and separation pitch of a segment according to an embodiment of the present disclosure.

FIG. 8 is a diagram showing the definitions of width, height and separation pitch between the segments of the segment 61 according to an embodiment of the present disclosure.

Referring to FIG. 8, the width (C1), height (C2) and separation pitch (C3) of the segment 61 are designed to prevent abnormal deformation of the uncoated portion 43 while sufficiently increasing the number of overlapping layers in order to prevent the uncoated portion 43 from being torn during bending of the uncoated portion 43 and improve welding strength of the uncoated portion 43. Abnormal deformation means that the a portion corresponding to the base line (C4) does not maintain a straight state but sinks down to be deformed irregularly.

According to the one embodiment of the present invention, the width (C1) of the segment 61 may be adjusted in the range of 1 to 6 mm. If C1 is less than 1 mm, a non-overlapping area or an empty space (gap) is generated, thereby not to sufficiently secure welding strength when the segment 61 is bent toward the core. Meanwhile, if C1 exceeds 6 mm, there is a possibility that the uncoated portion 43 near the base line (DL) is torn due to stress when the segment 61 is bent due to the curvature of the wound electrode. Also, the height (C2) of the segment 61 may be adjusted in the range of 2 to 10 mm. If C2 is less than 2 mm, a non-overlapping area or an empty space (gap) may be generated, thereby not to sufficiently secure welding strength when the segment 61 is not bent smoothly or is bent toward the core. Meanwhile, if C2 exceeds 10 mm, it is difficult to manufacture an electrode plate while uniformly maintaining the flatness of the uncoated portion in the winding direction X. That is, the over-height of the uncoated portion causes cambered surface in the uncoated portion.

In addition, the separation pitch (C3) of the segment 61 may be adjusted in the range of 0.05 mm to 1 mm, or 0.5 mm to 1 mm. If C3 is less than 0.05 mm, the uncoated portion 43 near the base line (DL) (near the bottom of the cut groove between two segments adjacent to each other) may be torn due to stress when the segment 61 is bent. Meanwhile, if C3 exceeds 1 mm, a non-overlapping area where the segments 61 do not overlap each other or an empty space (gap) may be generated, thereby not to sufficiently secure welding strength when the segment 61 is bent.

In an embodiment of the present disclosure, the corners of the two segments may be connected straightly. That is, the bottom of the cut groove may have a flat straight shape extending in the winding direction (X). A round reinforcing portion may be added to the corner.

The radius (r) of the round reinforcing portion may be 0.02 mm or more. If the corresponding radius is equal to greater than this, the effect of stress distribution may be surely brought. The radius of the round reinforcing portion may be 0.1 mm or less. If the radius exceeds 0.1 mm, the effect of stress dispersion does not increase any more, and the space near the bottom of the cut groove may be reduced, which may inhibit electrolyte impregnation.

Referring to FIG. 7a again, the width ($d_{B1}$) of the core-side uncoated portion B1 is designed by applying a condition that does not cover the cavity in the core of the electrode assembly when the segment 61 of the intermediate uncoated portion B2 is bent toward the core.

In one example, the width ($d_{B1}$) of the core-side uncoated portion B1 may increase in proportion to the height of the segment 61 of Group 1. In a specific example, when the electrode plate 60 is used to manufacture an electrode assembly of a cylindrical cell having a form factor of 46800, the width ($d_{B1}$) of the core-side uncoated portion B1 may be set to 180 to 350 mm according to the diameter of the core of the electrode assembly.

In an embodiment, the width of each segment group may be designed to constitute the same winding turn of the electrode assembly.

In one modification, the width and/or height and/or separation pitch of the segment 61 belonging to the same segment group may be increased or decreased gradually and/or stepwise and/or irregularly within the group.

Groups 1 to 7 are only an example of segment groups. The number of groups and the number of segments 61 included in each group may be adjusted so that the segment 61 overlaps in multiple layers to disperse stress as much as possible during the bending process of the uncoated portion 43 and sufficiently secure the welding strength.

In another modification, the height of the circumferential uncoated portion B3 may be decreased gradually or step by step, as in the first embodiment and the second embodiment. In addition, the segment structure of the intermediate uncoated portion B2 is expandable to the circumferential uncoated portion B3 (see dotted line). In this case, the circumferential uncoated portion B3 may also include a plurality of segments like the intermediate uncoated portion B2. In this case, the segment of the circumferential uncoated portion B3 may have a width and/or height and/or separation pitch greater than that of the intermediate uncoated portion B2.

In a specific example, when the electrode plate 60 is used to manufacture an electrode assembly of a cylindrical cell having a form factor of 46800, segments may be formed in eight groups. At this time, the segments of Groups 1 to 7 may be formed in the intermediate uncoated portion B2, and segments of Group 8 may be formed in the circumferential uncoated portion B3 as in the modification described above.

In a specific example, the width ($d_{B1}$) of the core-side uncoated portion B1 may be 180 to 350 mm. The width of Group 1 may be 35 to 40% of the width of the core-side uncoated portion B1. The width of Group 2 may be 130 to 150% of the width of Group 1. The width of Group 3 may be 120 to 135% of the width of Group 2. The width of group 4 may be 85 to 90% of the width of Group 3. The width of Group 5 may be 120 to 130% of the width of Group 4. The width of Group 6 may be 100 to 120% of the width of Group 5. The width of Group 7 may be 90 to 120% of the width of Group 6. The width of Group 8 may be 115 to 130% of the width of Group 7.

The reason that the widths of Groups 1 to 8 do not show a constant increase or decrease pattern is that the segment width gradually increases from Group 1 to Group 8, but the number of segments included in the group is limited to an integer number. Accordingly, the number of segments may be reduced in a specific segment group. Therefore, the widths of the groups may show an irregular change pattern as in the above example from the core to the outer circumference.

That is, assuming that the width in the winding direction for each of the three segment groups consecutively adjacent to each other in the circumferential direction of the electrode assembly is W1, W2, and W3, respectively, it is possible to include a combination of segment groups in which W3/W2 is smaller than W2/W1.

In the specific example, Groups 4 to 6 corresponds to this. The width ratio of Group 5 to Group 4 is 120 to 130%, and the width ratio of Group 6 to Group 5 is 100 to 120%, which is smaller than 120 to 130%.

FIG. 9 is a plan view showing a structure of an electrode plate 70 according to the fifth embodiment of the present disclosure.

Referring to FIG. 9, the electrode plate 70 of the fifth embodiment is substantially the same as the fourth embodiment (or modifications), except that the shape of the segment 61' is changed from a rectangle to a trapezoid compared to the fourth embodiment.

Figure 10:
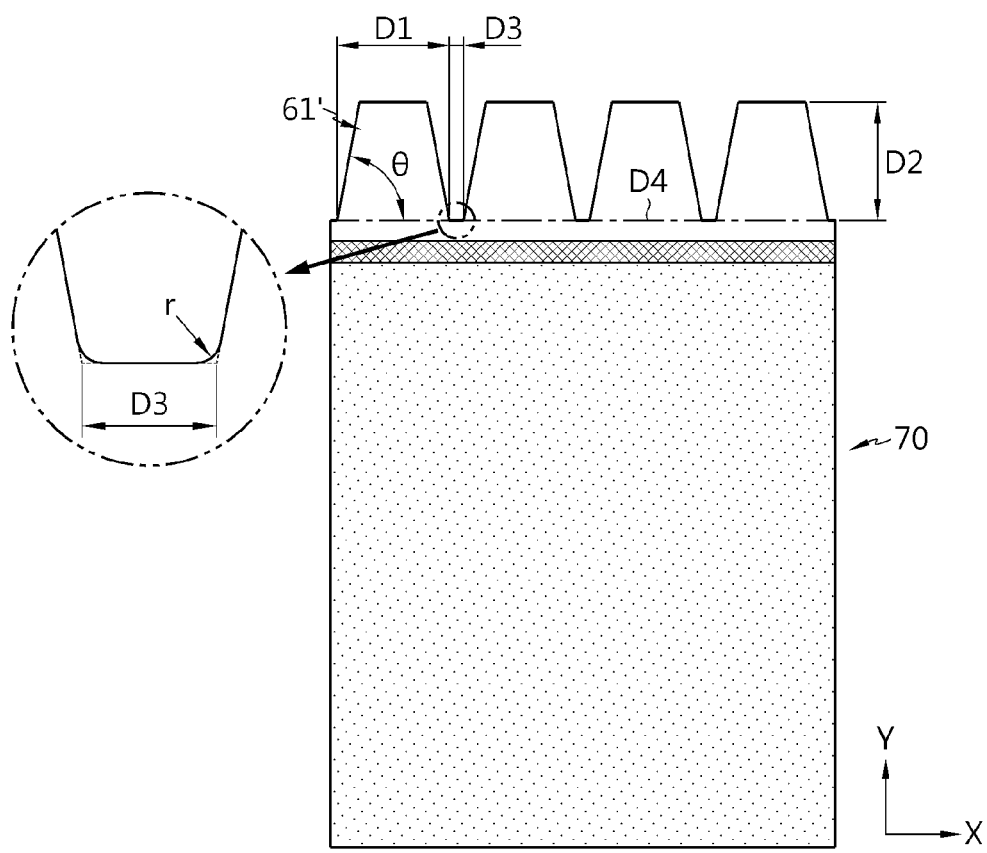
FIG. 10 is a diagram showing the definitions of width, height and separation pitch of a segment according to another embodiment of the present disclosure.

FIG. 10 shows the definition of the width, height and separation pitch of the trapezoidal segment 61'.

Referring to FIG. 10, the width D1, height D2 and separation pitch D3 of segment 61' are designed to prevent abnormal deformation of the uncoated portion 43 while sufficiently increasing the number of overlapping layers of the uncoated portion 43 in order to prevent the uncoated portion 43 near the base line (DL) from being torn during bending of the uncoated portion 43 and secure sufficient welding strength.

Preferably, the width D1 of the segment 61' may be adjusted in the range of 1 to 6 mm. If D1 is less than 1 mm, an area where the segment 61' does not overlap or an empty space (gap) may be generated, thereby not to secure sufficient welding strength when the segment 61' is bent toward the core. Meanwhile, if D1 exceeds 6 mm, there is a possibility that the uncoated portion 43 near the base line DL may be torn due to stress when the segment 61' is bent due to the curvature of the wound electrode. In addition, the height of the segment 61' may be adjusted in the range of 2 mm to 10 mm. If D2 is less than 2 mm, an area where the segment 61' does not overlap or an empty space (gap) may be generated, thereby not to ensure sufficient welding strength when the segment 61' is not smoothly bent or is bent toward the core. Meanwhile, if D2 exceeds 10 mm, it is difficult to manufacture an electrode plate while uniformly maintaining the flatness of the uncoated portion 43 in the winding direction. In addition, the separation pitch D3 of the segment 61' may be adjusted in the range of 0.05 mm to 1 mm, or 0.5 mm to 1 mm. If D3 is less than 0.05 mm, the uncoated portion 43 near the base line may be torn due to stress when the segment 61' is bent. Meanwhile, if D3 exceeds 1 mm, an area where the segments 61' do not overlap each other or an empty space (gap) may be generated, thereby not to secure sufficient welding strength when the segment 61' is bent.

When the segment is trapezoidal, the separation pitch D3 may be defined as the distance between the corners of two adjacent segments 61'. The corners of two adjacent segments may be connected in a straight line. That is, the bottom of the cut groove may have a flat straight shape extending in the winding direction (X).

The corner may be further provided with a round reinforcing portion. In this way, it is possible to solve the stress concentration phenomenon that may occur at the corner.

The radius (r) of the round reinforcing portion may be 0.02 mm or more. If the corresponding radius is equal to or greater than this, the effect of stress distribution may be surely brought.

The radius of the round reinforcing portion may be 0.1 mm or less. If the radius exceeds 0.1 mm, the effect of stress dispersion does not increase any more, and the space near the bottom of the cut groove may be reduced, which may inhibit electrolyte impregnation.

The separation pitches C3, D3 may be determined in relation to the magnitudes C1, D1 of the widths measured in the winding direction of the neighboring segments 61, 61' defining the same. For example, as the width of the segments in the winding direction increases, it is desirable to have a tendency that the separation pitch between them also increases. According to this, the impregnation of the electrolyte may be evenly distributed along the winding direction of the electrode assembly.

The width of the segment in the winding direction may be set to gradually increase from the core of the electrode assembly toward the outer circumference. The width of the segment in the winding direction may be increased gradually or stepwise from the core of the electrode assembly toward the outer circumference. For example, the width C1, D1 of the segment in the winding direction may be within the range of 1 mm to 6 mm, and may become smaller toward the core and larger toward the outer circumference.

Accordingly, the separation pitch C3, D3 may also be within the range of 0.5 mm to 1 mm, and may increase gradually or stepwise from the core of the electrode assembly toward the outer circumference.

In the fifth embodiment, in the plurality of segments 61', the lower internal angle (θ) of the trapezoidal shape may increase from the core to the outer circumference. As the radius of the electrode assembly 70 increases, the radius of curvature increases. If the lower internal angle (θ) of the segment 61' increases as the radius of the electrode assembly increases, the stress generated in the radial and circumferential directions when the segment 61' is bent may be relieved. In addition, when the lower internal angle (θ) is increased, when the segment 61' is bent, the area overlapping with the segment 61' at an inner side and the number of overlapping layers also increase, thereby securing uniform welding strength in the radial and circumferential directions and making the bent surface flat.

In one example, when the electrode plate 70 is used to manufacture an electrode assembly of a cylindrical cell having a form factor of 46800, the internal angle of the segment 61' is may be increased stepwise in the 60 to 85 degree region when the radius of the electrode assembly 70 increases from 4 mm to 22 mm.

In one modification, the height of the circumferential uncoated portion B3 may be decreased gradually or stepwise as in the first embodiment and the second embodiment. In addition, the segment structure of the intermediate uncoated portion B2 is expandable to the circumferential uncoated portion B3 (see the dotted line). In this case, the circumferential uncoated portion B3 may also include a plurality of segments like the intermediate uncoated portion B2. In this case, the segments of the circumferential uncoated portion B3 may have greater width and/or height and/or separation pitch than those of the intermediate uncoated portion B2.

As in the fourth embodiment and the fifth embodiment, when the intermediate uncoated portion B2 includes a plurality of segments 60, 60', the shape of each segment 60, 60' may be changed to a triangle, a semicircle, a semi-ellipse, a parallelogram, etc.

Also, it is possible to change the shapes of the segments 60, 60' differently depending on the region of the intermediate uncoated portion B2. In one example, a round shape (e.g., semicircle, semi-ellipse, etc.) that is advantageous for stress distribution is applied to a region where the stress is concentrated, and a polygonal shape (e.g., a rectangle, trapezoid, parallelogram, etc.) with the largest area may be applied a region where the stress is relatively low.

In the fourth and fifth embodiments, the segment structure of the intermediate uncoated portion B2 may also be applied to the core-side uncoated portion B1. However, if the segment structure is applied to the core-side uncoated portion B1, when the segments 60, 60' of the intermediate uncoated portion B2 are bent according to the radius of curvature of the core, the end of the core-side uncoated portion B1 may be bent toward the outer circumference, which is called reverse forming. Therefore, the core-side uncoated portion B1 has no segment, or even if the segment structure is applied to the core-side uncoated portion B1, it is desirable to control the width and/or height and/or separation pitch of the segments 60, 60' in consideration of the radius of curvature of the core such that reverse forming does not occur.

The height of the segment where such reverse forming may occur may be less than approximately 3 mm. In addition, if the height of the segment is less than 2 mm, bending may not easily occur due to interference between the segment and the separator. In addition, if the height of the segment is less than 4 mm, the segment welding process may not be smooth. Therefore, for the purpose of bending, the minimum height ($H_{min}$) of the segment may be 2 mm or more, or 3 mm or more, or 4 mm or more, or 5 mm or more. Accordingly, the height of the shortest bent segment may be 2 mm or more, or 3 mm or more, or 4 mm or more, or 5 mm or more.

Therefore, based on the base line DL, the end SL of the separator in the axial direction exists within ±30% range (based on the base line) of the height (Ha) of the shortest bent segment that is bent among segments having a height greater than or equal to the minimum height ($H_{min}$, for example, 2 mm, or 3 mm, or 4 mm, or 5 mm above) that allows bending in the uncoated portion, the impregnation property may be greatly improved. That is, in determining the shortest bent segment that defines the position of the end SL of the separator in the axial direction, segments that may cause reverse forming or segments that are not bent may be excluded.

In another point of view, based on the base line DL, if the end SL of the separator in the axial direction exists within ±30% range of a greater height {max (Ha, $H_{min}$)} among the height (Ha) of the shortest bent segment present in the uncoated portion and the bendable minimum height ($H_{min}$), the impregnation property may be greatly improved.

In another point of view, based on the base line DL, if the end SL of the separator in the axial direction exists within ±30% range of the bendable minimum height ($H_{min}$), the impregnation property may be greatly improved. This may be the range of the base line DL±1.5 mm, or the base line DL±1.2 mm, or the base line DL±0.9 mm, or the base line DL±0.6 mm.

Alternatively, the position of the one side of the separator in the axial direction may be in the range of DL±0.3 Ha and DL±1.5 mm, or the position of the one side of the separator in the axial direction may be in the range of DL±0.3 Ha and DL±1.2 mm, or the position of the one side of the separator in the axial direction may be in the range of DL±0.3 Ha and DL±0.9 mm, or the position of the one side of the separator in the axial direction may be in the range of DL±0.3 Ha and DL±0.6 mm.

The electrode plate structure of the above embodiments (modifications) may be applied to at least one of the first electrode plate and the second electrode plate having different polarities included in the jelly-roll type electrode assembly. In addition, when the electrode structure of the above embodiments (modifications) is applied to any one of the first electrode plate and the second electrode plate, the conventional electrode plate structure may be applied to the other one. In addition, the electrode plate structures applied to the first electrode plate and the second electrode plate may not be identical but be different from each other.

Figure 1:
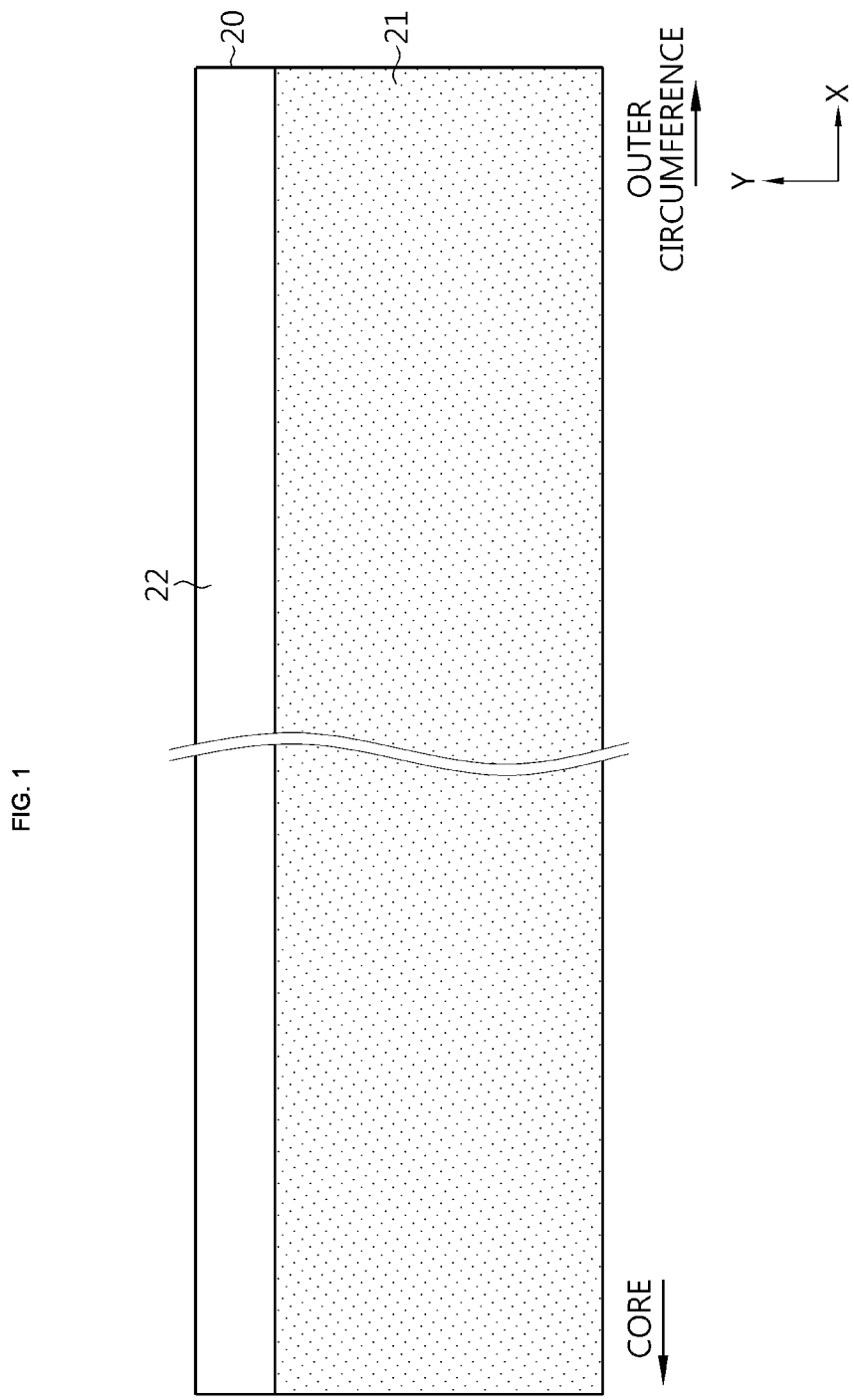
FIG. 1 is a plan view showing a structure of an electrode plate used for manufacturing a conventional tab-less cylindrical battery cell.

For example, when the first electrode plate and the second negative electrode plate are a positive electrode plate and a negative electrode plate, respectively, any one of the above embodiments (modifications) may be applied to the first electrode plate and the conventional electrode plate structure (see FIG. 1) may be applied to the second electrode plate.

As another example, when the first electrode plate and the second negative electrode plate are a positive electrode plate and a negative electrode plate, respectively, any one of the above embodiments (modifications) may be selectively applied to the first electrode plate and any one of the above embodiments (modifications) may be selectively applied to the second electrode plate.

In the present disclosure, a positive electrode active material coated on the positive electrode plate and a negative electrode active material coated on the negative electrode plate may employ any active material known in the art without limitation.

The positive electrode active material may include lithium intercalation materials selected from: a layered compound such as lithium cobalt oxide ($LiCoO_2$), lithium nickel oxide ($LiNiO_2$) or a compound substituted with one or more transition metals; lithium manganese oxide ($LiMnO_2$), such as a formula $Li_{1+x}Mn_{2-x}O_4$ (where x is 0 to 0.33), $LiMnO_3$, $LiMn_2O_3$, $LiMnO_2$; lithium copper oxide ($Li_2CuO_2$); vanadium oxide such as $LiV_3O_8$, $LiFe_3O_4$, $V_2O_5$, $Cu_2V_2O_7$; lithiated nickel oxide represented by the formula $LiNi_{1-x}M_xO_2$ (where M=Co, Mn, Al, Cu, Fe, Mg, B or Ga, and x=0.01 to 0.3); lithium manganese composite oxide represented by the formula $LiMn_{2-x}M_xO_2$ (where M=Co, Ni, Fe, Cr, Zn or Ta, and x=0.01 to 0.1) or $Li_2Mn_3MO_8$ (where M=Fe, Co, Ni, Cu or Zn); $LiMn_2O_4$ in which a part of lithium is substituted with an alkaline earth metal ion; disulfide compounds; $Fe_2(MoO_4)_3$; or a composite oxide formed by a combination thereof, as a main component, but the present disclosure is not limited thereto.

The positive electrode current collector has a thickness of 3 μm to 500 μm, for example. The positive electrode current collector is not particularly limited as long as it has conductivity without causing chemical change in the battery, and for example, on may use stainless steel, aluminum, nickel, titanium, or calcined carbon; or aluminum or stainless steel surface-treated with carbon, nickel, titanium, silver or the like. The electrode current collector may increase the adhesion of the positive electrode active material by forming fine irregularities on the surface thereof, and may have various forms such as a film, a sheet, a foil, a net, a porous body, a foam, a non-woven body, and the like.

A conductive material may be additionally mixed with the positive electrode active material particles. The conductive material is added, for example, in an amount of 1 to 50 weight % based on the total weight of the mixture including the positive electrode active material. The conductive material is not particularly limited as long as it has high conductivity without causing a chemical change in the battery, and for example, may use conductive materials selected from: graphite such as natural graphite and artificial graphite; carbon black such as carbon black, acetylene black, Ketjen black, channel black, furnace black, lamp black, and summer black; conductive fibers such as carbon fibers and metal fibers; metal powders such as carbon fluoride, aluminum, and nickel powder; conductive whiskeys such as zinc oxide and potassium titanate; conductive oxides such as titanium oxide; polyphenylene derivatives, and the like.

In addition, the separator and the negative electrode are manufactured by coating and drying negative electrode active material particles on the negative electrode current collector, and if necessary, components such as the conductive material, the binder, the solvent, and the like described above may be further included.

The negative electrode current collector has a thickness of, for example, 3 μm to 500 μm. The negative electrode current collector is not particularly limited as long as it has conductivity without causing a chemical change in the battery, and for example, may use copper, stainless steel, aluminum, nickel, titanium, calcined carbon, or copper; stainless steel surface-treated with carbon, nickel, titanium, silver, or the like; an aluminum-cadmium alloy, or the like. In addition, like the positive electrode current collector, fine irregularities may be formed on the surface of the negative electrode current collector to strengthen the coupling force of the negative electrode active material, and the negative electrode current collector may be used in various forms such as a film, a sheet, a foil, a net, a porous body, a foam, a nonwoven body, or the like.

The negative electrode active material may use, for example, carbon such as non-graphitizable carbon and graphitic carbon; $Li_xFe_2O_3$ ($0 \leq x \leq 1$), $Li_xWO_2$ ($0 \leq x \leq 1$), a metal complex oxide of $Sn_xMe_{1-x}Me'_yO_z$ (Me: Mn, Fe, Pb, Ge; Me': Al, B, P, Si, Group 1, Group 2, Group 3 elements of the periodic table, halogen; $0 \leq x \leq 1$; $1 \leq y \leq 3$; $1 \leq z \leq 8$); lithium metal; lithium alloys; silicon-based alloys; tin-based alloys; oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$; conductive polymers such as polyacetylene; Li—Co—Ni-based materials, and the like.

The binder polymer that can be used for the electrode is a component that helps the coupling between the electrode active material particles and the conductive material and the coupling to the electrode current collector, and is added by, for example, 1 to 50 weight % based on the total weight of the mixture containing the electrode active material. Examples of the binder polymer include any one binder polymer selected from the group consisting of polyvinylidene fluoride-co-hexafluoropropylene (PVdF), polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan and carboxyl methyl cellulose, or a mixture of two or more thereof, but is not limited thereto.

Non-limiting examples of the solvent used for preparing the electrode include acetone, tetrahydrofuran, methylene chloride, chloroform, dimethylformamide, N-methyl-2-pyrrolidone (NMP), cyclohexane, water, or a mixture thereof. These solvents provide an appropriate level of viscosity so that a slurry coating layer can be formed at a desired level on the surface of the electrode current collector.

The negative electrode may include a current collector; and a negative electrode active material layer located on at least one surface of the current collector and including a negative electrode active material, a binder polymer and a conductive material, the negative electrode active material layer may include a lower layer region in surface contact with the current collector and an upper layer region in surface contact with the lower layer region and extending to the surface of the negative electrode active material layer, and the lower layer region and the upper layer region may independently include at least one of graphite and silicon-based compounds as a negative electrode active material, respectively.

The lower layer region may include natural graphite as a negative electrode active material, and the upper layer region may include artificial graphite as a negative electrode active material.

The lower layer region and the upper layer region may independently further include a silicon-based compound as a negative electrode active material, respectively.

The silicon-based compound may include at least one of SiOx (0≤x≤2) and SiC.

According to an embodiment of the present disclosure, the negative electrode may be prepared region by applying and drying the lower-layer slurry containing a lower-layer negative electrode active material on the current collector to form a lower layer, and then applying and drying an upper-layer slurry containing an upper-layer layer negative electrode active material on the lower layer region to form an upper layer region.

In addition, according to an embodiment of the present disclosure, the negative electrode may be manufactured by a step of preparing a lower-layer slurry containing a lower-layer negative electrode active material; and an upper-layer slurry containing an upper-layer negative electrode active material;
   a step of coating the lower-layer slurry on one surface of the negative electrode current collector, and coating the upper-layer slurry on the lower-layer slurry at the same time or with a predetermined time difference; and
   a step of drying the coated lower-layer slurry and the coated upper-layer slurry at the same time to form an active material layer.

If the negative electrode is manufactured by the latter method, a mixed region (intermixing) in which these different kinds of active materials are mixed with each other may exist in a portion where the lower layer region and the upper layer region contact each other in the negative electrode. This is because, if the lower-layer slurry containing the lower-layer negative electrode active material and the upper-layer slurry containing the upper-layer negative electrode active material are continuously coated on the current collector at the same time or with a very short time difference and then dried at the same time to form an active material layer, a predetermined mixing region occurs on the interface where the lower-layer slurry and the upper-layer slurry are in contact before drying, and then the mixing region becomes a layer form of the mixed region while being dried.

In the active material layer of the negative electrode according to an embodiment of the present disclosure, the weight ratio (or the ratio of the loading amount per unit area) of the upper layer region and the lower layer region may be 20:80 to 50:50, specifically 25:75 to 50:50.

The thickness of the lower layer region and the upper layer region of the active material layer of the negative electrode according to the present disclosure may not completely match the thickness of the coated lower-layer slurry and the coated upper-layer slurry. However, as a result of the drying or selective rolling process, the ratio of the thickness of the lower layer region and the upper layer region of the active material layer of the negative electrode of the negative electrode according to the present disclosure finally obtained may match the ratio of the thickness of the coated lower-layer slurry and the coated upper-layer slurry.

According to an embodiment of the present disclosure in which the first slurry is coated and the second slurry is coated on the first slurry at the same time or with a predetermined time difference, the predetermined time difference may be 0.6 seconds or less, or 0.02 seconds to 0.6 seconds, or 0.02 seconds to 0.06 seconds, or 0.02 seconds to 0.03 seconds. The time difference is generated during coating of the first slurry and the second slurry due to the coating equipment, so it may be more preferable to coat the first slurry and the second slurry at the same time. The second slurry may be coated on the first slurry using a device such as a double slot die.

The step of forming the active material layer may further include a step of rolling the active material layer after the drying step. In this case, the rolling may be performed by a method commonly used in the art, such as roll pressing, and, for example, may be performed at a pressure of 1 MPa to 20 MPa and a temperature of 15° C. to 30° C.

The step of simultaneously drying the coated lower-layer slurry and the upper-layer slurry to form an active material layer may be performed using a device in which a hot air drying device and an infrared drying device are combined, and may be implemented by a method commonly used in the art.

The weight % of the first binder polymer in the solid content of the lower-layer slurry may be equal to or greater than the weight % of the second binder polymer in the solid content of the upper-layer slurry. According to an embodiment of the present disclosure, the weight % of the first binder polymer in the solid content of the lower-layer slurry may be 1.0 to 4.2 times, or 1.5 to 3.6 times, or 1.5 to 3 times of the weight % of the second binder polymer in the solid content of the upper-layer slurry.

At this time, when the ratio of the weight % of the first binder in the coated lower-layer slurry and the weight % of the second binder in the coated upper-layer slurry satisfies the above range, the binder in the lower layer region is not so small to cause separation of the electrode layer, and since the binder of the upper layer region is not so great, the resistance of the upper-layer region of the electrode may be reduced and it may be advantageous for the fast charging performance.

In the solid content of the lower-layer slurry, the weight % of the first binder polymer may be 2 to 30 weight %, or 5 to 20 weight %, or 5 to 20 weight %, and the proportion (weight %) of the second binder polymer in the solid content of the upper-layer slurry may be 0.5 to 20 weight %, or 1 to 15 weight %, or 1 to 10 weight %, or 2 to 5 weight %.

The total ratio (weight %) of the first binder polymer and the second binder polymer in the solid content of all of the lower-layer slurry and the upper-layer slurry may be 2 to 20 weight %, or 5 to 15 weight %.

The separator includes a porous polymer substrate; and a porous coating layer located on at least one or both surfaces of the porous polymer substrate and having inorganic particles and a binder polymer.

The porous polymer substrate may be a polyolefin-based porous substrate.

The polyolefin porous substrate may be in the form of a film or a non-woven web. Since the polyolefin porous substrate has such a porous structure, electrolyte may be moved smoothly between the positive electrode and the negative electrode, and the electrolyte impregnation property of the substrate itself may also be increased, thereby securing excellent ion conductivity. Also, since resistance increase inside the electrochemical device is prevented, it is possible to prevent the performance of the electrochemical device from being degraded.

The polyolefin porous substrate used in the present disclosure may use any planar porous substrate that is typically used for electrochemical devices, and its material or shape may be variously selected according to the purpose.

The polyolefin porous substrate may be, but is not limited to, a film or a non-woven web formed of high-density polyethylene, low-density polyethylene, linear low-density polyethylene, ultra-high molecular weight polyethylene, polypropylene, or a mixture of two or more thereof, but is not limited thereto.

The polyolefin porous substrate may have a thickness of 8 to 30 μm, but this is only an example, and a thickness outside the range may also be adopted in consideration of mechanical properties and high-rate charge/discharge characteristics of the battery.

The nonwoven sheet according to the present disclosure may be formed of polyethylene (PE), polypropylene (PP), or a mixture of two or more thereof. For example, the nonwoven sheet may be manufactured by fiber spinning. For example, the nonwoven sheet may be manufactured using a melt blown (melt blown) method by making fibers of the above material into a fiber spinning form at a melting point or above and performing mixing spinning.

The nonwoven sheet may have an elongation rate of 200% to 400%, more preferably 300% to 400%. If the elongation rate is less than 200%, the probability of contact between the electrode and the electrode increases at the penetration of a nail, and if the elongation rate is greater than 400%, the area around the nail penetration is also stretched so that the separator becomes thinner, thereby decreasing the barrier property.

The nonwoven sheet has a plurality of pores with an average diameter of 0.1 μm to 10 μm. If the pore size is smaller than 0.1 μm, lithium ions and/or electrolyte may not smoothly move. If the pore size is larger than 10 μm, the effect of the present disclosure to prevent contact between the positive electrode and the negative electrode by stretching the nonwoven sheet during nail penetration may not be achieved.

Also, the nonwoven sheet may have a porosity of 40 to 70%. If the porosity is less than 40%, lithium ions and/or electrolyte may not smoothly move. If the porosity is greater than 70%, the effect of the present disclosure to prevent contact between the positive electrode and the negative electrode by stretching the nonwoven sheet during nail penetration may not be achieved. The nonwoven sheet prepared in this way may have air permeability of 1 to 20 seconds/100 mL.

In addition, the nonwoven sheet may have a thickness of 10 μm to 20 μm, but this is only an example and the present disclosure is not limited thereto. Depending on the permeability of the nonwoven sheet, it is possible to adopt a nonwoven sheet with a thickness outside the range.

The nonwoven sheet may be coupled to a component of the separator placed below the nonwoven sheet by lamination. The lamination may be performed in a temperature range of 100° C. to 150° C. If the lamination is performed at a temperature lower than 100° C., the lamination effect does not occur, and if the lamination is performed at a temperature higher than 150° C., the nonwoven fabric partially melts.

The separator according to an embodiment of the present disclosure, which is coupled by lamination under the above conditions, has improved resistance to nail penetration, when compared to a separator made of a conventional nonwoven sheet or a separator having a layer containing inorganic particles formed on at least one surface of a film or nonwoven sheet.

In the porous coating layer, inorganic particles may be bound to each other by the binder polymer in a state of being charged and contacted with each other, and thus an interstitial volume may be formed among the inorganic particles, so that the interstitial volume among the inorganic particles becomes an empty space to form pores.

As the inorganic particles used to form the porous coating layer, inorganic particles that do not undergo oxidation and/or reduction reactions in the operating voltage range of the electrochemical device (e.g., 0V to 5V based on Li/Li+) may be added and used. In particular, when inorganic particles having ion transport capability are used, the performance may be improved by increasing the ion conductivity in the electrochemical device. In addition, when inorganic particles having a high dielectric constant are used as, the ion conductivity of the electrolyte may be improved since the high dielectric constant contributes to an increase in the degree of dissociation of electrolyte salts, such as lithium salts, in the liquid electrolyte.

For the above reasons, the inorganic particles preferably include high-dielectric inorganic particles having a dielectric constant of 5 or more, preferably 10 or more, inorganic particles having lithium ion transfer capability, or a mixture thereof.

Non-limiting examples of the inorganic particles having a dielectric constant of 5 or more include $BaTiO_3$, $Pb(Zr,Ti)O_3$ (PZT), $Pb_{1-x}La_xZr_{1-y}Ti_yO_3$ (PLZT), $PB(Mg_{1/3}Nb_{2/3})O_3$—

PbTiO$_3$ (PMN-PT), hafnia (HfO$_2$), SrTiO$_3$, SnO$_2$, CeO$_2$, MgO, NiO, CaO, ZnO, ZrO$_2$, Y$_2$O$_3$, Al$_2$O$_3$, TiO$_2$, SiC, or aluminium hydroxide such as boehmite (γ-AlO(OH)), psedo-boehmite(Al$_2$O$_3$·H$_2$O), diaspore(α-AlO(OH)), bayerlite(α-AlO(OH)$_3$), gibbsite(γ-AlO(OH)$_3$), nordstrandite(AlO(OH)$_3$) or mixtures thereof.

In particular, the inorganic particle such as BaTiO$_3$, Pb(Zr,Ti)O$_3$ (PZT), Pb$_{1-x}$La$_x$Zr$_{1-y}$Ti$_y$O$_3$ (PLZT), PB(Mg$_{1/3}$Nb$_{2/3}$)O$_3$—PbTiO$_3$ (PMN-PT) and hafnia (HfO$_2$) as above not only exhibit high-dielectric properties with a dielectric constant of 100 or more, but also have piezoelectricity in which, when a certain pressure is applied to cause tension or compression, electric charges are generated to cause a potential difference between both surfaces. Thus, it is possible to improve the safety of the electrochemical device by preventing the occurrence of an internal short circuit of both electrodes. In addition, when the above-described high-dielectric inorganic particles and the inorganic particles having lithium ion transfer capability are mixed, their synergistic effects may be doubled.

The inorganic particles having lithium ion transfer capability refer to inorganic particles containing lithium elements but having a function of moving lithium ions without storing lithium. Since the inorganic particles with lithium ion transfer capability may transfer and move lithium ions due to a kind of defect in the particle structure, the lithium ion conductivity in the battery may be improved, which leads to improvement in battery performance. Non-limiting examples of the inorganic particles having lithium ion transfer capability include lithium phosphate (Li$_3$PO$_4$), lithium titanium phosphate (Li$_x$Ti$_y$(PO$_4$)$_3$, 0<x<2, 0<y<3), lithium aluminum titanium phosphate (Li$_x$Al$_y$Ti$_z$(PO$_4$)$_3$, 0<x<2, 0<y<1, 0<z<3), (LiAlTiP)$_x$O$_y$-based glass (0<x<4, 0<y<13) such as 14Li$_2$O-9Al$_2$O$_3$-38TiO$_2$-39P$_2$O$_5$, lithium lanthanide titanate (Li$_x$La$_y$TiO$_3$, 0<x<2, 0<y<3), lithium germanium thiophosphate (Li$_x$Ge$_y$P$_z$S$_w$, 0<x<4, 0<y<1, 0<z<1, 0<w<5) such as Li$_{3.25}$Ge$_{0.25}$P$_{0.75}$S$_4$, lithium nitride (Li$_x$N$_y$, 0<x<4, 0<y<2) such as Li$_3$N, SiS$_2$-based glass (Li$_x$Si$_y$S$_z$, 0<x<3, 0<y<2, 0<z<4) such as Li$_3$PO$_4$—Li$_2$S—SiS$_2$, P$_2$S$_5$-based glass (Li$_x$P$_y$S$_z$, 0<x<3, 0<y<3, 0<z<7) such as LiI—Li$_2$S—P$_2$S$_5$, or mixtures thereof.

In one embodiment of the present invention, the inorganic particles may comprise inorganic particles having a hydrophilic property. Examples of the inorganic particles having the hydrophilic property comprises Al$_2$O$_3$ or aluminum hydroxide based inorganic particles. In addition, the Examples of the aluminum hydroxide based inorganic particles comprises boehmite (γ-AlO(OH)), pseudo-boehmite (Al$_2$O$_3$·H$_2$O), diaspore (α-AlO(OH)), bayerlite(α-AlO(OH)$_3$), gibbsite(γ-AlO(OH)$_3$), nordstrandite (AlO(OH)$_3$) and the likes.

In one embodiment of the present invention, the separator may comprise at least one or more kinds of inorganic particles having such a hydrophilic property. In particular, when a hydrophilic organic solvent such as a carbonate-based organic solvent is used as the organic solvent for the electrolyte, if the inorganic particles having such a hydrophilic property are applied to the porous coating layer of the separator, the electrolyte impregnation property of the electrode assembly can be further improved. In one embodiment of the present invention, when a separator substrate made of a polyolefin-based material is used, it may be difficult to secure sufficient wettability by the electrolyte since the separator substrate exhibits hydrophobic properties. In this case, when inorganic particles having hydrophilic properties are applied to the porous coating layer formed on the surface thereof, low wettability of the separator due to the hydrophobic property of the polyolefin-based separator substrate can be prevented.

The size of the inorganic particles of the porous coating layer is not limited, but is preferably 0.001 μm to 10 μm for formation of a coating layer of uniform thickness and proper porosity. If the size is less than 0.001 μm, the dispersibility of the inorganic particles may decrease, and if the size exceeds 10 μm, the thickness of the porous coating layer may increase to deteriorate mechanical properties, and due to the excessively large pore size, the probability of an internal short circuit during battery charging and discharging increases.

The binder polymer forming the porous coating layer may use any one binder polymer selected from the group consisting of polyvinylidene fluoride-co-hexafluoropropylene (PVdF), polyvinylidene fluoride-co-trichlorethylene, polymethylmethacrylate, polybutylacrylate, polyacrylonitrile, polyvinylpyrrolidone, polyvinylacetate, ethylene vinyl acetate copolymer (polyethylene-co-vinyl acetate), polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan and carboxyl methyl cellulose, or a mixture of two or more thereof, but is not limited thereto.

The composition ratio of the inorganic particles and the binder polymer used in the porous coating layer is, for example, preferably in the range of 50:50 to 99:1, more preferably 70:30 to 95:5. If the content ratio of the inorganic particles to the binder polymer is less than 50:50, the content of the binder polymer increases and the thermal stability improvement of the separator may be deteriorated. In addition, the pore size and porosity may be reduced due to the reduction of the empty space formed among the inorganic particles, which may cause degradation of the final battery performance. If the content of the inorganic particles exceeds 99 parts by weight, the peeling resistance of the porous coating layer may be weakened because the binder polymer content is too small. The thickness of the porous coating layer is not particularly limited, but it is preferably in the range of 0.01 μm to 20 μm. In addition, the pore size and porosity are also not particularly limited, but the pore size is preferably in the range of 0.001 μm to 10 μm, and the porosity is preferably in the range of 10% to 90%. The pore size and porosity mainly depend on the size of the inorganic particles. For example, when inorganic particles having a particle diameter of 1 μm or less are used, the pores are also formed to have a size of about 1 μm or less. Such a pore structure is filled with an electrolyte to be injected later, and the electrolyte filled in this way has an ion transfer role. If the pore size and porosity are less than 0.001 μm and 10%, respectively, the pores may act as a resistance layer, and if the pore size and porosity exceed 10 μm and 90%, respectively, mechanical properties may deteriorate.

The porous coating layer may be formed by dissolving or dispersing the binder polymer in a dispersion medium, then adding inorganic particles to obtain a slurry for forming the porous coating layer, and coating and drying the slurry on at least one surface of the substrate. The dispersion medium preferably has a solubility index similar to that of the binder polymer and a low boiling point. This is to facilitate uniform mixing and subsequent removal of the dispersion medium. Non-limiting examples of the dispersion medium that can be used include acetone, tetrahydrofuran, methylene chloride, chloroform, dimethylformamide, N-methyl-2-pyrrolidone (NMP), cyclohexane, water, or a mixture thereof.

After adding the inorganic particles to a dispersion in which the binder polymer is dispersed in the dispersion medium, it is preferable to crush the inorganic particles. In this case, the crushing time is preferably 1 to 20 hours, and the particle size of the crushed inorganic particles is preferably 0.001 μm to 10 μm as described above. As the crushing method, a conventional method may be used, and in particular, ball milling is preferable.

After that, the binder polymer dispersion in which inorganic particles are dispersed is coated on at least one surface of the porous polymer substrate under a humidity condition of 10% to 80% and dried. The method of coating the dispersion on the porous polymer substrate may use various conventional coating methods known in the art, for example, dip coating, die coating, roll coating, comma coating, or a mixture thereof.

As a component of the porous coating layer, other additives such as a conductive agent may be further included in addition to the inorganic particles and the binder polymer described above.

The finally manufactured separator according to the present disclosure may have a thickness of 1 μm to 100 μm, or 5 μm to 50 μm. If the thickness is less than 1 μm, the function of the separator may not be sufficiently exhibited and mechanical properties may be deteriorated. In addition, the separator may have a porosity of 40% to 60%, and a permeability of 150 to 300 seconds/100 mL.

According to an embodiment of the present disclosure, the porous polymer substrate may use polyethylene or polypropylene series. In addition, Al oxide and Si oxide-based coating materials may be used as the inorganic particles in the porous coating layer.

When using the separator according to an embodiment of the present disclosure, since it has porous coating layers on both surfaces of the porous polymer substrate, it is possible to form a uniform solid electrolyte interfacial layer by improving the impregnation performance for electrolyte, and it is possible to secure superior air permeability compared to the conventional single-sided inorganic coating separator. For example, the air permeability may be within 120 s/100 cc. In addition, even if inorganic porous coating layers are provided on both surfaces, the thickness of the conventional single-sided inorganic coating separator may be realized. For example, the thickness may be less than 15.0 μm.

In addition, when using the separator according to an embodiment of the present disclosure, the stability of the separator is improved to ensure heat resistance and compression resistance. Specifically, it is possible to secure heat resistance properties with heat shrinkage characteristics of less than 5% based on 180° C., and secure puncture strength properties of 550 gf or more. When core deformation occurs during the cycle of a battery employing such a separator, damage or penetration of the separator may be prevented in the stepped portion.

Hereinafter, the structure of the electrode assembly according to an embodiment of the present disclosure will be described in detail.

Figure 11:
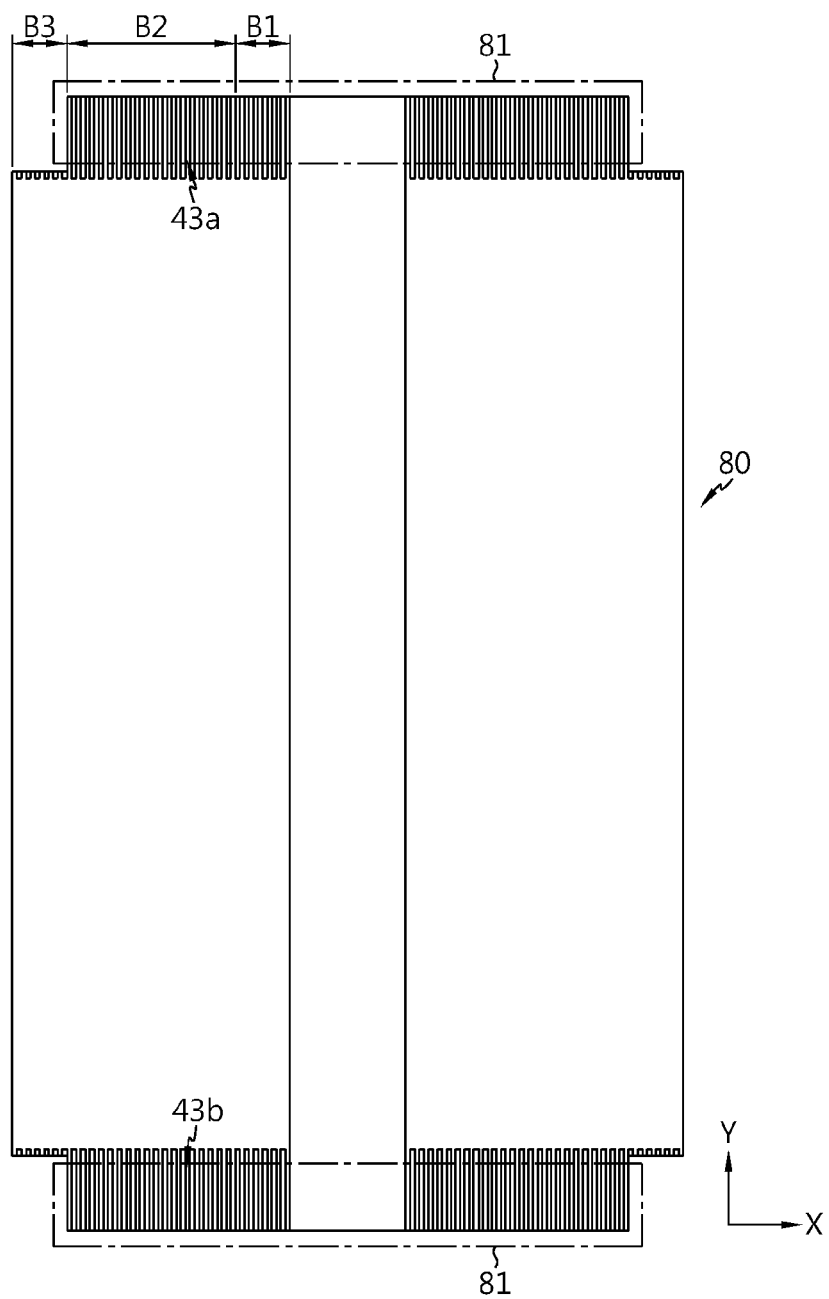
FIG. 11 is a sectional view showing a jelly-roll type electrode assembly in which the electrode plate of the first embodiment is applied to a first electrode plate (a positive electrode plate) and a second electrode plate (a negative electrode plate), taken along the Y-axis direction (axis direction).

FIG. 11 is a sectional view showing a jelly-roll type electrode assembly 80 in which the electrode plate 40 of the first embodiment is applied to the first electrode plate (the positive electrode plate) and the second electrode plate (the negative electrode plate), taken along the Y-axis direction (axis direction).

Figure 2:
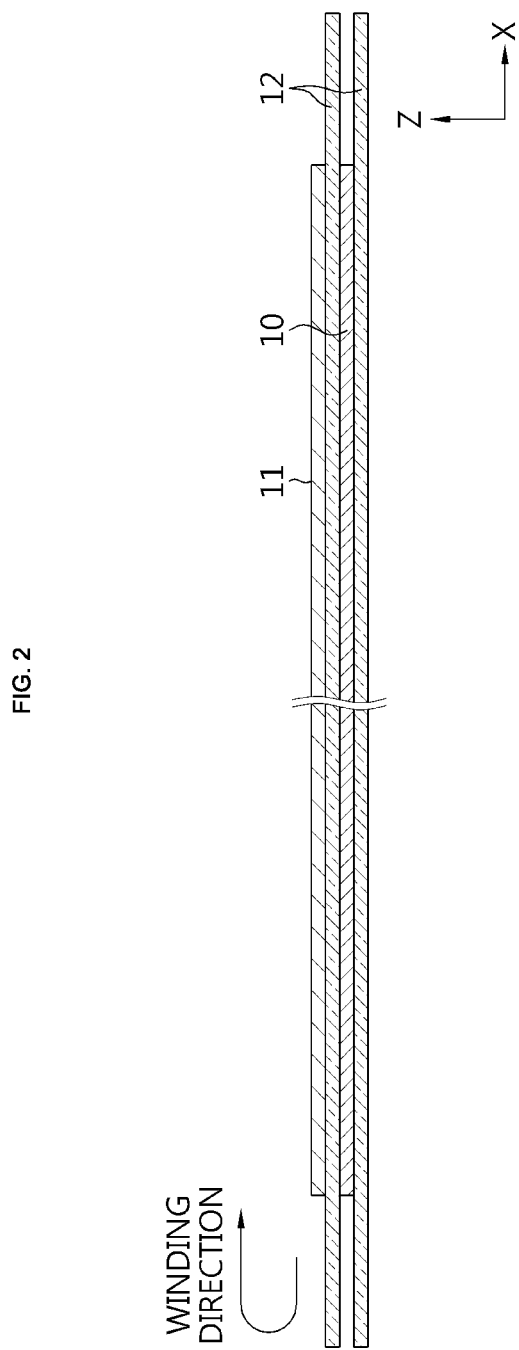
FIG. 2 is a diagram showing an electrode plate winding process of the conventional tab-less cylindrical battery cell.
Figure 3:
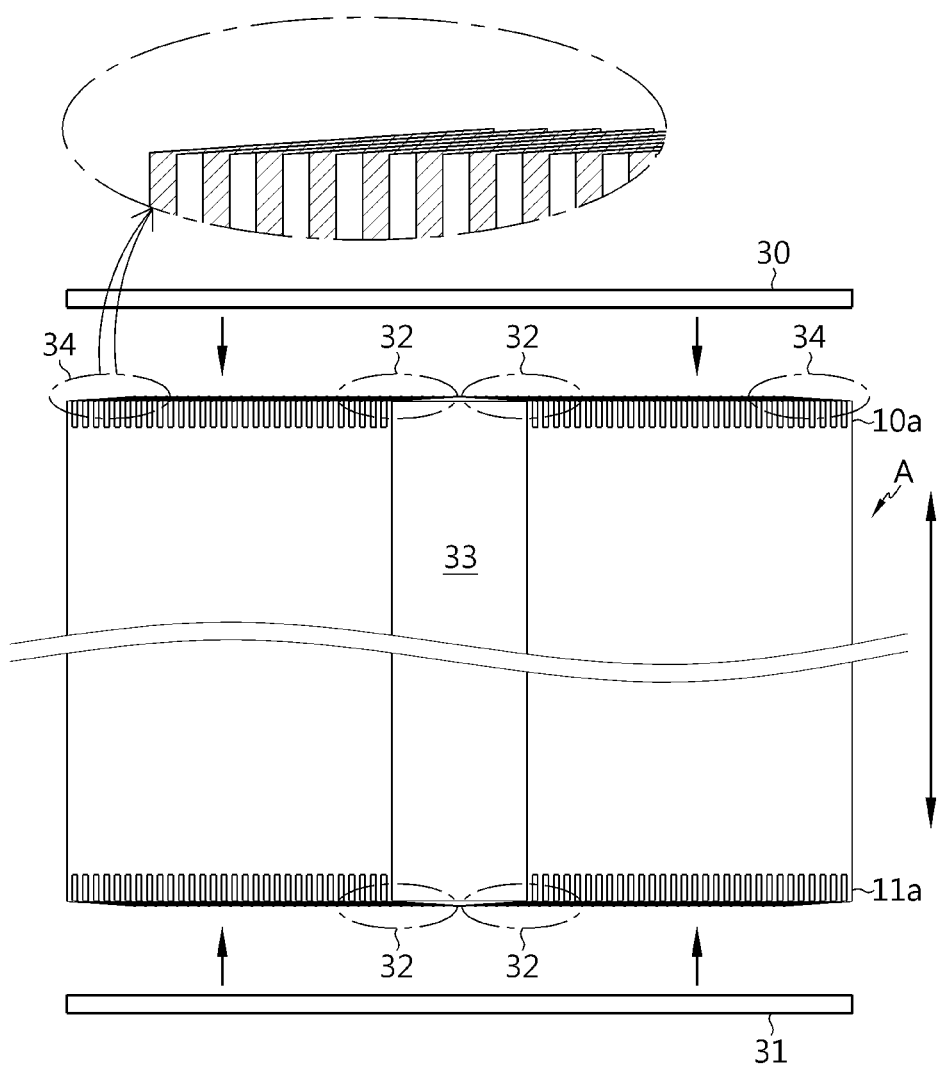
FIG. 3 is a diagram showing a process of welding a current collecting plate to a bent surface of an uncoated portion in the conventional tab-less cylindrical battery cell.

The electrode assembly 80 may be manufactured by the winding method described with reference to FIG. 2. For convenience of description, the protruding structures of the uncoated portions 43a, 43b extending out of the separator are illustrated in detail, and the winding structures of the first electrode plate, the second electrode plate, and the separator are not depicted. The uncoated portion 43a protruding upward extends from the first electrode plate, and the uncoated portion 43b protruding downward extends from the second electrode plate.

The patterns in which the heights of the uncoated portions 43a, 43b change are schematically illustrated. That is, the heights of the uncoated portions 43a, 43b may vary irregularly depending on the position at which the cross-section is cut. For example, when the side portions of the trapezoidal segments 61, 61' are cut, the height of the uncoated portion in the cross section is lower than the height of the segments 61, 61'. Accordingly, it should be understood that the heights of the uncoated portions 43a, 43b depicted in the drawings showing the cross-section of the electrode assembly correspond to the average of the heights (C2 in FIG. 8 and D2 in FIG. 10) of the uncoated portion included in each winding turn.

Referring to FIG. 11, the uncoated portion 43a of the first electrode plate includes a core-side uncoated portion B1 adjacent to the core of the electrode assembly 80, a circumferential uncoated portion B3 adjacent to the outer circumferential surface of the electrode assembly 80, and an intermediate uncoated portion B2 interposed between the core-side uncoated portion B1 and the circumferential uncoated portion B3.

The height (length in the Y-axis direction) of the circumferential uncoated portion B3 is relatively smaller than the height of the intermediate uncoated portion B2. Accordingly, it is possible to prevent an internal short circuit from occurring while the beading portion of the battery can is pressed near the circumferential uncoated portion B3.

The lower uncoated portion 43b has the same structure as the upper uncoated portion 43a. In one modification, the lower uncoated portion 43b may have a conventional electrode plate structure or an electrode plate structure of other embodiments (modifications).

The ends 81 of the upper uncoated portion 43a and the lower uncoated portion 43b may be bent from the outer circumference of the electrode assembly 80 toward the core. At this time, the circumferential uncoated portion B3 may not be substantially bent.

Figure 12:
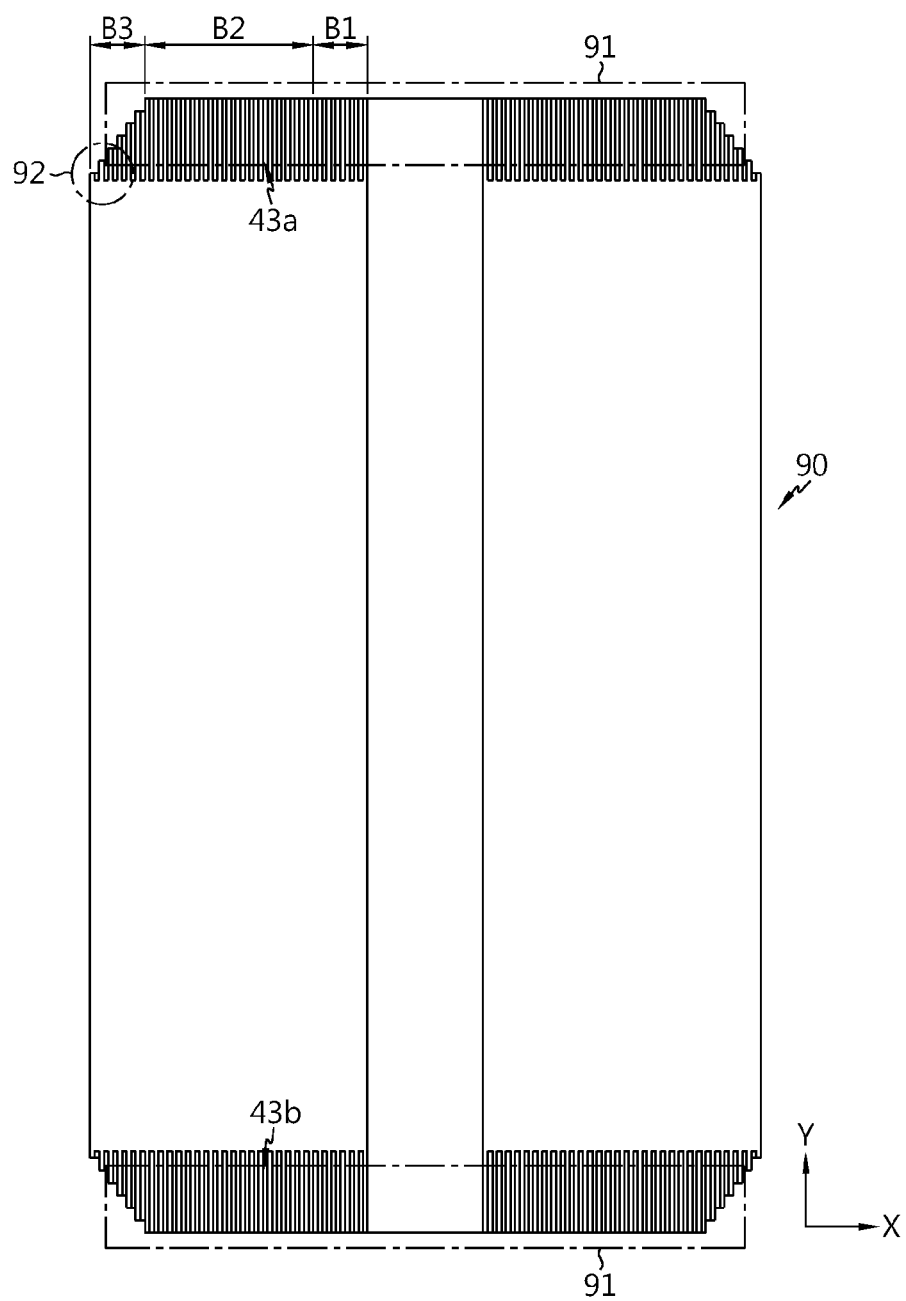
FIG. 12 is a sectional view showing a jelly-roll type electrode assembly in which the electrode plate of the second embodiment is applied to the first electrode plate (the positive electrode plate) and the second electrode plate (the negative electrode plate), taken along the Y-axis direction (axis direction).

FIG. 12 is a sectional view showing a jelly-roll type electrode assembly 90 in which the electrode plate 45 of the second embodiment is applied to the first electrode plate (the positive electrode plate) and the second electrode plate (the negative electrode plate), taken along the Y-axis direction (axis direction).

Referring to FIG. 12, the uncoated portion 43a of the first electrode plate includes a core-side uncoated portion B1 adjacent to the core of the electrode assembly 90, a circumferential uncoated portion B3 adjacent to the outer circumferential surface of the electrode assembly 90, and an intermediate uncoated portion B2 interposed between the core-side uncoated portion B1 and the circumferential uncoated portion B3.

The height of the circumferential uncoated portion B3 is relatively smaller than the height of the intermediate uncoated portion B2 and decreases gradually or stepwise from the core to the outer circumference. Accordingly, it is possible to prevent an internal short circuit from occurring while the beading portion of the battery can is pressed near the circumferential uncoated portion B3.

The lower uncoated portion 43b has the same structure as the upper uncoated portion 43a. In one modification, the lower uncoated portion 43b may have a conventional electrode plate structure or an electrode plate structure of other embodiments (modifications).

The ends 91 of the upper uncoated portion 43a and the lower uncoated portion 43b may be bent from the outer circumference of the electrode assembly 90 to the core. At this time, the outermost portion 92 of the circumferential uncoated portion B3 may not be substantially bent.

Figure 13:
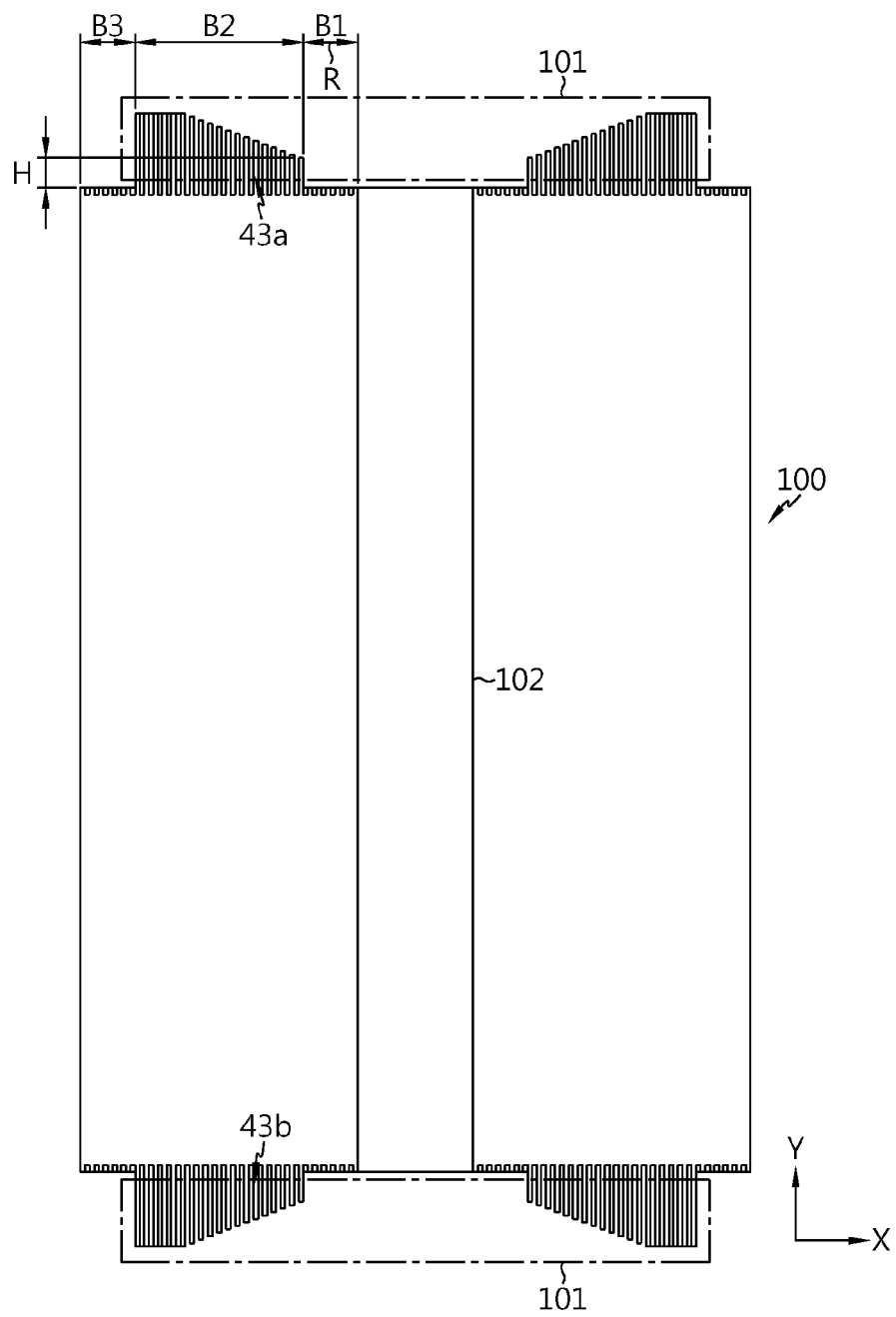
FIG. 13 is a sectional view showing a jelly-roll type electrode assembly in which one of the electrode plates of the third to fifth embodiments (modifications thereof) are applied to the first electrode plate (the positive electrode plate) and the second electrode plate (the negative electrode plate), taken along the Y-axis direction (axis direction).

FIG. 13 is a sectional view showing a jelly-roll type electrode assembly 100 in which any one of the electrode plates 50, 60, 70 of the third to fifth embodiments (modifications thereof) are applied to the first electrode plate (the positive electrode plate) and the second electrode plate (the negative electrode plate), taken along the Y-axis direction (axis direction).

Referring to FIG. 13, the uncoated portion 43a of the first electrode plate includes a core-side uncoated portion B1 adjacent to the core of the electrode assembly 100, a circumferential uncoated portion B3 adjacent to the outer circumferential surface of the electrode assembly 100, and an intermediate uncoated portion B2 interposed between the core-side uncoated portion B1 and the circumferential uncoated portion B3.

The height of the core-side uncoated portion B1 is relatively smaller than the height of the intermediate uncoated portion B2. In addition, the height of the uncoated portion 43a located at the innermost side of the intermediate uncoated portion B2 is equal to or smaller than the radial length (R) of the core-side uncoated portion B1. Here, the height of the uncoated portion means a distance from the base line to the first side or a height of a segment. Therefore, even if the intermediate uncoated portion B2 is bent, the bent portion does not block the cavity 102 in the core of the electrode assembly 100. If the cavity 102 is not blocked, there is no difficulty in the electrolyte injection process and the electrolyte injection efficiency is improved. In addition, by inserting a welding jig through the cavity 102, the welding process between the current collecting plate of the negative (or positive) electrode and the battery can (or the external terminal) may be easily performed.

The height of the circumferential uncoated portion B3 is relatively smaller than the height of the intermediate uncoated portion B2. Accordingly, it is possible to prevent an internal short circuit from occurring while the beading portion of the battery can is pressed near the circumferential uncoated portion B3.

In one modification, the height of the circumferential uncoated portion B3 may be decreased gradually or stepwise, unlike that shown in FIG. 13. Also, in FIG. 13, although the height of the intermediate uncoated portion B2 is partially the same in a circumferential direction, the height of the intermediate uncoated portion B2 may increase gradually or stepwise from the boundary between the core-side uncoated portion B1 and the intermediate uncoated portion B2 to the boundary between the intermediate uncoated portion B2 and the circumferential uncoated portion B3.

The lower uncoated portion 43b has the same structure as the upper uncoated portion 43a. In one modification, the lower uncoated portion 43b may have a conventional electrode plate structure or an electrode plate structure of other embodiments (modifications).

The ends 101 of the upper uncoated portion 43a and the lower uncoated portion 43b may be bent from the outer circumference of the electrode assembly 100 to the core. At this time, the core-side uncoated portion B1 and the circumferential uncoated portion B3 are not substantially bent.

When the intermediate uncoated portion B2 includes a plurality of segments, the bending stress may be relieved so as to prevent the uncoated portion 43a near the base line from being torn or abnormally deformed. In addition, when the width and/or height and/or separation pitch of the segment is adjusted according to the numerical range of the above embodiment, the segments are bent toward the core and overlap in multiple layers thereby to sufficiently secure the welding strength, and an empty hole (gap) is not formed in the bent surface (the surface as viewed along the Y-axis).

Figure 14:
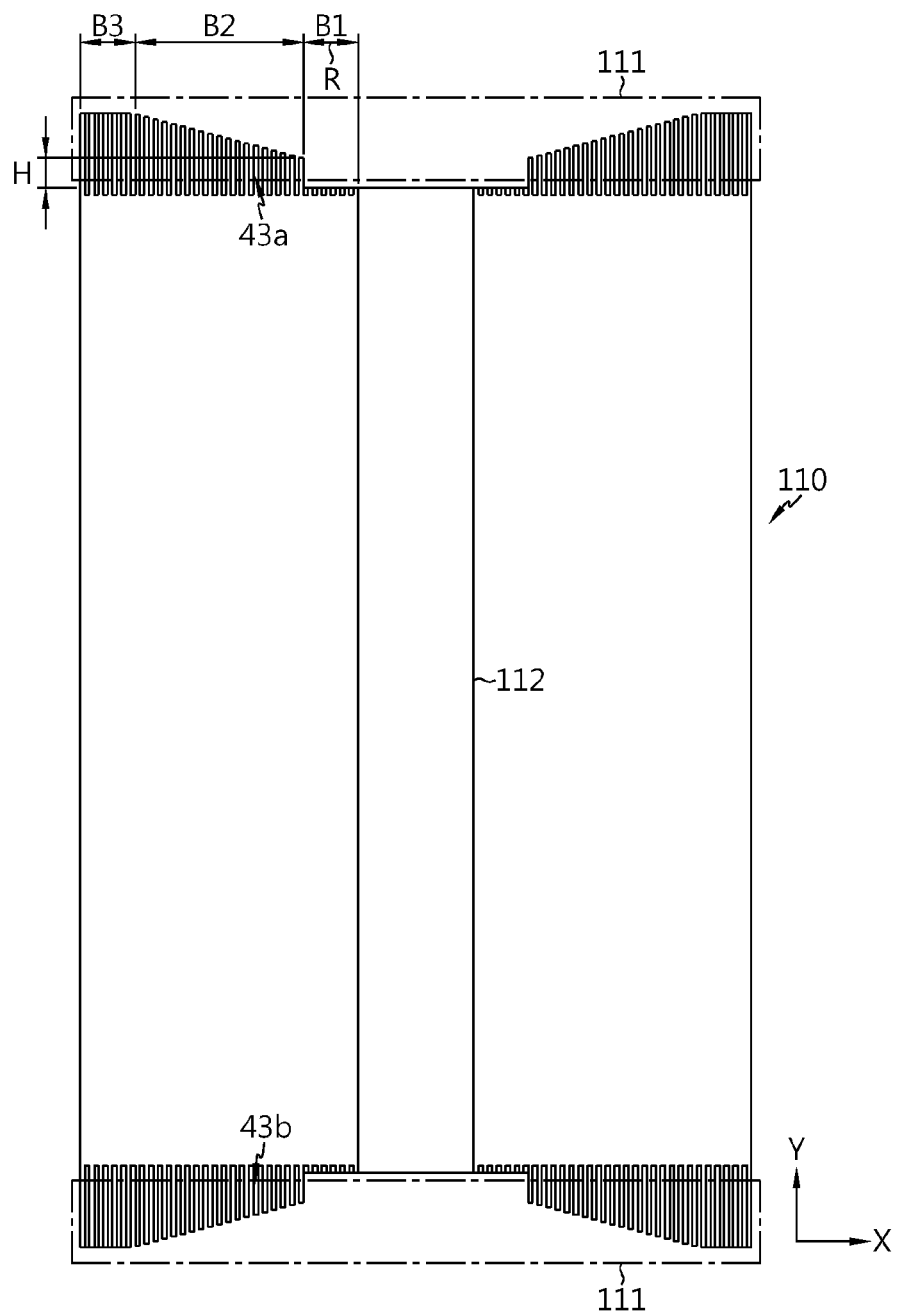
FIG. 14 is a sectional view showing an electrode assembly according to still another embodiment of the present disclosure, taken along the Y-axis direction (axis direction).

FIG. 14 is a sectional view showing an electrode assembly 110 according to still another embodiment of the present disclosure, taken along the Y-axis direction (axis direction).

Referring to FIG. 14, the electrode assembly 110 is substantially the same as the electrode assembly 100 of FIG. 13, except that the height of the circumferential uncoated portion B3 is substantially the same as the height of the outermost side of the intermediate uncoated portion B2.

The circumferential uncoated portion B3 may include a plurality of segments, which are substantially the same as described in the fourth and fifth embodiments (modifications).

In the electrode assembly 110, the height of the core-side uncoated portion B1 is relatively smaller than the height of the intermediate uncoated portion B2. Also, the height (H) of the uncoated portion located at the innermost side of the intermediate uncoated portion B2 is equal to or smaller than the radial length (R) of the core-side uncoated portion B1. Here, the height of the uncoated portion means a distance from the base line to the first side or a height of a segment.

Therefore, even if the intermediate uncoated portion B2 is bent, the bent portion does not block the cavity 112 in the core of the electrode assembly 110. If the cavity 112 is not blocked, there is no difficulty in the electrolyte injection process and the electrolyte injection efficiency is improved. In addition, by inserting a welding jig through the cavity 112, the welding process between the current collecting plate of the negative (or positive) electrode and the battery can (or external terminal) may be easily performed.

In one modification, the structure in which the height of the intermediate uncoated portion B2 increases gradually or stepwise from the core toward the outer circumference may be extended to the circumferential uncoated portion B3. In this case, the height of the uncoated portion 43a may be increased gradually or stepwise from the boundary between the core-side uncoated portion B1 and the intermediate uncoated portion B2 to the outermost surface of the electrode assembly 110.

The lower uncoated portion 43b has the same structure as the upper uncoated portion 43a. In one modification, the lower uncoated portion 43b may have a conventional electrode plate structure or an electrode plate structure of other embodiments (modifications).

The ends 111 of the upper uncoated portion 43a and the lower uncoated portion 43b may be bent from the outer circumference of the electrode assembly 110 to the core. At this time, the core-side uncoated portion B1 is not substantially bent.

When the intermediate uncoated portion B2 and the circumferential uncoated portion B3 include a plurality of segments, the bending stress may be relieved thereby to prevent the uncoated portions 43a, 43b near the notching valley from being torn or abnormally deformed. In addition, when the width and/or height and/or separation pitch of the segment is adjusted according to the numerical range of the above embodiment, the segments are bent toward the core and overlap in multiple layers to sufficiently secure the welding strength, and an empty hole (gap) is not formed in the bent surface (the surface as viewed along the Y-axis).

Figure 15:
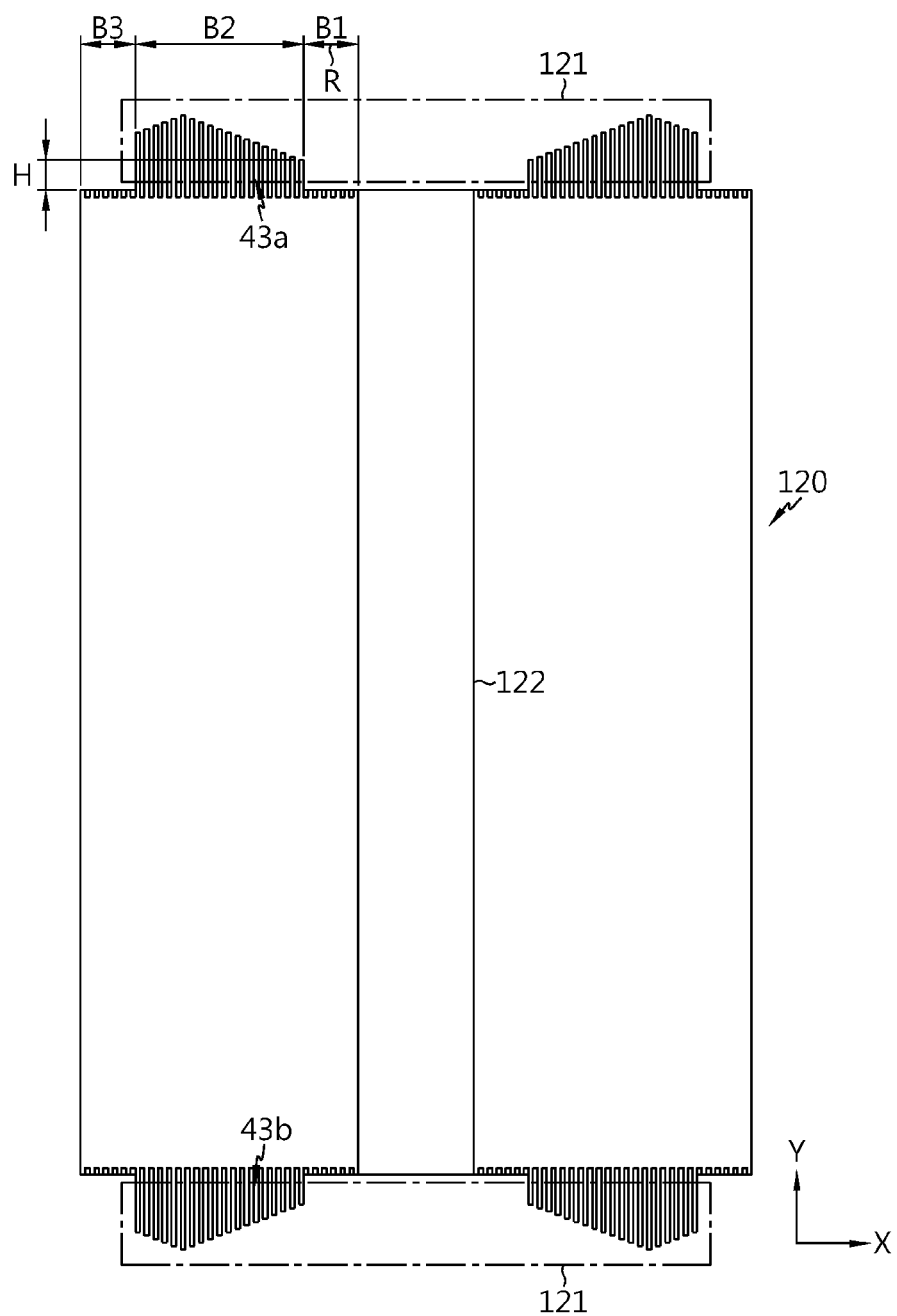
FIG. 15 is a sectional view showing an electrode assembly according to still another embodiment of the present disclosure, taken along the Y-axis direction (axis direction).

FIG. 15 is a sectional view showing an electrode assembly 120 according to still another embodiment of the present disclosure, taken along the Y-axis direction (axis direction).

Referring to FIG. 15, the electrode assembly 120 is substantially the same as the electrode assembly 100 of FIG. 13, except that the height of the intermediate uncoated portion B2 has a pattern increasing and then decreasing gradually or stepwise.

This change in height of the intermediate uncoated portion B2 may be implemented by using the step pattern (see FIG. 6) or adjusting the height of segments (see FIG. 7 or 9) included in the intermediate uncoated portion B2.

In the electrode assembly 120, the height of the core-side uncoated portion B1 is relatively smaller than the height of the intermediate uncoated portion B2. Also, the height (H) of the uncoated portion located at the innermost side of the intermediate uncoated portion B2 is equal to or smaller than the radial length (R) of the core-side uncoated portion B1. Here, the height of the uncoated portion means a distance from the base line to the first side or a height of a segment.

Therefore, even if the intermediate uncoated portion B2 is bent toward the core, the bent portion does not block the cavity 122 in the core of the electrode assembly 120. If the cavity 122 is not blocked, there is no difficulty in the electrolyte injection process, and the electrolyte injection efficiency is improved. In addition, by inserting a welding jig through the cavity 122, the welding process between the current collecting plate of the negative (or negative) electrode and the battery can (or external terminal) may be easily performed.

Also, the height of the circumferential uncoated portion B3 is relatively smaller than the height of the intermediate uncoated portion B2. Accordingly, it is possible to prevent an internal short circuit from occurring while the beading portion of the battery can is pressed near the circumferential uncoated portion B3. In one modification, the height of the circumferential uncoated portion B3 may decrease gradually or stepwise toward the outer circumference.

The lower uncoated portion 43*b* has the same structure as the upper uncoated portion 43*a*. In a modification, the lower uncoated portion 43*b* may have a conventional electrode plate structure or an electrode plate structure of other embodiments (modifications).

The ends 121 of the upper uncoated portion 43*a* and the lower uncoated portion 43*b* may be bent from the outer circumference of the electrode assembly 120 to the core. At this time, the core-side uncoated portion B1 and the circumferential uncoated portion B3 are not substantially bent.

When the intermediate uncoated portion B2 includes a plurality of segments, the bending stress may be relieved thereby to prevent the uncoated portions 43*a*, 43*b* from being torn or abnormally deformed. In addition, when the width and/or height and/or separation pitch of the segment is adjusted according to the numerical range of the above embodiment, the segments are bent toward the core and overlap in multiple layers to sufficiently secure the welding strength, and an empty hole (gap) is not formed in the bent surface (the surface as viewed along the Y-axis).

Figure 16:
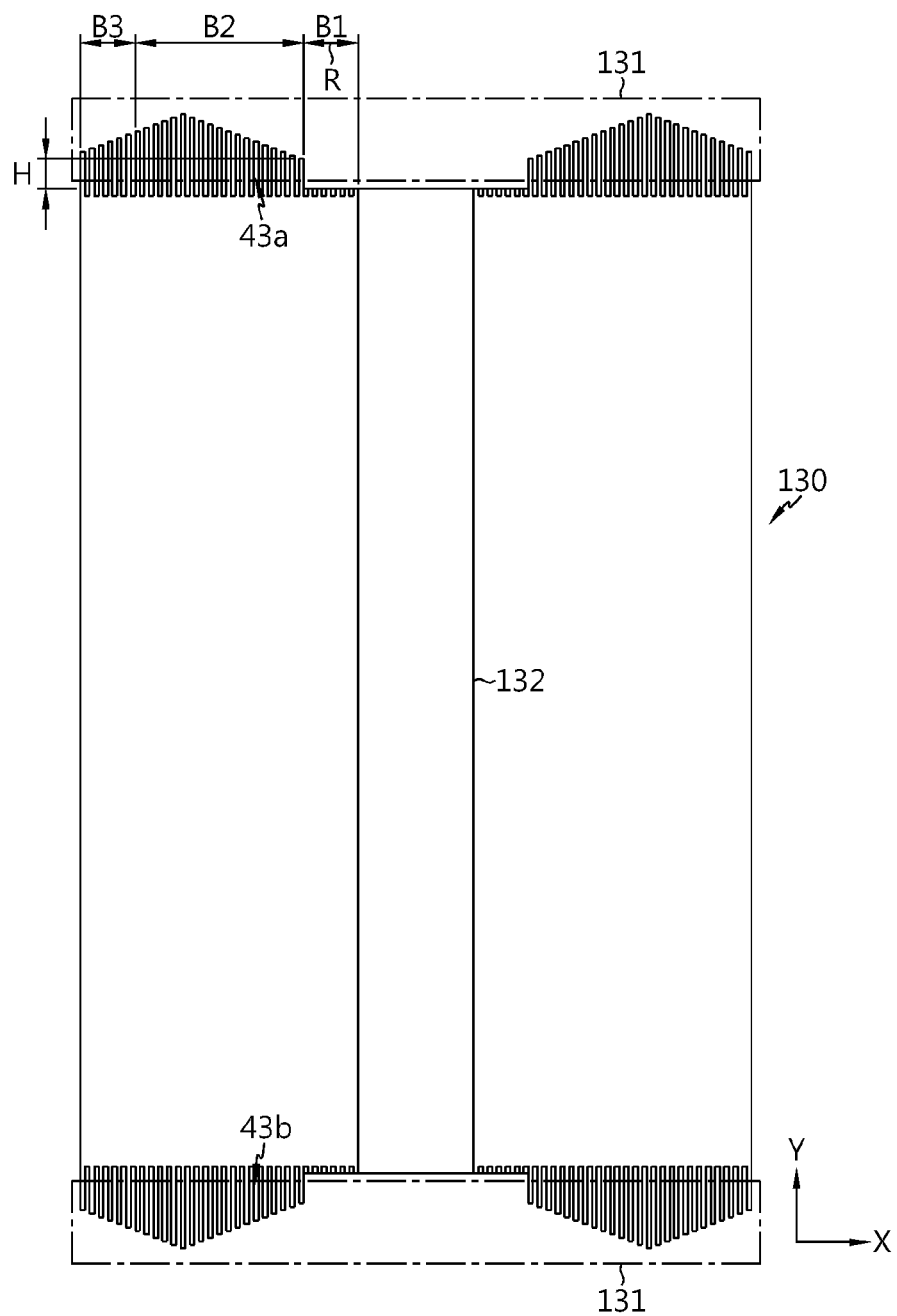
FIG. 16 is a sectional view showing an electrode assembly according to still another embodiment of the present disclosure, taken along the Y-axis direction (axis direction).

FIG. 16 is a sectional view showing an electrode assembly 130 according to still another embodiment of the present disclosure, taken along the Y-axis direction (axis direction).

Referring to FIG. 16, the electrode assembly 130 is substantially the same as the electrode assembly 120 of FIG. 15, except that the height of the circumferential uncoated portion B3 has a pattern that decreases gradually or stepwise from the boundary point of the circumferential uncoated portion B3 and the intermediate uncoated portion B2 toward the outermost surface of the electrode assembly 130.

This change in the height of the circumferential uncoated portion B3 may be implemented by extending the step pattern (see FIG. 6) included in the intermediate uncoated portion B2 to the circumferential uncoated portion B3 while simultaneously decreasing the height of the pattern toward the outer circumference gradually or stepwise. In addition, in another modification, the change in height of the circumferential uncoated portion B3 may be implemented by extending the segment structure of the intermediate uncoated portion B2 to the circumferential uncoated portion B3 while simultaneously decreasing the height of the segments gradually or stepwise toward the outer circumference.

In the electrode assembly 130, the height of the core-side uncoated portion B1 is relatively smaller than the height of the intermediate uncoated portion B2. Also, in the intermediate uncoated portion B2, the height (H) of the innermost uncoated portion is equal to or smaller than the radial length (R) of the core-side uncoated portion B1. Here, the height of the uncoated portion means a distance from the base line to the first side or a height of a segment.

Accordingly, even if the intermediate uncoated portion B2 is bent toward the core, the bent portion does not block the cavity 132 in the core of the electrode assembly 120. If the cavity 132 is not blocked, there is no difficulty in the electrolyte injection process and the electrolyte injection efficiency is improved. In addition, by inserting a welding jig through the cavity 132, the welding process between the current collecting plate of the negative (or positive) electrode and the battery can (or external terminal) may be easily performed.

The lower uncoated portion 43*b* has the same structure as the upper uncoated portion 43*a*. In one modification, the lower uncoated portion 43*b* may have a conventional electrode plate structure or an electrode plate structure of other embodiments (modifications).

The ends 131 of the upper uncoated portion 43*a* and the lower uncoated portion 43*b* may be bent from the outer circumference of the electrode assembly 130 to the core. At this time, the core-side uncoated portion B1 is not substantially bent.

When the intermediate uncoated portion B2 and the circumferential uncoated portion B3 include a plurality of segments, the bending stress may be relieved to prevent the uncoated portions 43*a*, 43*b* near notching valley from being torn or abnormally deformed. In addition, when the width and/or height and/or separation pitch of the segment is adjusted according to the numerical range of the above-described embodiment, the segments are bent toward the core and overlap in multiple layers to sufficiently secure the welding strength, and an empty hole (gap) is not formed in the bent surface (the surface as viewed along the Y-axis).

Various electrode assembly structures according to an embodiment of the present disclosure may be applied to a jelly-roll type cylindrical battery cell.

Preferably, the cylindrical battery cell may be, for example, a cylindrical battery cell whose form factor ratio (defined as a value obtained by dividing the diameter of the cylindrical battery cell by height, namely a ratio of diameter (D) to height (H)) is greater than about 0.4.

Here, the form factor means a value indicating the diameter and height of a cylindrical battery cell. The cylindrical battery cell according to an embodiment of the present disclosure may be, for example, a 46110 cell, a 48750 cell, a 48110 cell, a 48800 cell, or a 46800 cell. In the numerical value representing the form factor, first two numbers indicate the diameter of the cell, next two numbers indicate the height of the cell, and the last number "0" indicates that the cross-section of the cell is circular.

When an electrode assembly having a tab-less structure is applied to a cylindrical battery cell having a form factor ratio of more than 0.4, the stress applied in the radial direction when the uncoated portion is bent is large, so that the uncoated portion may be easily torn. In addition, when welding the current collecting plate to the bent surface of the uncoated portion, it is necessary to sufficiently increase the number of overlapping layers of the uncoated portion in order to sufficiently secure the welding strength and lower the resistance. This requirement may be achieved by the electrode plate and the electrode assembly according to the embodiments (modifications) of the present disclosure.

A battery cell according to an embodiment of the present disclosure may be a cylindrical battery cell having an approximately cylindrical shape, whose diameter is approximately 46 mm, height is approximately 110 mm, and form factor ratio is 0.418.

A battery cell according to another embodiment may be a cylindrical battery cell having a substantially cylindrical shape, whose diameter is about 48 mm, height is about 75 mm, and form factor ratio is 0.640.

A battery cell according to still another embodiment may be a cylindrical battery cell having an approximately cylindrical shape, whose diameter is approximately 48 mm, height is approximately 110 mm, and form factor ratio is 0.418.

A battery cell according to still another embodiment may be a cylindrical battery cell having an approximately cylindrical shape, whose diameter is approximately 48 mm, height is approximately 80 mm, and form factor ratio is 0.600.

A battery cell according to still another embodiment may be a cylindrical battery cell having an approximately cylindrical shape, whose diameter is approximately 46 mm, height is approximately 80 mm, and form factor ratio is 0.575.

Conventionally, battery cells having a form factor ratio of about 0.4 or less have been used. That is, conventionally, for example, 18650 cell, 21700 cell, etc. were used. The 18650 cell has a diameter of approximately 18 mm, height of approximately 65 mm, and a form factor ratio of 0.277. The 21700 cell has a diameter of approximately 21 mm, a height of approximately 70 mm, and a form factor ratio of 0.300.

Hereinafter, the cylindrical battery cell according to an embodiment of the present disclosure will be described in detail.

Figure 17:
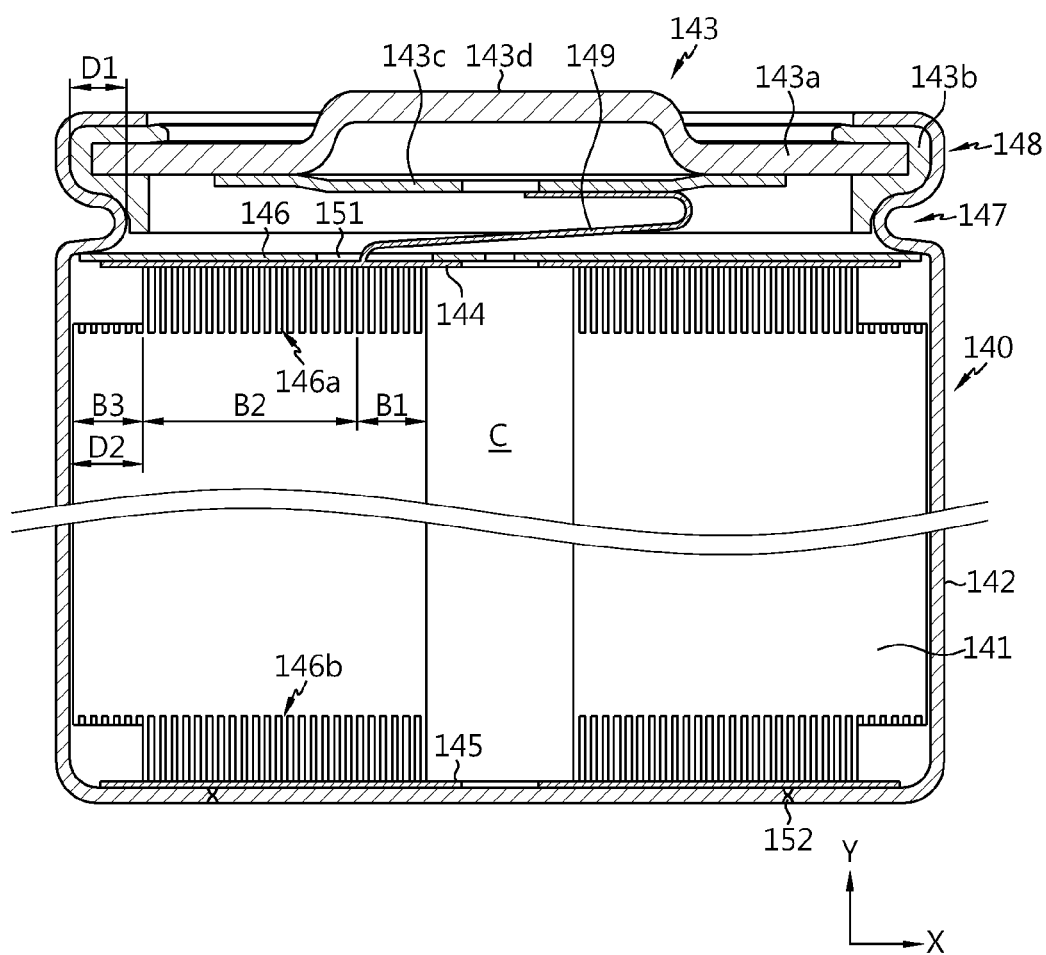
FIG. 17 is a sectional view showing a cylindrical battery cell according to an embodiment of the present disclosure, taken along the Y-axis direction.

FIG. 17 is a sectional view showing a cylindrical battery cell 140 according to an embodiment of the present disclosure, taken along the Y-axis direction.

Referring to FIG. 17, the cylindrical battery cell 140 according to an embodiment of the present disclosure includes an electrode assembly 141 having a first electrode plate, a separator and a second electrode plate, a battery can 142 for accommodating the electrode assembly 141, and a sealing body 143 for sealing an open end of the battery can 142.

The battery can 142 is a cylindrical container with an opening at the top. The battery can 142 is made of a conductive metal material such as aluminum or steel. The battery can 142 accommodates the electrode assembly 10 in the inner space through the top opening and also accommodates the electrolyte.

The electrolyte may be a salt having a structure like $A^+B^-$. Here, $A^+$ includes an alkali metal cation such as $Li^+$, $Na^+$, or $K^+$, or a combination thereof. and $B^-$ includes at least one anion selected from the group consisting of $F^-$, $Cl^-$, $Br^-$, $I^-$, $NO_3^-$, $N(CN)_2^-$, $BF_4^-$, $ClO_4^-$, $Al_1O_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4 PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The electrolyte may also be dissolved in an organic solvent.

The organic solvent is not limited to a specific substance as long as it can be used as a solvent for an electrolyte of an electrochemical device. For examples, the organic solvent may employ carbonate based solvent such as propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone, or a mixture thereof.

The electrode assembly 141 may have a jelly-roll shape. The electrode assembly 141 may be manufactured by winding a laminate formed by sequentially laminating a lower separator, a first electrode plate, an upper separator, and a second electrode plate at least once, based on the winding center (C), as shown in FIG. 2.

The first electrode plate and the second electrode plate have different polarities. That is, if one has positive polarity, the other has negative polarity. At least one of the first electrode plate and the second electrode plate may have an electrode plate structure according to the above embodiments (modifications). In addition, the other of the first electrode plate and the second electrode plate may have a conventional electrode plate structure or an electrode plate structure according to embodiments (modifications).

An uncoated portion 146a of the first electrode plate and an uncoated portion 146b of the second electrode plate protrude from the upper and lower portions of the electrode assembly 141, respectively. The first electrode plate has the electrode plate structure of the first embodiment (modification). Accordingly, regarding the uncoated portion 146a of the first electrode plate, the height of the circumferential uncoated portion B3 is smaller than the height of the uncoated portion of the other region. The circumferential uncoated portion B3 is spaced apart from the inner circumference of the battery can 142, particularly the beading portion 147, with a predetermined interval. Therefore, the circumferential uncoated portion B3 of the first electrode plate does not come into contact with the battery can 142 electrically connected to the second electrode plate, thereby preventing an internal short circuit of the battery cell 140.

The uncoated portion 146b of the second electrode plate has the same height. In a modification, the uncoated portion 146b of the second electrode plate may have the same structure as the uncoated portion 146a of the first electrode plate. In another modification, the uncoated portion 146b of the second electrode plate may optionally have the structure of the uncoated portion of the electrode plate according to embodiments (modifications).

The sealing body 143 may include a cap plate 143a, a first gasket 143b for providing airtightness between the cap plate 143a and the battery can 142 and having insulation, and a connection plate 143c electrically and mechanically coupled to the cap plate 143a.

The cap plate 143*a* is a component made of a conductive metal material, and covers the top opening of the battery can 142. The cap plate 143*a* is electrically connected to the uncoated portion 146*a* of the first electrode plate, and is electrically insulated from the battery can 142 by means of the first gasket 143*b*. Accordingly, the cap plate 143*a* may function as a first electrode terminal of the cylindrical battery cell 140.

The cap plate 143*a* is placed on the beading portion 147 formed on the battery can 142, and is fixed by a crimping portion 148. Between the cap plate 143*a* and the crimping portion 148, the first gasket 143*b* may be interposed to secure the airtightness of the battery can 142 and the electrical insulation between the battery can 142 and the cap plate 143*a*. The cap plate 143*a* may have a protrusion 143*d* protruding upward from the center thereof.

The battery can 142 is electrically connected to the uncoated portion 146*b* of the second electrode plate. Therefore, the battery can 142 has the same polarity as the second electrode plate. If the second electrode plate has negative polarity, the battery can 142 also has negative polarity.

The battery can 142 includes the beading portion 147 and the crimping portion 148 at the top thereof. The beading portion 147 is formed by press-fitting the periphery of the outer circumferential surface of the battery can 142. The beading portion 147 prevents the electrode assembly 141 accommodated inside the battery can 142 from escaping through the top opening of the battery can 142, and may function as a support portion on which the sealing body 143 is placed.

The inner circumference of the beading portion 147 is spaced apart from the circumferential uncoated portion B3 of the first electrode plate with a predetermined interval. More specifically, the lower part of the inner circumference of the beading portion 147 is spaced apart from the circumferential uncoated portion B3 of the first electrode plate with a predetermined interval. In addition, since the circumferential uncoated portion B3 has a low height, the circumferential uncoated portion B3 is not substantially affected even when the battery can 142 is press-fitted from the outside to form the beading portion 147. Accordingly, the circumferential uncoated portion B3 is not compressed by other components such as the beading portion 147, and thus the shape of the electrode assembly 141 is prevented from being partially deformed, thereby preventing a short circuit inside the cylindrical battery cell 140.

Preferably, when the press-in depth of the beading portion 147 is defined as D1 and the radial length from the inner circumference of the battery can 142 to the boundary point of the circumferential uncoated portion B3 and the intermediate uncoated portion B2 is defined as D2, the formula D1≤D2 may be satisfied. In this case, damage to the circumferential uncoated portion B3 is substantially prevented when the battery can 142 is press-fitted to form the beading portion 147.

The crimping portion 148 is formed on the beading portion 147. The crimping portion 148 has an extended and bent shape to cover the outer circumference of the cap plate 143*a* disposed on the beading portion 147 and a part of the upper surface of the cap plate 143*a*.

The cylindrical battery cell 140 may further include a first current collecting plate 144 and/or a second current collecting plate 145 and/or an insulator 146.

The first current collecting plate 144 is coupled to the upper portion of the electrode assembly 141. The first current collecting plate 144 is made of a conductive metal material such as aluminum, copper, nickel and so on, and is electrically connected to the uncoated portion 146*a* of the first electrode plate. A lead 149 may be connected to the first current collecting plate 144. The lead 149 may extend upward above the electrode assembly 141 and be coupled to the connection plate 143*c* or directly coupled to the lower surface of the cap plate 143*a*. The lead 149 may be connected other components by welding.

Preferably, the first current collecting plate 144 may be integrally formed with the lead 149. In this case, the lead 149 may have an elongated plate shape extending outward near the center of the first current collecting plate 144.

The first current collecting plate 144 may include a plurality of unevenness (not shown) radially formed on a lower surface thereof. When the radial unevenness is provided, the unevenness may be press-fitted into the uncoated portion 146*a* of the first electrode plate by pressing the first current collecting plate 144.

The first current collecting plate 144 is coupled to the end of the uncoated portion 146*a* of the first electrode plate. The uncoated portion 146*a* and the first current collecting plate 144 may be coupled, for example, by laser welding. Laser welding may be performed in a manner that partially melts a base material of the current collecting plate. In a modification, the first current collecting plate 144 and the uncoated portion 146*a* may be welded in a state where a solder is interposed therebetween. In this case, the solder may have a lower melting point compared to the first current collecting plate 144 and the uncoated portion 146*a*. Laser welding may be replaced by resistance welding, ultrasonic welding, or the like.

The second current collecting plate 145 may be coupled to the lower surface of the electrode assembly 141. One side of the second current collecting plate 145 may be coupled to the uncoated portion 146*b* of the second electrode plate by welding, and the other side may be coupled to the inner bottom surface of the battery can 142 by welding. The coupling structure between the second current collecting plate 145 and the uncoated portion 146*b* of the second electrode plate may be substantially the same as the coupling structure between the first current collecting plate 144 and the uncoated portion 146*a* of the first electrode plate.

The uncoated portions 146*a*, 146*b* are not limited to the illustrated structure. Accordingly, the uncoated portions 146*a*, 146*b* may selectively adopt not only a conventional uncoated portion structure but also the uncoated portion structure of the electrode plate according to embodiments (modifications).

The insulator 146 may cover the first current collecting plate 144. The insulator 146 may cover the first current collecting plate 144 at the upper surface of the first current collecting plate 144, thereby preventing direct contact between the first current collecting plate 144 and the inner circumference of the battery can 142.

The insulator 146 has a lead hole 151 so that the lead 149 extending upward from the first current collecting plate 144 may be withdrawn therethrough. The lead 149 is drawn upward through the lead hole 151 and coupled to the lower surface of the connection plate 143*c* or the lower surface of the cap plate 143*a*.

A peripheral region of the edge of the insulator 146 may be interposed between the first current collecting plate 144 and the beading portion 147 to fix the coupled body of the electrode assembly 141 and the first current collecting plate 144. Accordingly, the movement of the coupled body of the electrode assembly 141 and the first current collecting plate 144 may be restricted in the height direction of the battery cell 140, thereby improving the assembly stability of the battery cell 140.

The insulator 146 may be made of an insulating polymer resin. In one example, the insulator 146 may be made of polyethylene, polypropylene, polyimide, or polybutylene terephthalate.

The battery can 142 may further include a venting portion 152 formed at a lower surface thereof. The venting portion 152 corresponds to a region having a smaller thickness compared to the peripheral region of the lower surface of the battery can 142. The venting portion 152 is structurally weak compared to the surrounding area. Accordingly, when an abnormality occurs in the cylindrical battery cell 140 and the internal pressure increases to a predetermined level or more, the venting portion 152 may be ruptured so that the gas generated inside the battery can 142 is discharged to the outside.

The venting portion 152 may be formed continuously or discontinuously while drawing a circle at the lower surface of the battery can 142. In a modification, the venting portion 152 may be formed in a straight pattern or other patterns.

Figure 18:
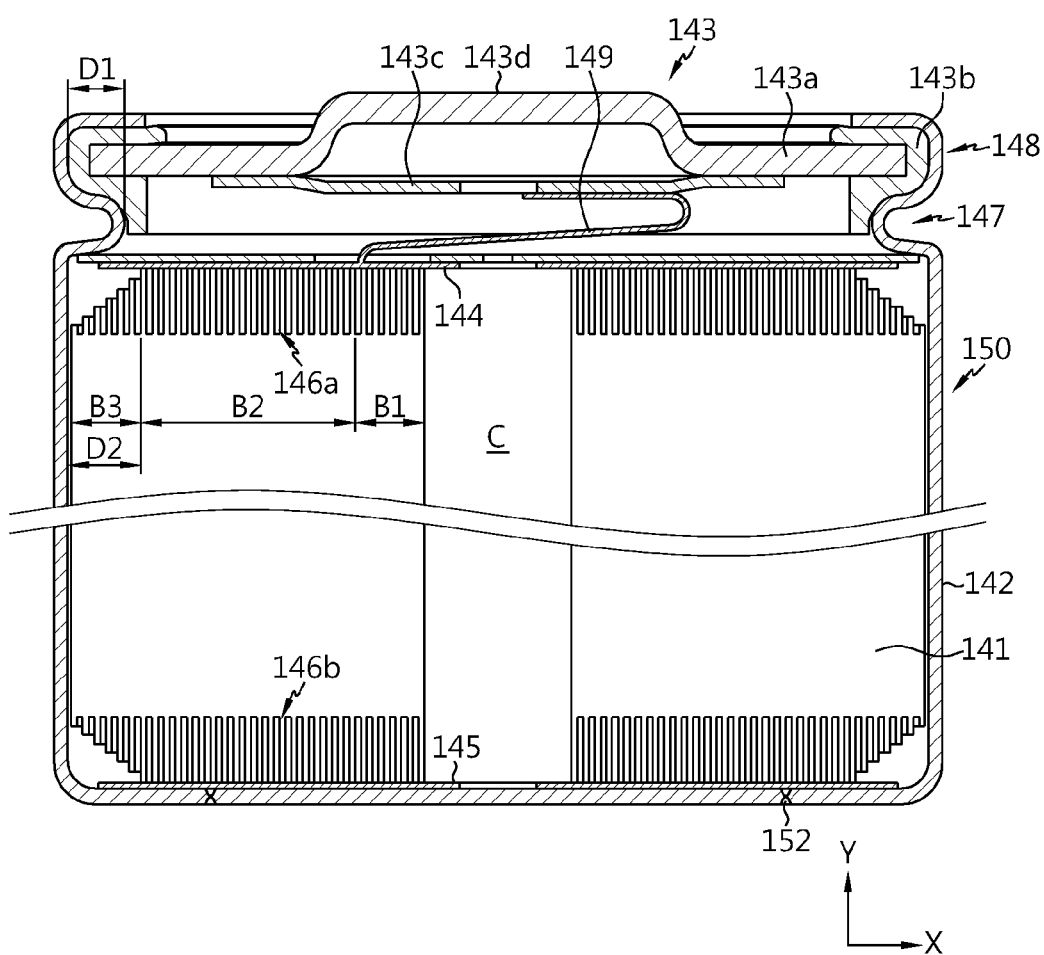
FIG. 18 is a sectional view showing a cylindrical battery cell according to another embodiment of the present disclosure, taken along the Y-axis direction.

FIG. 18 is a sectional view showing a cylindrical battery cell 150 according to another embodiment of the present disclosure, taken along the Y-axis direction.

Referring to FIG. 18, the cylindrical battery cell 150 is substantially the same as the cylindrical battery cell 140 of FIG. 18, except that the electrode plate structure of the second embodiment (modification) is employed in the uncoated portion 146a of the first electrode plate.

Referring to FIG. 18, the uncoated portion 146a of the first electrode plate may have a shape in which the height of the circumferential uncoated portion B3 is decreased gradually or stepwise toward the inner circumference of the battery can 142. Preferably, the virtual line connecting the top end of the circumferential uncoated portion B3 may have the same or similar shape as the inner circumference of the beading portion 147.

The circumferential uncoated portion B3 forms an inclined surface. Accordingly, when the battery can 142 is press-fitted to form the beading portion 147, it is possible to prevent the circumferential uncoated portion B3 from being compressed and damaged by the beading portion 147. In addition, it is possible to suppress the phenomenon that the circumferential uncoated portion B3 comes into contact with the battery can 142 having a different polarity to cause an internal short circuit.

The remaining components of the cylindrical battery cell 150 are substantially the same as the embodiment (modification) described above.

The uncoated portions 146a, 146b are not limited to the illustrated structure. Accordingly, the uncoated portions 146a, 146b may selectively have not only a conventional uncoated portion structure but also the uncoated portion structure of the electrode plate according to embodiments (modifications).

Figure 19:
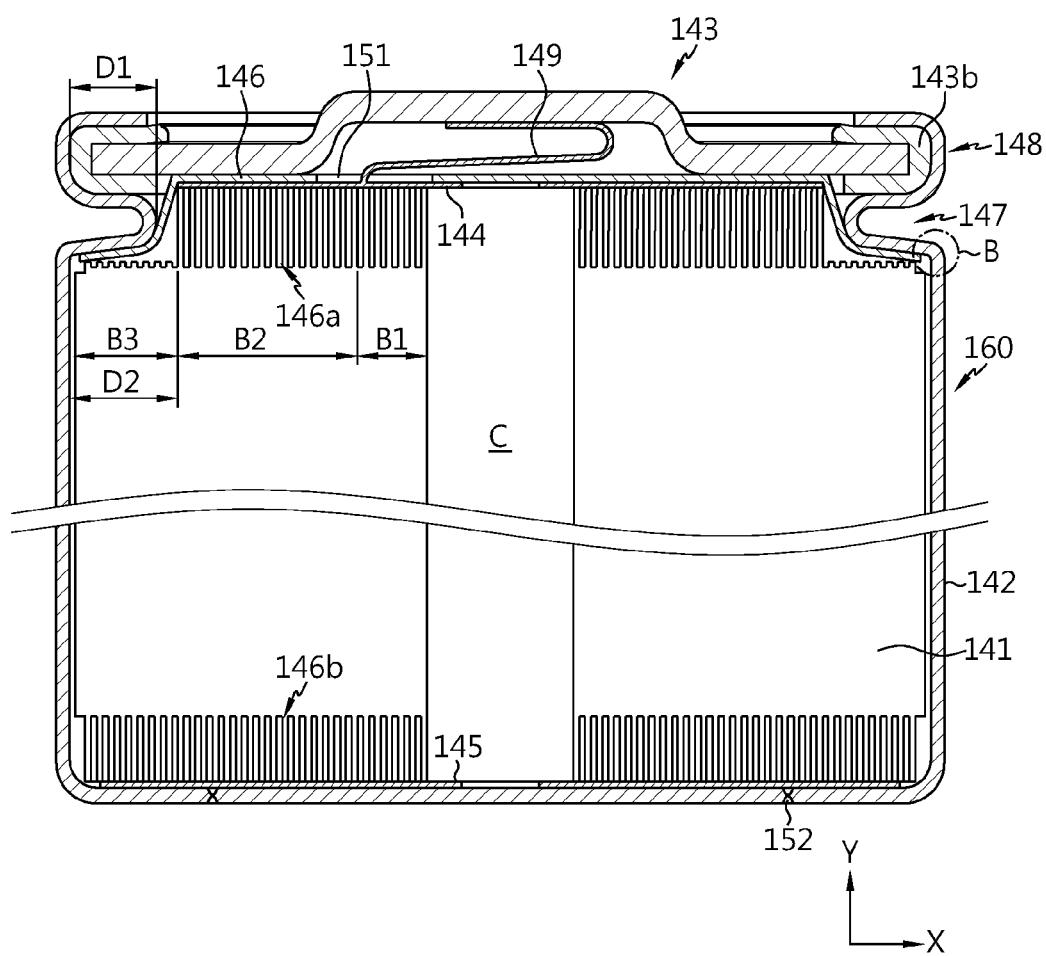
FIG. 19 is a sectional view showing a cylindrical battery cell according to still another embodiment of the present disclosure, taken along the Y-axis direction.

FIG. 19 is a sectional view showing a cylindrical battery cell 160 according to still another embodiment of the present disclosure, taken along the Y-axis direction.

Referring to FIG. 19, the cylindrical battery cell 160 is substantially the same as the cylindrical battery cells 140, 150 described above, except that the lead 149 connected to the first current collecting plate 144 is directly connected to the cap plate 143a of the sealing body 143 through the lead hole 151 of the insulator 146, and the insulator 146 and the first current collecting plate 144 have a structure in close contact with the lower surface of the cap plate 143a.

In the cylindrical battery cell 160, the diameter of the first current collecting plate 144 and the outermost diameter of the intermediate uncoated portion B2 are smaller than the minimum inner diameter of the battery can 142. Also, the diameter of the first current collecting plate 144 may be equal to or greater than the outermost diameter of the intermediate uncoated portion B2.

Specifically, the minimum inner diameter of the battery can 142 may correspond to the inner diameter of the battery can 142 at a position where the beading portion 147 is formed. At this time, the outermost diameter of the first current collecting plate 144 and the intermediate uncoated portion B2 is smaller than the inner diameter of the battery can 142 at the position where the beading portion 147 is formed. Also, the diameter of the first current collecting plate 144 may be equal to or greater than the outermost diameter of the intermediate uncoated portion B2. The peripheral region of the edge of the insulator 146 may be interposed between the circumferential uncoated portion B3 and the beading portion 147 in a state of being bent downward to fix the coupled body of the electrode assembly 141 and the first current collecting plate 144.

Preferably, the insulator 146 may include a portion covering the circumferential uncoated portion B3 and a portion covering the first current collecting plate 144, and a portion connecting these two portions may have a form curved together in response to the curved shape of the beading portion 147. The insulator 146 may insulate the circumferential uncoated portion B3 and the inner circumference of the beading portion 147 and at the same time insulate the first current collecting plate 144 and the inner circumference of the beading portion 147.

The first current collecting plate 144 may be positioned higher than the lower part of the beading portion 147, and may be coupled to the core-side uncoated portion B1 and the intermediate uncoated portion B2. At this time, the press-in depth D1 of the beading portion 147 is less than or equal to the distance D2 from the inner circumference of the battery can 142 to the boundary between the circumferential uncoated portion B3 and the intermediate uncoated portion B2. Accordingly, the core-side uncoated portion B1, the intermediate uncoated portion B2, and the first current collecting plate 144 coupled thereto may be positioned higher than the lower part of the beading portion 147. The lower part of the beading portion 147 means a base line area between the portion of the battery can 142 in which the electrode assembly 141 is accommodated and the beading portion 147.

Since the core-side uncoated portion B1 and the intermediate uncoated portion B2 occupy the inner space of the beading portion 147 in the radial direction, an empty space between the electrode assembly 141 and the cap plate 143a may be minimized. In addition, the connection plate 143c located in the empty space between the electrode assembly 141 and the cap plate 143a is omitted. Accordingly, the lead 149 of the first current collecting plate 144 may be directly coupled to the lower surface of the cap plate 143a. According to the above structure, an empty space in the battery cell may be reduced, and the energy density may be maximized as much as the reduced empty space.

In the cylindrical battery cell 160, the first current collecting plate 144 and the second current collecting plate 145 may be welded to the ends of the uncoated portions 146a, 146b, respectively, in the same manner as in the above embodiment.

The uncoated portions 146a, 146b are not limited to the illustrated structure. Accordingly, the uncoated portions 146*a*, 146*b* may selectively have not only a conventional uncoated portion structure but also the uncoated portion structure of the electrode plate according to embodiments (modifications).

Figure 20:
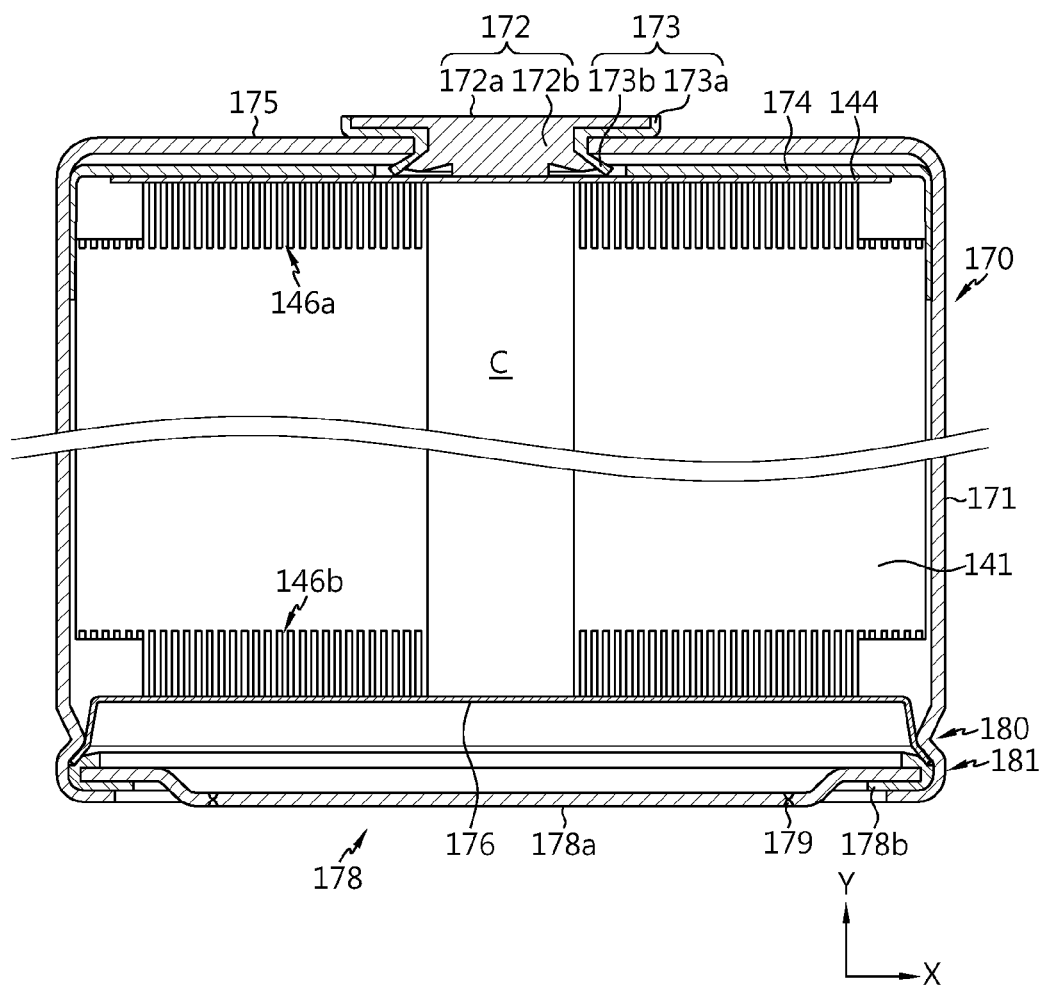
FIG. 20 is a sectional view showing a cylindrical battery cell according to still another embodiment of the present disclosure, taken along the Y-axis.

FIG. 20 is a sectional view showing a cylindrical battery cell 170 according to still another embodiment of the present disclosure, taken along the Y-axis.

Referring to FIG. 20, the structure of the electrode assembly of the cylindrical battery cell 170 is substantially the same as that of the cylindrical battery cell 140 of in FIG. 17, and the other structure except for the electrode assembly is changed.

Specifically, the cylindrical battery cell 170 includes a battery can 171 through which a rivet terminal 172 is installed. The rivet terminal 172 is installed on the closed surface (the upper surface in the drawing) of the battery can 171. The rivet terminal 172 is riveted to a perforation hole of the battery can 171 in a state where a second gasket 173 made of an insulating material is interposed therebetween. The rivet terminal 172 is exposed to the outside in a direction opposite to the direction of gravity.

The rivet terminal 172 includes a terminal exposing portion 172*a* and a terminal insert portion 172*b*. The terminal exposing portion 172*a* is exposed to the outside of the closed surface of the battery can 171. The terminal exposing portion 172*a* may be located approximately at a central portion of the closed surface of the battery can 171. The maximum diameter of the terminal exposing portion 172*a* may be larger than the maximum diameter of the perforation hole formed in the battery can 171. The terminal insert portion 172*b* may be electrically connected to the uncoated portion 146*a* of the first electrode plate through approximately the central portion of the closed surface of the battery can 171. The terminal insert portion 172*b* may be riveted onto the inner surface of the battery can 171. That is, the end of the terminal insert portion 172*b* may have a shape curved toward the inner surface of the battery can 171. The maximum diameter of the end of the terminal insert portion 172*b* may be larger than the maximum diameter of the perforation hole of the battery can 171.

The lower surface of the terminal insert portion 172*b* may be welded to the first current collecting plate 144 connected to the uncoated portion 146*a* of the first electrode plate. An insulation cap 174 made of an insulating material may be interposed between the first current collecting plate 144 and the inner surface of the battery can 171. The insulation cap 174 covers the upper portion of the first current collecting plate 144 and the top edge of the electrode assembly 141. Accordingly, it is possible to prevent the circumferential uncoated portion B3 of the electrode assembly 141 from contacting the inner surface of the battery can 171 having a different polarity to cause a short circuit. The terminal insert portion 172*b* of the rivet terminal 172 may be welded to the first current collecting plate 144 through the insulation cap 174.

The second gasket 173 is interposed between the battery can 171 and the rivet terminal 172 to prevent the battery can 171 and the rivet terminal 172 having opposite polarities from electrically contacting each other. Accordingly, the upper surface of the battery can 171 having an approximately flat shape may function as a second electrode terminal of the cylindrical battery cell 170.

The second gasket 173 includes a gasket exposing portion 173*a* and a gasket insert portion 173*b*. The gasket exposing portion 173*a* is interposed between the terminal exposing portion 172*a* of the rivet terminal 172 and the battery can 171. The gasket insert portion 173*b* is interposed between the terminal insert portion 172*b* of the rivet terminal 172 and the battery can 171. The gasket insert portion 173*b* may be deformed together when the terminal insert portion 172*b* is riveted, so as to be in close contact with the inner surface of the battery can 171. The second gasket 173 may be made of, for example, a polymer resin having insulation.

The gasket exposing portion 173*a* of the second gasket 173 may have an extended shape to cover the outer circumference of the terminal exposing portion 172*a* of the rivet terminal 172. When the second gasket 173 covers the outer circumference of the rivet terminal 172, it is possible to prevent a short circuit from occurring while an electrical connection part such as a bus bar is coupled to the upper surface of the battery can 171 and/or the rivet terminal 172. Although not shown in the drawings, the gasket exposing portion 173*a* may have an extended shape to cover not only the outer circumference surface of the terminal exposing portion 172*a* but also a part of the upper surface thereof.

When the second gasket 173 is made of a polymer resin, the second gasket 173 may be coupled to the battery can 171 and the rivet terminal 172 by thermal fusion. In this case, airtightness at the coupling interface between the second gasket 173 and the rivet terminal 172 and at the coupling interface between the second gasket 173 and the battery can 171 may be enhanced. Meanwhile, when the gasket exposing portion 173*a* of the second gasket 173 has a shape extending to the upper surface of the terminal exposing portion 172*a*, the rivet terminal 172 may be integrally coupled with the second gasket 173 by insert injection molding.

In the upper surface of the battery can 171, a remaining area 175 other than the area occupied by the rivet terminal 172 and the second gasket 173 corresponds to the second electrode terminal having a polarity opposite to that of the rivet terminal 172.

The second current collecting plate 176 is coupled to the lower portion of the electrode assembly 141. The second current collecting plate 176 is made of a conductive metal material such as aluminum, steel, copper or nickel, and is electrically connected to the uncoated portion 146*b* of the second electrode plate.

Preferably, the second current collecting plate 176 is electrically connected to the battery can 171. To this end, at least a portion of the edge of the second current collecting plate 176 may be interposed and fixed between the inner surface of the battery can 171 and a first gasket 178*b*. In one example, at least a portion of the edge of the second current collecting plate 176 may be fixed to the beading portion 180 by welding in a state of being supported on the lower surface of the beading portion 180 formed at the bottom of the battery can 171. In a modification, at least a portion of the edge of the second current collecting plate 176 may be directly welded to the inner wall surface of the battery can 171.

The second current collecting plate 176 may include a plurality of unevenness (not shown) radially formed on a surface facing the uncoated portion 146*b*. When the unevenness is formed, the unevenness may be press-fitted into the uncoated portion 146*b* by pressing the second current collecting plate 176.

Preferably, the second current collecting plate 176 and the ends of the uncoated portion 146*b* may be coupled by welding, for example, laser welding.

A sealing body 178 for sealing the lower open end of the battery can 171 includes a cap plate 178*a* and a first gasket 178*b*. The first gasket 178*b* electrically separates the cap plate 178*a* and the battery can 171. A crimping portion 181 fixes the edge of the cap plate 178a and the first gasket 178b together. The cap plate 178a has a venting portion 179. The configuration of the venting portion 179 is substantially the same as the above embodiment (modification).

Preferably, the cap plate 178a is made of a conductive metal material. However, since the first gasket 178b is interposed between the cap plate 178a and the battery can 171, the cap plate 178a does not have electrical polarity. The sealing body 178 seals the open end of the lower portion of the battery can 171 and functions to discharge gas when the internal pressure of the battery cell 170 increases over a critical value.

Preferably, the rivet terminal 172 electrically connected to the uncoated portion 146a of the first electrode plate is used as the first electrode terminal. In addition, in the upper surface of the battery can 171 electrically connected to the uncoated portion 146b of the second electrode plate through the second current collecting plate 176, a part 175 except for the rivet terminal 172 is used as the second electrode terminal having a different polarity from the first electrode terminal. If two electrode terminals are located at the upper portion of the cylindrical battery cell 170 as above, it is possible to arrange electrical connection components such as bus bars at only one side of the cylindrical battery cell 170. This may bring about simplification of the battery pack structure and improvement of energy density. In addition, since the part 175 used as the second electrode terminal has an approximately flat shape, a sufficient bonding area may be secured for bonding electrical connection components such as bus bars. Accordingly, the cylindrical battery cell 170 may reduce the resistance at the bonding portion of the electrical connection components to a desirable level.

Meanwhile, the structure of the uncoated portion and the structure of the electrode assembly 141 are not limited to those shown in the drawings, and may be replaced with the structures of the above embodiments (modifications).

Figure 21:
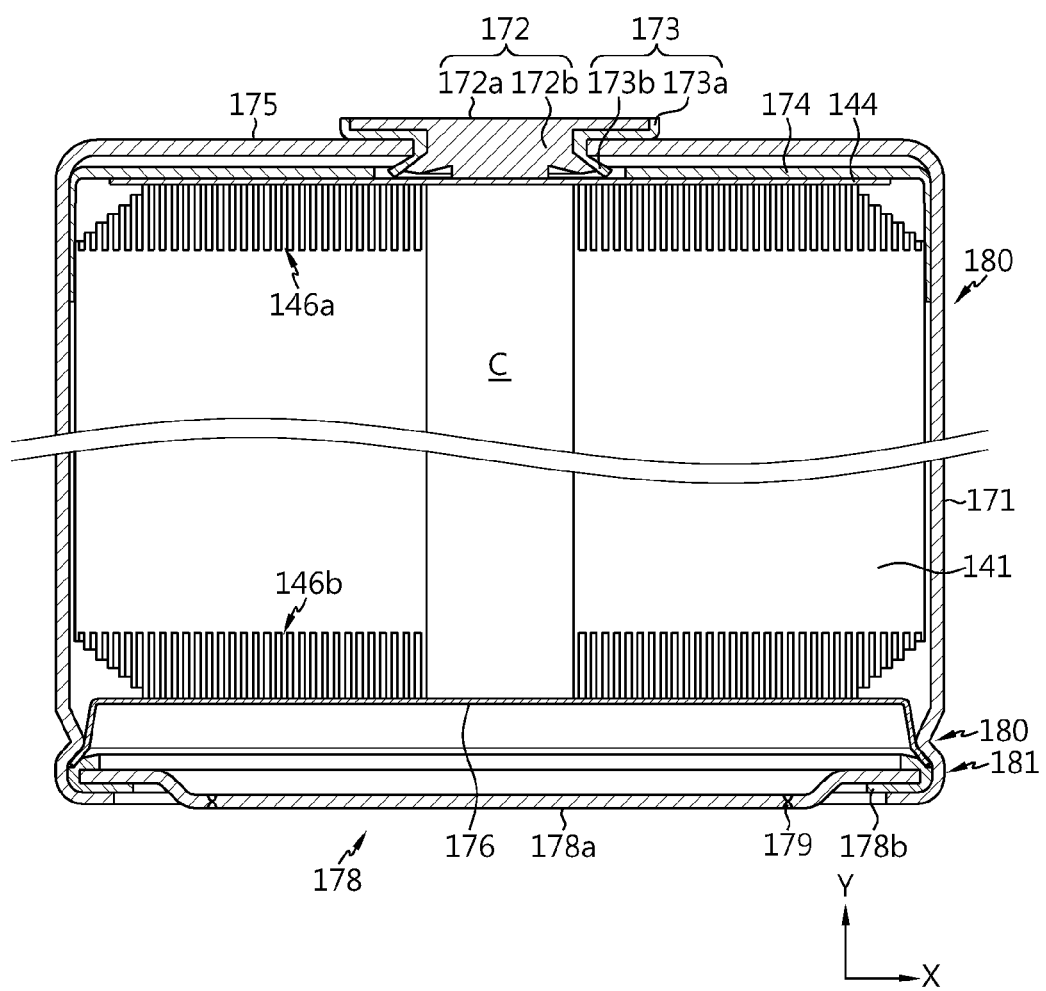
FIG. 21 is a sectional view showing a cylindrical battery cell according to still another embodiment of the present disclosure, taken along the Y-axis.

FIG. 21 is a sectional view showing a cylindrical battery cell 180 according to still another embodiment of the present disclosure, taken along the Y-axis.

Referring to FIG. 21, the structure of the electrode assembly 141 of the cylindrical battery cell 180 is substantially the same as that of the cylindrical battery cell 150 illustrated in FIG. 18, and the components other than the electrode assembly 141 are substantially the same as the cylindrical battery cell 170 shown in FIG. 20.

Accordingly, the configuration of the embodiment (modification) with respect to the cylindrical battery cells 150, 170 may be equally applied to the cylindrical battery cell 180.

In addition, the structure of the electrode assembly 141 and the structure of the uncoated portion are not limited to those shown in the drawing, and may be replaced with the structures of the above embodiments (modifications).

Figure 22:
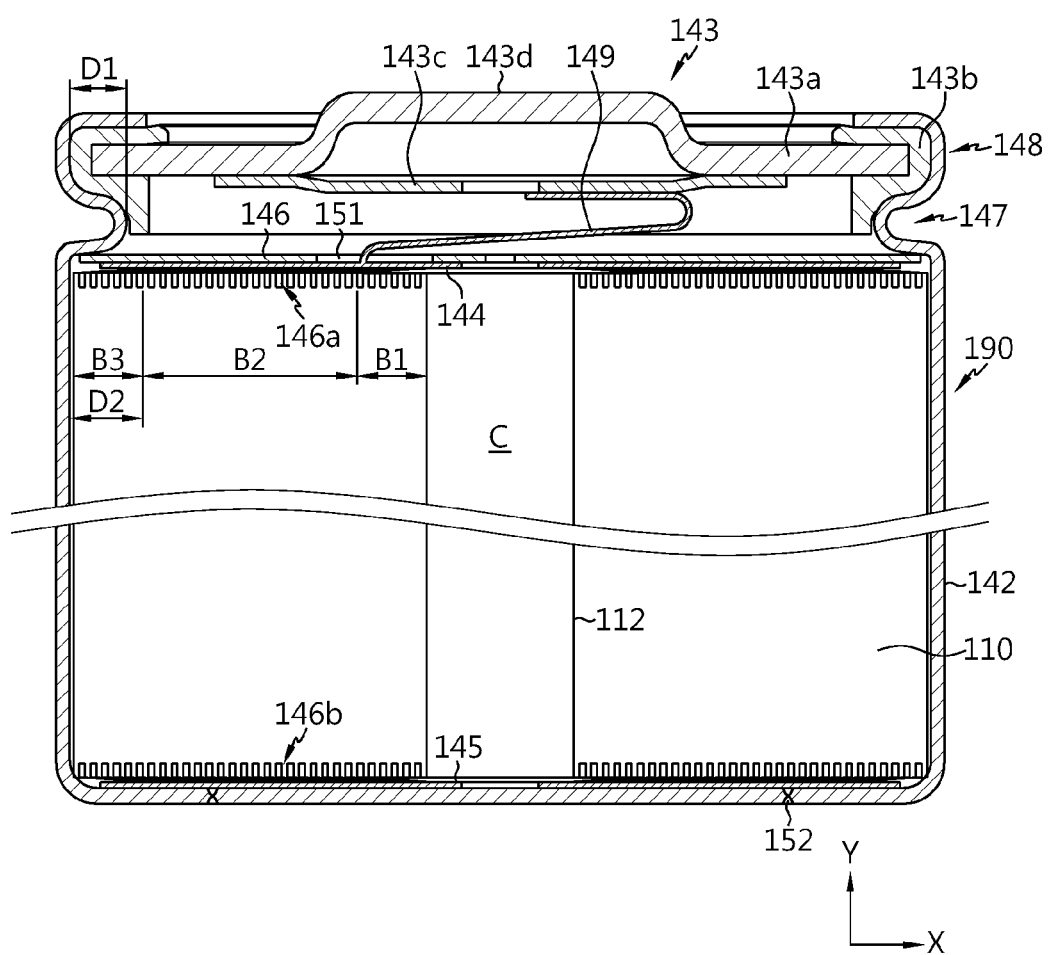
FIG. 22 is a sectional view showing a cylindrical battery cell according to still another embodiment of the present disclosure, taken along the Y-axis.

FIG. 22 is a sectional view showing a cylindrical battery cell 190 according to still another embodiment of the present disclosure, taken along the Y-axis.

Referring to FIG. 22, the cylindrical battery cell 190 includes the electrode assembly 110 illustrated in FIG. 14, and the components other than the electrode assembly 110 are substantially the same as the cylindrical battery cell 140 illustrated in FIG. 17.

Referring to FIG. 22, the uncoated portions 146a, 146b of the electrode assembly 110 are bent from the outer circumference to the core. At this time, since the core-side uncoated portion B1 has a lower height than the other portions, the core-side uncoated portion B1 is not substantially bent. The first current collecting plate 144 may be welded to the bent surface of the uncoated portion 146a, and the second current collecting plate 145 may be welded to the bent surface of the uncoated portion 146b. The bent surface may be formed on the upper and lower portions of the electrode assembly 110, respectively, while overlapping in multiple layers when the uncoated portions 146a, 146b are bent.

In the electrode assembly 110, the height of the core-side uncoated portion B1 is relatively smaller than that of the other portions. Also, as shown in FIG. 14, the height (H) of the uncoated portion located at the innermost side of the intermediate uncoated portion B2 is equal to or smaller than the radial length (R) of the core-side uncoated portion B1. Here, the height of the uncoated portion means a distance from the base line to the first side or a height of a segment.

Accordingly, even when the uncoated portion 146a is bent toward the core, the cavity 112 in the core of the electrode assembly 110 may be opened upward without being blocked.

If the cavity 112 is not blocked, there is no difficulty in the electrolyte injection process and the electrolyte injection efficiency is improved. In addition, by inserting a welding jig through the cavity 112, the welding process between the second current collecting plate 145 and the battery can 142 may be easily performed.

When the uncoated portions 146a, 146b have a segment structure, if the width and/or height and/or separation pitch of the segments are adjusted to satisfy the numerical ranges of the above embodiment, the segments are overlapped in multiple layers to sufficiently secure welding strength when the segments are bent, and an empty space (gap) is not formed in the bent surface.

The structures of the uncoated portions 146a, 146b may be changed to any structure according to the above embodiments (modifications) differently from those shown in the drawings. In addition, a conventional uncoated portion structure may be applied to any one of the uncoated portions 146a, 146b without limitation.

Figure 23:
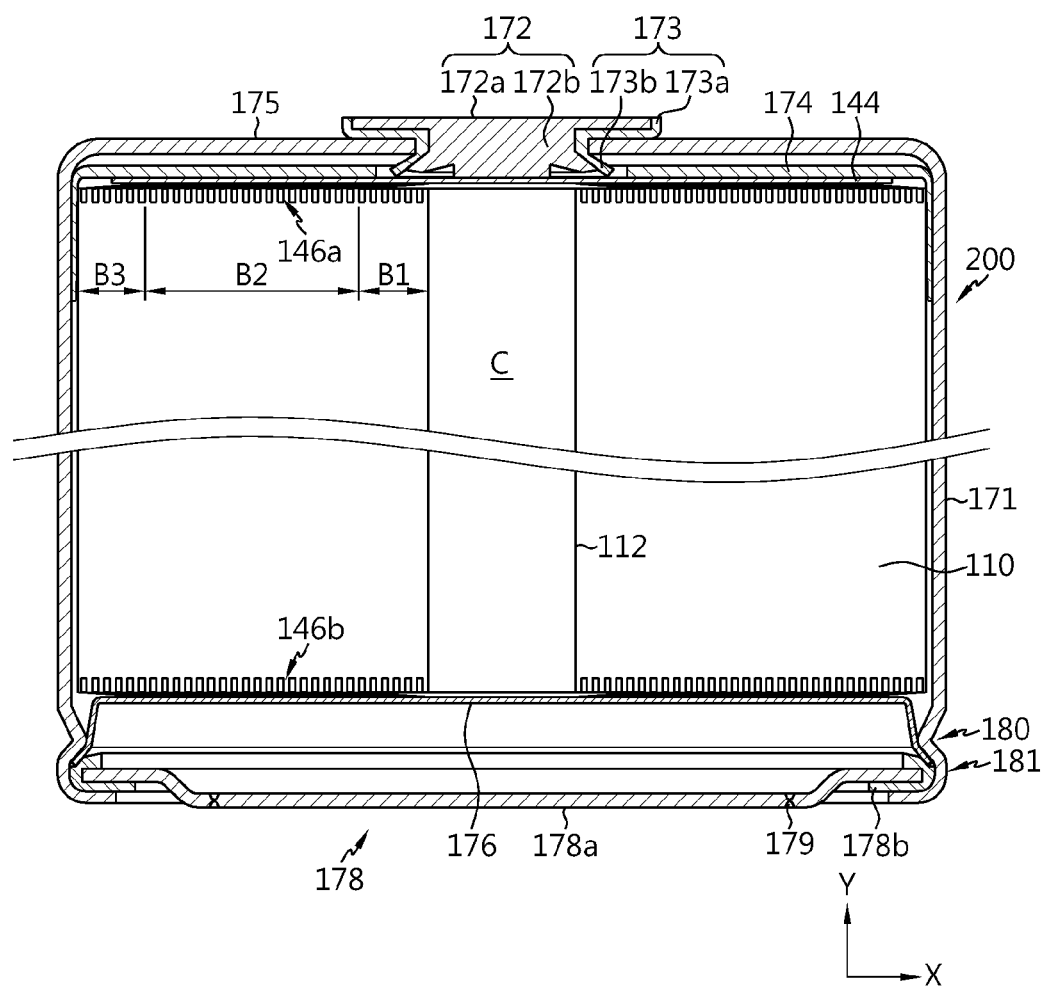
FIG. 23 is a sectional view showing a cylindrical battery cell according to still another embodiment of the present disclosure, taken along the Y-axis.

FIG. 23 is a sectional view showing a cylindrical battery cell 200 according to still another embodiment of the present disclosure, taken along the Y-axis.

Referring to FIG. 23, the cylindrical battery cell 200 includes the electrode assembly 110 illustrated in FIG. 14, and the components other than the electrode assembly 110 are substantially the same as those of the cylindrical battery cell 180 illustrated in FIG. 21.

Referring to FIG. 23, the uncoated portions 146a, 146b of the electrode assembly 110 are bent from the outer circumference to the core. At this time, since the core-side uncoated portion B1 has a lower height than the other portions, the core-side uncoated portion B1 is not substantially bent. The first current collecting plate 144 may be welded to the bent surface of the uncoated portion 146a, and the second current collecting plate 176 may be welded to the bent surface of the uncoated portion 146b.

In the electrode assembly 110, the height of the core-side uncoated portion B1 is relatively lower than that of the other portions. Also, as shown in FIG. 14, the height (H) of the uncoated portion located at the innermost side of the intermediate uncoated portion B2 is equal to or smaller than the radial length (R) of the core-side uncoated portion B1. Here, the height of the uncoated portion means a distance from the base line to the first side or a height of a segment.

Therefore, even when the uncoated portions 146a, 146b are bent toward the core, the cavity 112 in the core of the electrode assembly 110 may be opened upward without being blocked.

If the cavity 112 is not blocked, there is no difficulty in the electrolyte injection process and the electrolyte injection efficiency is improved. In addition, by inserting a welding jig through the cavity 112, the welding process between the first current collecting plate 144 and the rivet terminal 172 may be easily performed.

When the uncoated portions 146a, 146b have a segment structure, if the width and/or height and/or separation pitch of the segments are adjusted to satisfy the numerical ranges of the above embodiment, the segments may be overlapped in multiple layers to sufficiently secure welding strength when the segments are bent, and an empty space (gap) is not formed in the bent surface.

The structures of the uncoated portions 146a, 146b may be changed to any structure according to the above embodiments (modifications) differently from those shown in the drawings. In addition, a conventional uncoated portion structure may be applied to any one of the uncoated portions 146a, 146b without limitation.

Figure 24:
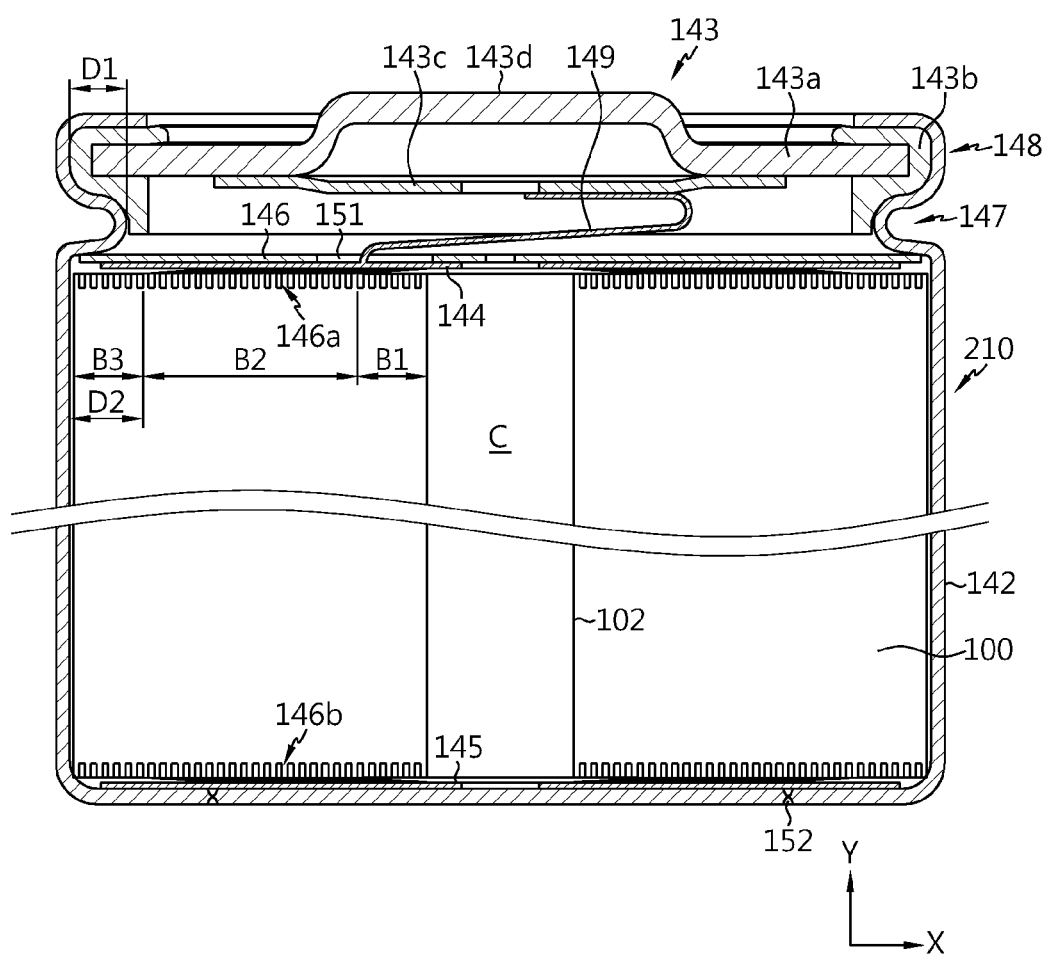
FIG. 24 is a sectional view showing a cylindrical battery cell according to still another embodiment of the present disclosure, taken along the Y-axis.

FIG. 24 is a sectional view showing a cylindrical battery cell 210 according to still another embodiment of the present disclosure, taken along the Y-axis.

Referring to FIG. 24, the cylindrical battery cell 210 includes the electrode assembly 100 illustrated in FIG. 13, and the components other than the electrode assembly 100 are substantially the same as those of the cylindrical battery cell 140 illustrated in FIG. 17.

Preferably, the uncoated portions 146a, 146b of the electrode assembly 100 are bent from the outer circumference to the core. At this time, since the core-side uncoated portion B1 and the circumferential uncoated portion B3 of the uncoated portion 146a have a lower height than the other portions, they are not substantially bent. This is the same for the uncoated portion 146b. The first current collecting plate 144 may be welded to the bent surface of the uncoated portion 146a, and the second current collecting plate 145 may be welded to the bent surface of the uncoated portion 146b.

The height of the core-side uncoated portion B1 is relatively lower than that of the intermediate uncoated portion B2. Also, as shown in FIG. 13, the height (H) of the uncoated portion located at the innermost of the intermediate uncoated portion B2 is equal to or smaller than the radial length (R) of the core-side uncoated portion B1. Here, the height of the uncoated portion means a distance from the base line to the first side or a height of a segment.

Therefore, even when the uncoated portions 146a, 146b are bent toward the core, the cavity 102 in the core of the electrode assembly 100 may be opened upward without being blocked.

If the cavity 102 is not blocked, there is no difficulty in the electrolyte injection process and the electrolyte injection efficiency is improved. In addition, the welding process between the second current collecting plate 145 and the battery can 142 may be easily performed by inserting a welding jig through the cavity.

Also, the height of the circumferential uncoated portion B3 is relatively lower than that of the intermediate uncoated portion B2. Accordingly, when the uncoated portion 146a is bent, the circumferential uncoated portion B3 is not substantially bent. In addition, since the circumferential uncoated portion B3 is sufficiently spaced apart from the beading portion 147, it is possible to solve the problem that the circumferential uncoated portion B3 is damaged while the beading portion 147 is being press-fitted.

When the uncoated portions 146a, 146b have a segment structure, if the width and/or height and/or separation pitch of the segments are adjusted to satisfy the numerical ranges of the above embodiment, the segments may be overlapped in multiple layers to sufficiently secure welding strength when the segments are bent, and an empty space (gap) is not formed in the bent surface.

The structures of the uncoated portions 146a, 146b may be changed to any structure according to the above embodiments (modifications) differently from those shown in the drawings. In addition, a conventional uncoated portion structure may be applied to any one of the uncoated portions 146a, 146b without limitation.

Figure 25:
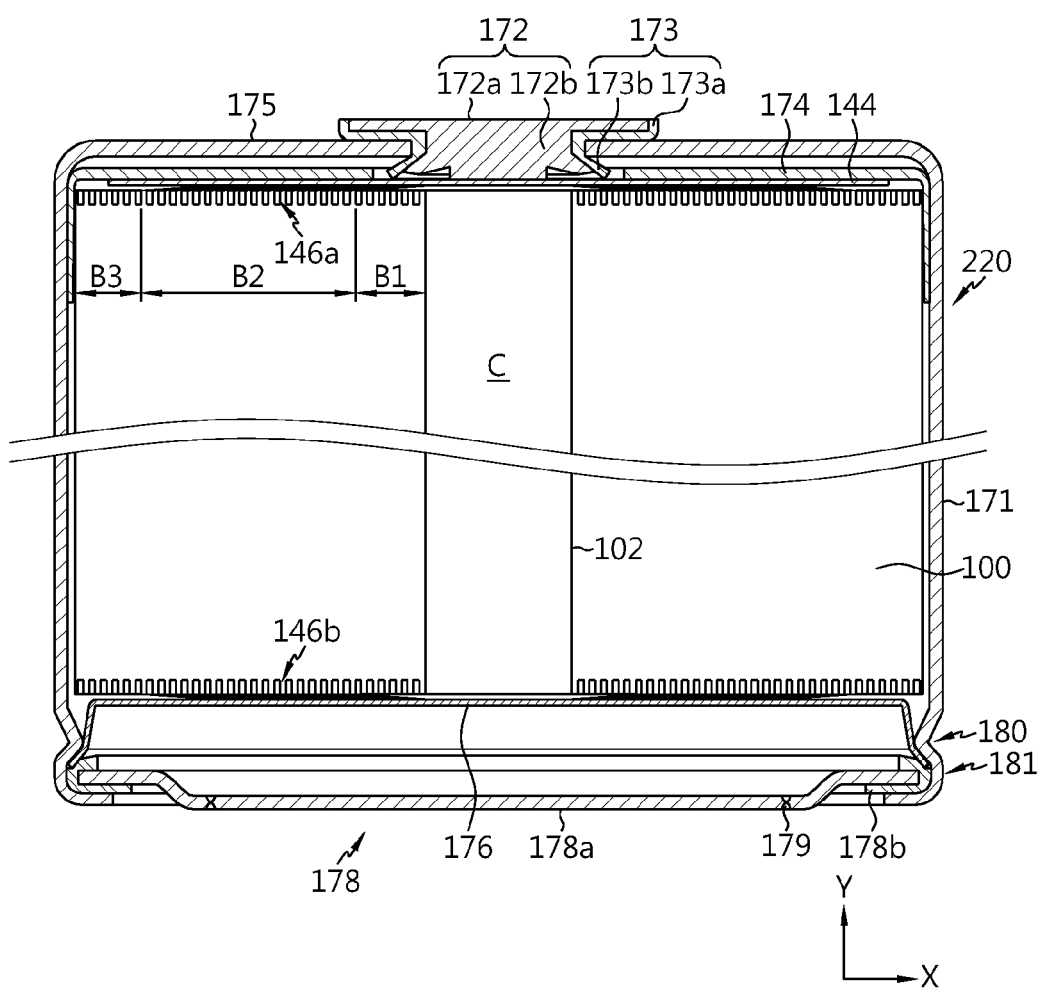
FIG. 25 is a sectional view showing a cylindrical battery cell according to still another embodiment of the present disclosure, taken along the Y-axis.

FIG. 25 is a sectional view showing a cylindrical battery cell 220 according to still another embodiment of the present disclosure, taken along the Y-axis.

Referring to FIG. 25, the cylindrical battery cell 220 includes the electrode assembly 100 illustrated in FIG. 13, and the components other than the electrode assembly 100 are substantially the same as those of the cylindrical battery cell 180 illustrated in FIG. 21.

Preferably, the uncoated portions 146a, 146b of the electrode assembly 100 are bent from the outer circumference to the core. At this time, since the core-side uncoated portion B1 of the uncoated portion 146a has a lower height than the other portions, the core-side uncoated portion B1 is not substantially bent. This is the same for the uncoated portion 146b. The first current collecting plate 144 may be welded to the bent surface of the uncoated portion 146a, and the second current collecting plate 176 may be welded to the bent surface of the uncoated portion 146b.

In the electrode assembly 100, the height of the core-side uncoated portion B1 is relatively lower than that of the intermediate uncoated portion B2. Also, as shown in FIG. 13, the height (H) of the uncoated portion at the innermost side of the intermediate uncoated portion B2 is equal to or smaller than the radial length (R) of the core-side uncoated portion B1. Here, the height of the uncoated portion means a distance from the base line to the first side or a height of a segment.

Accordingly, even when the uncoated portion 146a is bent toward the core, the cavity 102 in the core of the electrode assembly 100 may be opened upward without being blocked.

If the cavity 102 is not blocked, there is no difficulty in the electrolyte injection process and the electrolyte injection efficiency is improved. In addition, the welding process between the first current collecting plate 144 and the rivet terminal 172 may be easily performed by inserting a welding jig through the cavity 102.

Also, the circumferential uncoated portion B3 of the uncoated portion 146a has a relatively smaller height than the intermediate uncoated portion B2. Accordingly, when the uncoated portion 146a is bent, the circumferential uncoated portion B3 is not substantially bent. This is the same for the uncoated portion 146b.

When the uncoated portions 146a, 146b have a segment structure, if the width and/or height and/or separation pitch of the segments are adjusted to satisfy the numerical ranges of the above embodiment, the segments may be overlapped in multiple layers to sufficiently secure welding strength when the segments are bent, and an empty space (gap) is not formed in the bent surface.

The structures of the uncoated portions 146a, 146b may be changed to any structure according to the above embodiments (modifications) differently from those shown in the drawings. In addition, a conventional uncoated portion structure may be applied to any one of the uncoated portions 146a, 146b without limitation.

The cylindrical battery cell according to the above embodiments (modifications) may be used to manufacture a battery pack.

Figure 26:
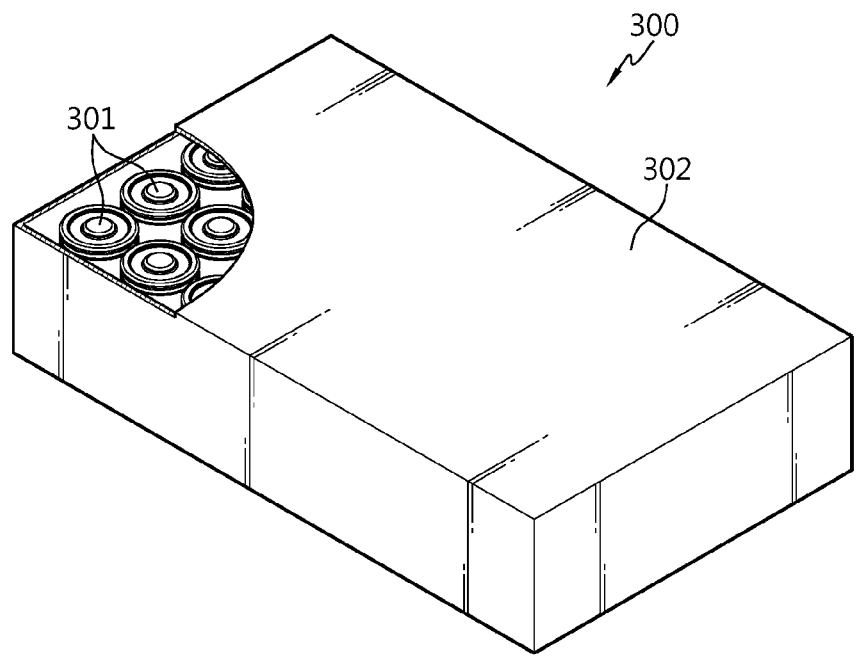
FIG. 26 is a diagram schematically showing a battery pack according to an embodiment of the present disclosure.

FIG. 26 is a diagram schematically showing a battery pack according to an embodiment of the present disclosure.

Referring to FIG. 26, a battery pack 300 according to an embodiment of the present disclosure includes an aggregate in which cylindrical battery cells 301 are electrically connected, and a pack housing 302 for accommodating the aggregate. The cylindrical battery cell 301 may be any one of the battery cells according to the above embodiments (modifications). In the drawing, components such as a bus bar, a cooling unit, and an external terminal for electrical connection of the cylindrical battery cells 301 are not depicted for convenience of illustration.

The battery pack 300 may be mounted to a vehicle. The vehicle may be, for example, an electric vehicle, a hybrid electric vehicle, or a plug-in hybrid vehicle. The vehicle includes a four-wheeled vehicle or a two-wheeled vehicle.

Figure 27:
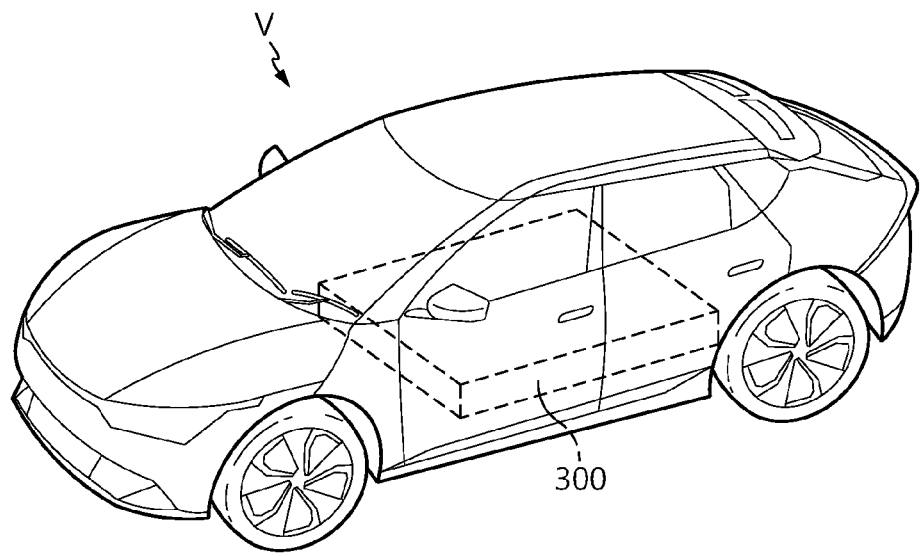
FIG. 27 is a diagram schematically showing a vehicle including the battery pack according to an embodiment of the present disclosure.
Figure 28:
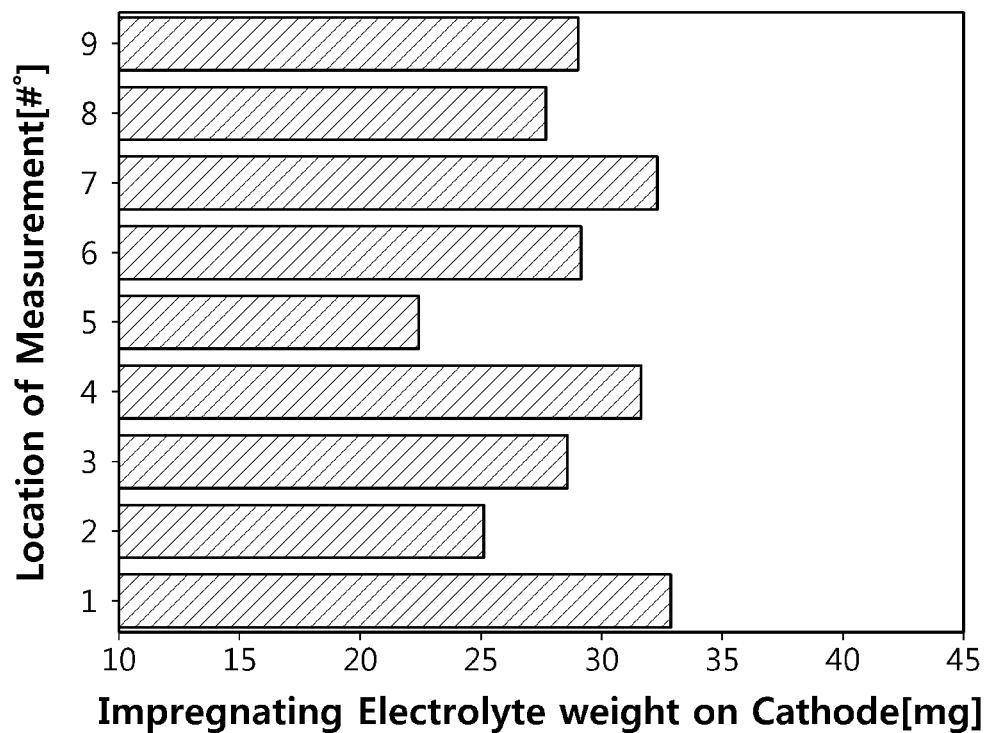
FIGS. 28 and 29 show an electrolyte impregnation amount at each electrode location in the positive electrode and the negative electrode according to the comparative example.
Figure 29:
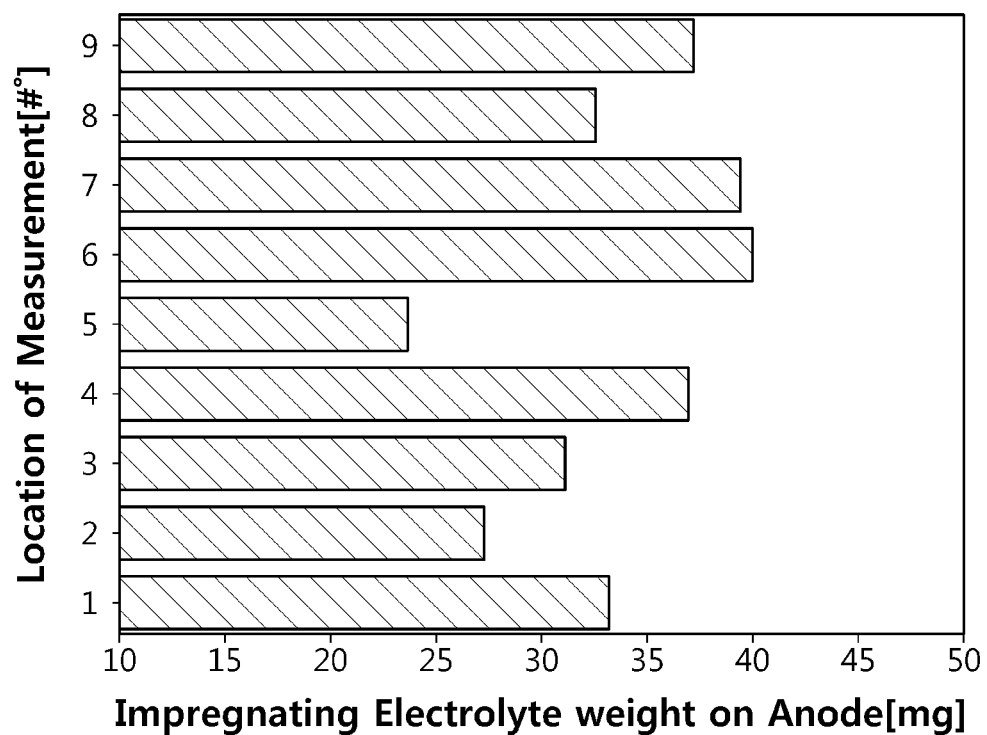
Figure 30:
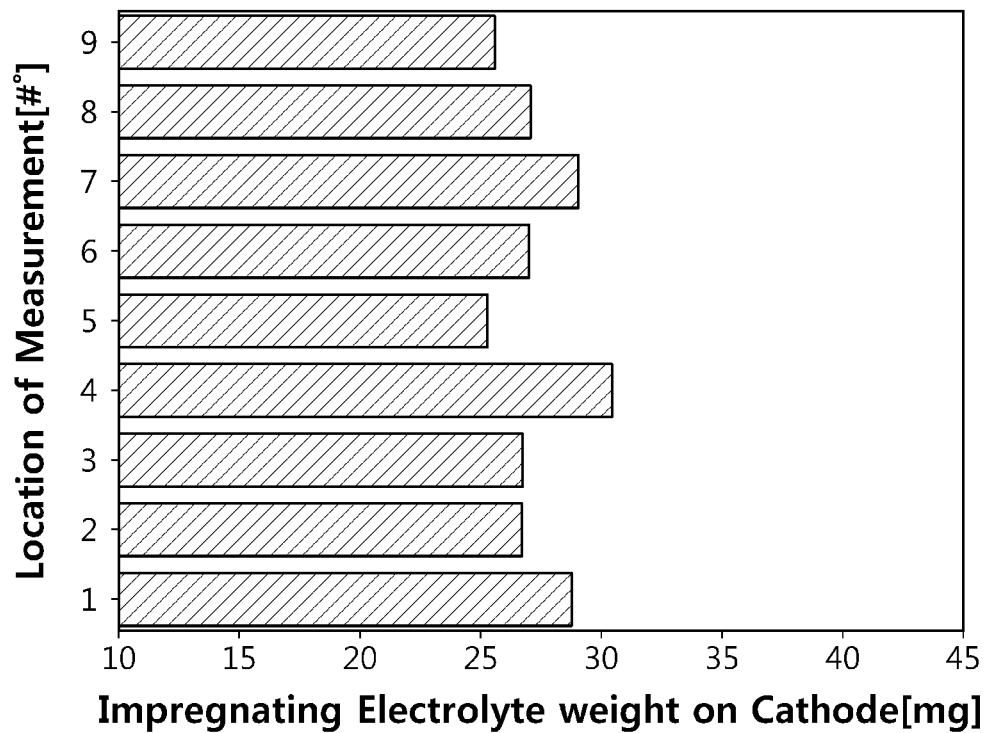
FIGS. 30 and 31 show an electrolyte impregnation amount at each electrode location in the positive electrode and the negative electrode according to Example 1.
Figure 31:
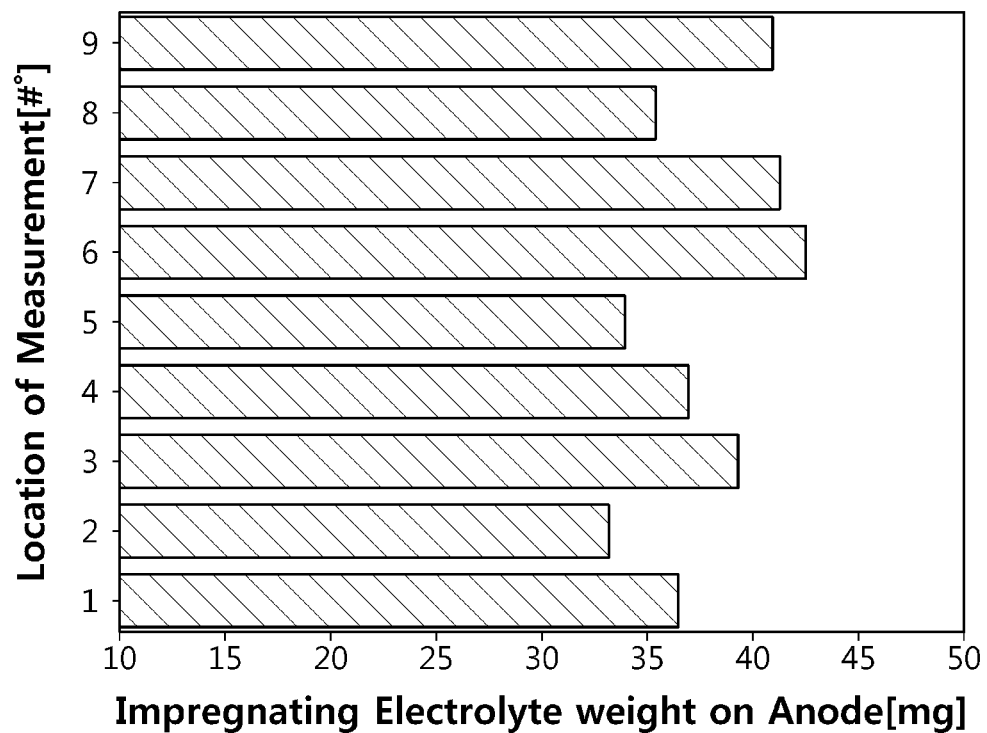
Figure 32:
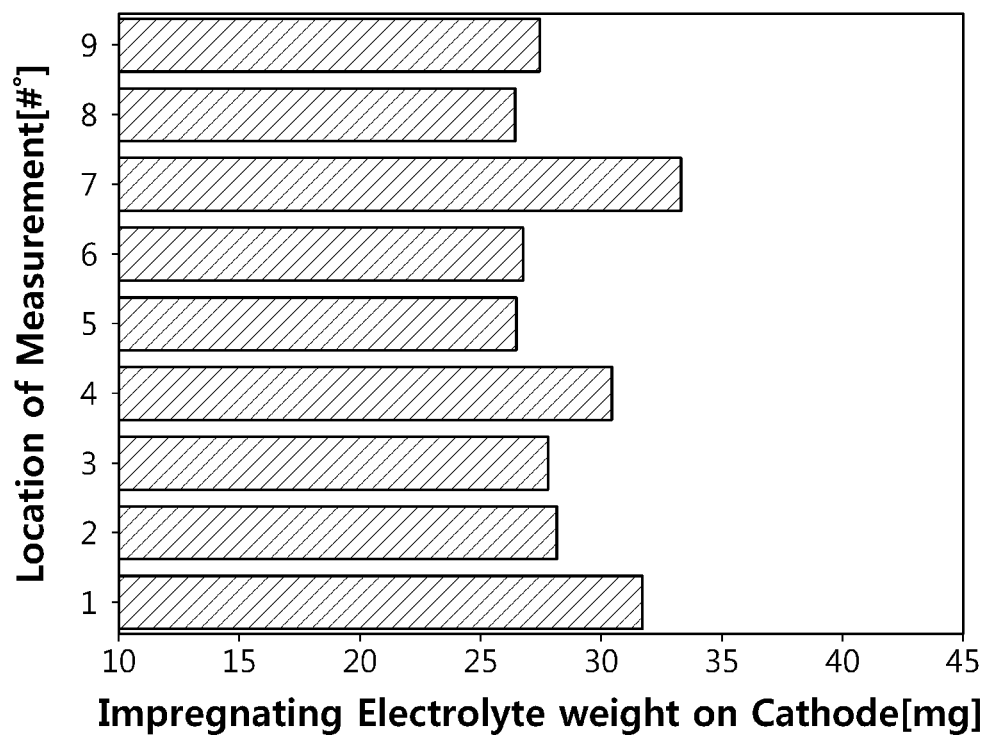
FIGS. 32 and 33 show an electrolyte impregnation amount at each electrode location in the positive electrode and the negative electrode according to Example 2.
Figure 33:
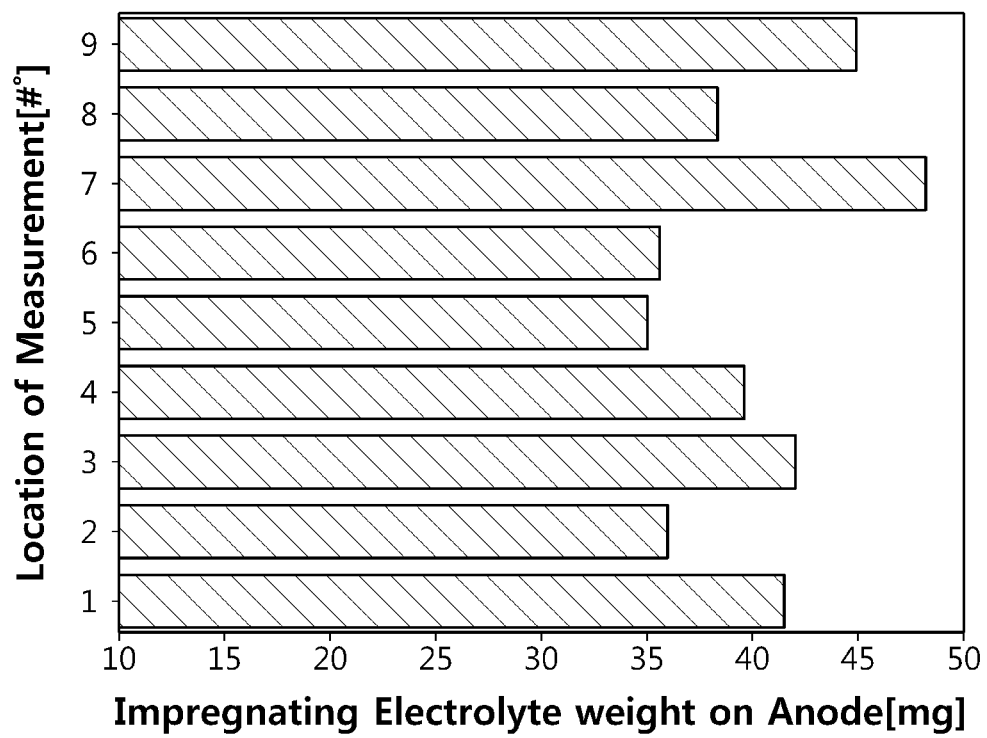

FIG. 27 is a diagram schematically showing a vehicle including the battery pack 300 according to an embodiment of the present disclosure.

Referring to FIG. 27, a vehicle V according to an embodiment of the present disclosure includes the battery pack 300 according to an embodiment of the present disclosure. The vehicle V operates by receiving power from the battery pack 300 according to an embodiment of the present disclosure.

According to the present disclosure, since the uncoated portions themselves protruding from the upper and lower portions of the electrode assembly are used as electrode tabs, it is possible to reduce the internal resistance of the battery cell and increase the energy density.

According to another embodiment of the present disclosure, since the structure of the uncoated portion of the electrode assembly is improved so that the electrode assembly does not interfere with the inner circumference of the battery in the process of forming the beading portion of the battery can, it is possible to prevent a short circuit in the cylindrical battery cell caused by partial deformation of the electrode assembly.

According to still another embodiment of the present disclosure, since the structure of the uncoated portion of the electrode assembly is improved, it is possible to prevent the uncoated portion from being torn when the uncoated portion is bent, and the number of overlapping layers of the uncoated portions is sufficiently increased so as to improve welding strength.

According to still another embodiment of the present disclosure, since the structure of the uncoated portion adjacent to the core of the electrode assembly is improved, it is possible to prevent the cavity in the core of the electrode assembly from being blocked when the uncoated portion is bent. Thus, the electrolyte injection process and the process of welding the battery can (or rivet terminal) and the current collecting plate may be carried out easily.

According to still another embodiment of the present disclosure, it is possible to provide a cylindrical battery cell having a structure that has a low internal resistance, prevents internal short circuit and improves welding strength of the current collecting plate and the uncoated portion, and a battery pack and a vehicle including the cylindrical battery cell.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

EXAMPLES

(1) Preparation of Current Collector

1) Preparation of a Current Collector for Cathode

As shown in Table 1 below, a metal foil for a current collector made of aluminum and the metal foil included an uncoated portion on which segments of Group 1 and Group 2 is to be formed. The metal foil had a length of 4,000 mm along the winding direction (X) from the core to the outer circumference (B1+B2+B3), and width along the axis direction (Y) was 75 mm. The metal foil was classified such that B1 is a core-side portion, B3 is an outer circumferential portion, and B2 is an intermediate portion between the core-side portion and the outer circumferential portion.

The predetermined width from the second side to the first side of the metal foil was set as an electrode active material portion and the remaining portion was set as an uncoated portion, and the height of the core-side uncoated portion and the circumferential uncoated portion in the axis direction (Y) was smaller than that of the intermediate uncoated portion.

2) Preparation of a Current Collector for Anode

A negative current collector was prepared in the same manner as the positive electrode current collector except that a copper thin film (10 μm thick) was used as the current collector and the width along the winding axis was 80 mm.

TABLE 1

|  |  | Example 1 | Example 2 | comparative example 1 |
|---|---|---|---|---|
| Total length (mm) of the current collector (length from the core to the outer circumference) | | 4000 mm | 4000 mm | 4000 mm |
| Total width (mm) the currentcollector | anode | 80 mm | 80 mm | 80 mm |
| | cathode | 75 mm | 75 mm | 75 mm |
| length (mm) of B1 | | 350 mm | 350 mm | 350 mm |
| length (mm) of B2 | | 3500 mm | 3500 mm | 3500 mm |
| length (mm) of each group (Group 1 to Group 7) | | 500 mm | 500 mm | 500 mm |
| B2 segment height (C2) (mm) | Group 1 | 5 mm | 5 mm | 5 mm |
| | Groups 2 to 7(each) | 6 mm | 6 mm | 6 mm |
| Length (mm) of B3 | | 150 mm | 150 mm | 150 mm |
| Width (mm) of C2 | | 5 mm | 5 mm | 5 mm |
| Gap (separation pitch) between segments (C3) | | 0.5 mm | 0.5 mm | 0.5 mm |

(2) Preparation of a Negative Electrode

Earthen natural graphite, carbon black, carboxymethyl cellulose (CMC) and styrene-butadiene rubber (SBR) having an average particle diameter ($D_{50}$) of 11 μm were mixed with water in a weight ratio of 94:1.5:2:2.5 to prepare a slurry for a negative electrode active material layer with a concentration of 50 wt % of the remaining components except for water. Next, the slurry was applied to an anode active material portion of the surface of a copper current collector prepared above using a slot die at a running speed of 40 m/min (lower sub layer). The width of the electrode active material portion was 70 mm and the width of the uncoated portion was 10 mm, wherein the width was along the axis direction (Y). The loading amount of the negative electrode active material was 16 mg/cm$^2$ based on the electrode area. The copper thin film coated with the slurry for a negative electrode active material layer was dried by passing through a hot air oven with a length of 60 m, and the temperature of the oven was controlled to maintain 130° C. Then, roll pressing was performed with a target thickness of 180 μm to obtain a negative electrode with a density of 3.45 g/cc. The intermediate uncoated portion was divided by laser notching so that a plurality of segments were disposed as set in Table 1. Each notching valley had a substantially same height.

(3) Preparation of a Positive Electrode $Li(Ni_{0.6}Mn_{0.2}Co_{0.2})O_2$ (NCM-622) as a positive electrode active material, carbon black as a conductive material, and polyvinylidene fluoride (PVdF) as a binder was added to water serving as a dispersion medium in a weight ratio of 96:2:2 to prepare a slurry for a positive electrode active material. The slurry was coated on the active material portion of the surface of an aluminum current collector, dried and rolled under the same conditions as the negative electrode to prepare a positive electrode. The width of the electrode active material portion was 65 mm and the width of the uncoated portion was 10 mm, wherein the width was along the axis direction (Y). At this time, the positive electrode active material layer was adjusted so that the NP ratio of the battery was 1.18 (118%, about 27.7 $cm^2$) in consideration of the theoretical discharge capacity of the NMC 622. The intermediate uncoated portion was divided by laser notching so that a plurality of segments were disposed as set in Table 1. Each notching valley had a substantially same height.

(4) Preparation of a Separator

After adding about 5 weight % of polyvinylidene fluoride-hexafluoropropylene copolymer (PVdF-HFP) to tetrahydrofuran (THF), it was dissolved at a temperature of 50° C. for about 12 hours or more to prepare a polymer solution. $BaTiO_3$ powder having a particle diameter of about 400 nm was added and dispersed to this polymer solution at a total solid content of 20 weight % to prepare a mixed solution ($BaTiO_3$/PVdF-HFP=80:20 (weight ratio)). The prepared mixed solution was coated on both surfaces of a polypropylene porous substrate using the doctor blade method. After coating, the THF was dried to obtain a final organic/inorganic composite porous separator. The final separator had a thickness of about 30 μm. As a result of measurement with a porosimeter, the pore size and porosity of the final organic/inorganic composite porous film were 0.4 μm and 60%, respectively.

(5) Preparation of an Electrode Assembly

The prepared negative electrode/separator/positive electrode was laminated in order and wound to prepare a jelly-roll type electrode assembly. In Example 1, the one side of the separator in the axial direction was located at 30% (1.5 mm) of the height of the shortest bent segment (Group 1) with respect to the base line in the outer direction of the electrode assembly.

In Example 2, the one side of the separator in the axial direction was located at 10% (0.5 mm) of the height of the shortest bent segment (Group 1) with respect to the base line in the outer direction of the electrode assembly.

In a comparative example, the one side of the separator in the axial direction was located at 50% of the height of the shortest bent segment (Group 1) with respect to the base line in the outer direction of the electrode assembly.

(6) Preparation of a Battery (4680 Type)

The segments of Groups 1 to 7 exposed on the upper and lower portions of the electrode assembly of Example 1 were bent toward the core, and then the positive and negative current collector were welded to the upper and lower curved surfaces, respectively. Then, a cylinder type battery shown in FIG. 25 was manufactured. That is, the electrode assembly to which the positive electrode current collector and the negative electrode current collector are welded is inserted into a battery housing having external terminals installed in advance, the positive electrode current collector and the external terminal are welded, and the edge of the negative electrode current collector is welded to the beading part. Then, the battery housing was introduced into the chamber of the electrolyte injection device, and the battery housing was erected so that the opening of the battery housing faces in a direction opposite to gravity. Next, $LiPF_6$ was dissolved to a concentration of 1.0 M in an organic solvent in which ethylene carbonate (EC), dimethyl carbonate (DMC) and diethyl carbonate (DEC) were mixed in a composition of 1:2:1 (volume ratio) to prepare a non-aqueous electrolyte. Then, the electrolyte was injected through the opening of the battery housing. Next, the electrode assemblies were pressurized under conditions of 800 kPa, rise 20 seconds (sec), hold 150 seconds, and made into vacuum under conditions of −90 kPa, fall 20 seconds, hold 20 seconds. After the electrolyte impregnation process was completed, the opening of the battery housing was sealed with a sealant using a gasket to complete the manufacture of the cylinder type battery. The batteries of Example 2 and Comparative Example 1 were also manufactured by applying substantially the same manufacturing process as above.

(7) Evaluation of Electrolyte Impregnation Amount

Figure 34:
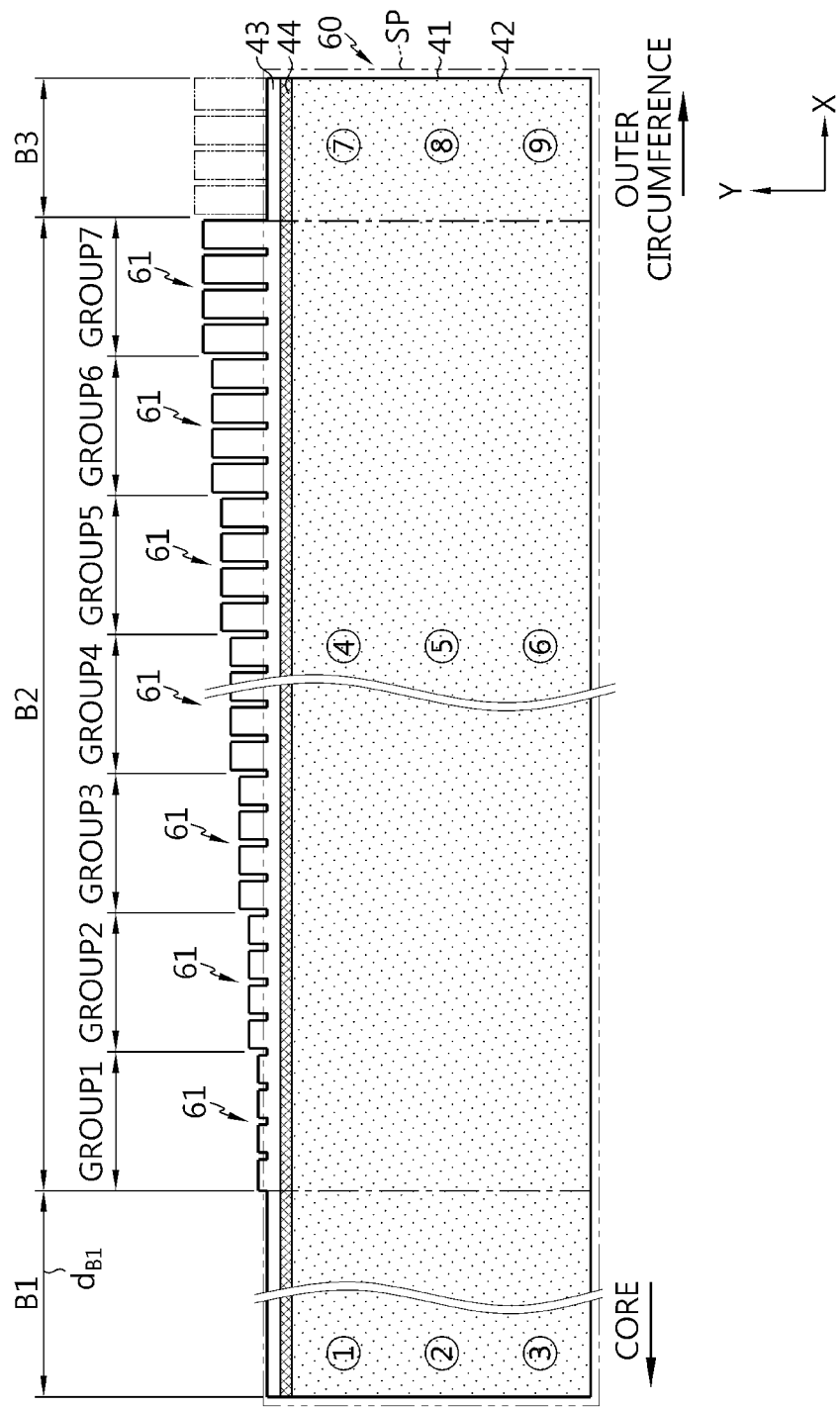
FIG. 34 shows each location at which an impregnation sample is collected in each of the comparative example, Example 1 and Example 2.

The batteries of Examples 1, 2 and Comparative Example 1 were disassembled to obtain positive and negative electrodes, respectively. Afterwards, samples with a size of 10 $cm^2$ were obtained by cutting out a total of 9 points for the cathode and anode, respectively. When the electrodes are spread out, three in the region adjacent to the core of the electrode assembly (#1 to #3), three in the region adjacent to the outer periphery of the electrode assembly (#7 to #9), and three in the central region of the electrode based on the winding direction (#4 to #6) were collected. The sampling portion can be referred to FIG. 34. However, FIG. 34 shows only the sampling part based on FIG. 7A, thus for shapes and figures for the electrode assembly other than the sampling part, it is referred to [Table 1] above.

In taking three samples from each sampling area, one sample was taken from the lower end, the center, and the upper end of the active material layer along the axis direction. FIG. 34 shows the sampling area. Here, #1, #4, and #7 are near one end in the electrode width direction, #3, #6, and #9 are near the other end in the electrode width direction, while #2, #5, and #8 are in the intermediate area between the two areas.

The amount of electrolyte impregnation was determined from the difference between the weight of the control sample and the weight of the collected sample. Control samples were prepared in the same manner as the electrodes used in Examples 1, 2 and Comparative Example 1, and were obtained from the same sampling areas. The control sample were not impregnated with the electrolyte. In the electrode assembly of Example 1, the average electrolyte impregnation amount of #1 to #9 was 60.3 mg, Example 2 was 59.6 mg, and Comparative Example 1 was 56.3 mg. The electrolyte impregnation amount in Examples 1 and 2 was higher than Comparative Example 1. In addition, the sum of the electrolyte impregnation amount of the positive electrode sample and the negative electrode sample collected in #2 was 55.1 mg for the electrode assembly of Example 1, 59 mg for the electrode assembly of Example 2, and 47.7 mg for the electrode assembly of Comparative Example 1. From this, it can be seen that the electrolyte impregnation amount of Examples 1 and 2 is higher than Comparative Example 1 even near the core of the electrode assembly having a relatively low electrolyte impregnation amount.

TABLE 2

| electrode | Measurement position | comparative example | Example 1 | Example 2 |
|---|---|---|---|---|
| positive electrode (mg) | #2 position | 20.3 | 21.8 | 23.1 |
|  | Average | 23.8 | 22.4 | 23.7 |
| negative electrode (mg) | #2 position | 27.4 | 33.3 | 35.9 |
|  | Average | 33.5 | 37.9 | 40.1 |
| Sum (mg) (positive electrode + negative electrode) | Sum for #2 position | 47.7 | 55.1 | 59 |
|  | Average sum | 56.3 | 60.3 | 59.6 |

What is claimed is:

1. An electrode assembly comprising:
a first electrode, a second electrode, and a separator between the first electrode and the second electrode,
wherein the first electrode, the second electrode, and the separator are together wound about an axis in one winding direction to have a plurality of winding turns,
wherein each of the first electrode and the second electrode comprises a first side and a second side opposite the first side in a direction of the axis,
wherein each of the first electrode and the second electrode further comprises a first, electrode active material portion, coated with an electrode active material, extending from the second side in the direction of the first side, and a second, uncoated portion extending from the first side in the direction of the second side to the active material of the first portion,
wherein the first side of the first and the second electrodes is divided into a plurality of segments by a cut groove having a predetermined length,
wherein each of the segments has a first end corresponding to the first side of the first and second electrodes,
wherein one or more of the segments are bent in a radial direction relative to the axis, at a point below the first end in each segment,
wherein the separator has a side that is positioned between the bending point of each bent segment and a boundary between the first and the second portions,
wherein the side of the separator is positioned between the bending point and a base line, or positioned below the base line in the axis direction, and wherein the base line is represented by a straight line extending in a winding direction (X) at a height corresponding to a notching valley of cut grooves dividing the plurality of segments,
wherein a bent segment is a segment that is bent among the segments and a shortest bent segment is a segment that has a shortest length among the plurality of bent segments,
wherein the side of the separator is located above the base line and at a distance from the base line that is no greater than 50% of the total length of the shortest bent segment, or the side of the separator is located below the base line and at a distance from the base line that is no greater than 30% of the total length of the shortest bent segment, and
wherein the total length of the shortest bent segment is the length from the base line corresponding to the shortest bent segment to the first end of the shortest bent segment.

2. The electrode assembly of claim 1, wherein the separator is positioned such that a notching valley of each cut groove is not exposed.

3. The electrode assembly of claim 1, wherein a base line is represented by a straight line extending in the winding direction coincident with a notching valley of each cut grooves.

4. The electrode assembly of claim 3, wherein a length from the first end of each segment to the base line is variable.

5. The electrode assembly according to claim 1, wherein the second, uncoated portion includes a core-side uncoated portion adjacent to a core of the electrode assembly, a circumferential uncoated portion adjacent to an outer circumferential surface of the electrode assembly, and an intermediate uncoated portion interposed between the core-side uncoated portion and the circumferential uncoated portion, and at least one of the core-side uncoated portion and the circumferential uncoated portion has a relatively shorter length from the base line to the first side than the intermediate uncoated portion.

6. The electrode assembly according to claim 5, wherein the core-side uncoated portion has a relatively shorter length from the base line to the first side than the intermediate uncoated portion and the circumferential uncoated portion.

7. The electrode assembly according to claim 5, wherein the first side of the core-side uncoated portion and the base line coincide with each other.

8. The electrode assembly according to claim 5, wherein the core-side uncoated portion includes an uncoated portion corresponding to an innermost winding turn of the electrode assembly, and the circumferential uncoated portion includes an uncoated portion corresponding to an outermost winding turn of the electrode assembly.

9. The electrode assembly according to claim 5, wherein all or at least a partial region of the intermediate uncoated portion is divided into a plurality of segments.

10. The electrode assembly according to claim 1, wherein a distance between the bending point and the side of the separator is greater than or equal to 0.1 mm.

11. The electrode assembly according to claim 1, wherein the length from bending point to base line of the shortest bent segment is greater than or equal to 2 mm.

12. The electrode assembly according to claim 1 further comprising:
at least one segment (segment A) having a height less than the shortest bent segment, otherwise the shortest bent segment is the segment having a minimum height, wherein segment height means a shortest length from the base line to the first end.

13. The electrode assembly according to claim 5, wherein at least a partial region of the intermediate uncoated portion is configured to have a height in the winding axis direction, which increases stepwise from the core to the outer circumference.

14. The electrode assembly according to claim 1, wherein at least one of segment height and segment width increases stepwise in the winding direction from the core to the outer circumference individually or in groups.

15. The electrode assembly according to claim 1, wherein each of the plurality of segments satisfies at least one of the following conditions: a width of 1 mm to 6 mm in the winding direction; a height of 2 mm to 10 mm in the axis direction; and a separation pitch of 0.05 mm to 1 mm in the winding direction.

16. The electrode assembly according to claim 1, wherein the plurality of segments satisfy a separation pitch condition of 0.05 mm to 1 mm in the winding direction, the separation pitch is defined as a distance between corners of two segments adjacent to each other, and wherein round reinforcing portions are formed to the corners of the segments adjacent to each other.

17. The electrode assembly according to claim 1,
wherein the separator comprises a porous polymer substrate; and a porous coating layer located on at least one surface of the porous polymer substrate,
wherein the porous coating layer comprises a plurality of inorganic particles and binder polymer.

18. The electrode assembly according to claim 17, wherein the inorganic particles comprise inorganic particles having a hydrophilic property.

19. A cylindrical battery cell, comprising an electrode assembly according to claim 1, and further comprising:
a battery can configured to accommodate the electrode assembly and electrically connected to one of the first electrode and the second electrode to have a first polarity;
a sealing body configured to seal an open end of the battery can; and
a terminal electrically connected to the other of the first electrode and the second electrode to have a second polarity and configured to have a surface exposed to the outside,
wherein the separator comprises a porous polymer substrate; and a porous coating layer located on both surfaces of the porous polymer substrate and comprising inorganic particles and a binder polymer.

20. A battery pack, comprising at least one battery cell according to claim 19.

21. A vehicle, comprising at least one battery pack according to claim 20.

* * * * *